US012472518B2

(12) United States Patent
Ueda et al.

(10) Patent No.: US 12,472,518 B2
(45) Date of Patent: Nov. 18, 2025

(54) FLUID DISCHARGE SYSTEM

(71) Applicant: HEISHIN Ltd., Kobe (JP)

(72) Inventors: Takanori Ueda, Nagahama (JP); Junpei Fuse, Nagahama (JP)

(73) Assignee: HEISHIN Ltd., Hyogo (JP)

( * ) Notice: Subject to any disclaimer, the term of this patent is extended or adjusted under 35 U.S.C. 154(b) by 263 days.

(21) Appl. No.: 18/547,499

(22) PCT Filed: Oct. 26, 2021

(86) PCT No.: PCT/JP2021/039531
§ 371 (c)(1),
(2) Date: Aug. 22, 2023

(87) PCT Pub. No.: WO2022/180930
PCT Pub. Date: Sep. 1, 2022

(65) Prior Publication Data

US 2024/0050969 A1 Feb. 15, 2024

(30) Foreign Application Priority Data

Feb. 26, 2021 (JP) ................................ 2021-031252

(51) Int. Cl.
*B05B 9/04* (2006.01)

(52) U.S. Cl.
CPC .................................... *B05B 9/04* (2013.01)

(58) Field of Classification Search
CPC ....... B05B 9/04; B05B 9/0416; B05B 12/081; B05C 11/101; B05C 11/1047;
(Continued)

(56) References Cited

U.S. PATENT DOCUMENTS 7,131,555 B2 * 11/2006 Maruyama .......... B05C 11/1047 417/205
2004/0164091 A1 * 8/2004 Ono ........................ B05C 11/10 222/386

(Continued)

FOREIGN PATENT DOCUMENTS

JP 2004-249243 A 9/2004
JP 3104056 U 9/2004

(Continued)

OTHER PUBLICATIONS

ISA/JP, International Search Report issued on Jan. 11, 2022 in International Application No. PCT/JP2021/039531, 12 pages with translation.

*Primary Examiner* — Vishal Pancholi
(74) *Attorney, Agent, or Firm* — MASUVALLEY & PARTNERS; Peter Martinez

(57) ABSTRACT

A fluid discharging system 10 includes a discharging device 30 configured to discharge fluid, a pump 20 configured to supply the fluid stored in a reservoir 22 to the discharging device 30, a supply line 40 connecting the discharging device 30 with the pump 20 to allow the fluid to pass therethrough, and a buffer tank 50, disposed at an intermediate location of the supply line 40, and configured to suck and discharge the fluid. The fluid discharging system 10 is capable of continuing supply of the fluid to the discharging device 30 by discharging the fluid from the buffer tank 50 to the supply line 40, while limiting the supply of the fluid from the pump 20 to the discharging device 30. The buffer tank 50 is capable of realizing a pressure acting state and a holding state.

11 Claims, 25 Drawing Sheets

(58) Field of Classification Search
CPC . B05C 11/10; B05C 5/02; F04B 49/02; F04B 2207/00; F04B 23/02
See application file for complete search history.

(56) References Cited

U.S. PATENT DOCUMENTS

| | | | | |
|---|---|---|---|---|
| 2012/0241469 | A1* | 9/2012 | Takeishi | F04B 9/00 222/1 |
| 2018/0047562 | A1* | 2/2018 | deVilliers | H01L 21/0275 |

FOREIGN PATENT DOCUMENTS

| | | | |
|---|---|---|---|
| JP | 2011-189295 | A | 9/2011 |
| JP | 2013-071044 | A | 4/2013 |
| JP | 2013-163152 | A | 8/2013 |
| JP | 2015-211945 | A | 11/2015 |
| JP | 2019-203465 | A | 11/2019 |

* cited by examiner

PRESSURIZED STATE (1ST STATE)

DEPRESSURIZED STATE (2ND STATE)

HOLDING STATE (3RD STATE)

<<PUMP SUPPLY MODE>>

<<TANK ACCUMULATION MODE>>

<<TANK ACCUMULATION MODE>>

<<TANK SUPPLY MODE>>

<<TANK SUPPLY MODE>>

<<MULTIPLE SUPPLY MODE>>

FLUID DISCHARGE SYSTEM

RELATED APPLICATIONS

This application is the U.S. National Phase of and claims priority to International Patent Application No. PCT/JP2021/039531, International Filing Date Oct. 26, 2021; which claims the benefit of Japanese Patent Application No. 2021-031252 filed Feb. 26, 2021, which is incorporated herein by reference in its entirety.

TECHNICAL FIELD

The present disclosure relates to a fluid discharging system which supplies fluid to a discharging device and makes the discharging device discharge the fluid.

BACKGROUND ART

Conventionally, like a pump device disclosed in Patent Document 1 listed below, what is capable of pumping up and pumping fluid prepared in a container, such as a pail can, is provided. Further, conventionally, a fluid discharging system which is formed by pipe-connecting such a pump device, for example, to a discharging device, such as a dispenser, is provided. The fluid discharging system can discharge the fluid from the discharging device by supplying the fluid pumped by the pump device to the discharging device.

REFERENCE DOCUMENT(S) OF CONVENTIONAL ART

Patent Document

[Patent Document 1] JP2019-203465A

DESCRIPTION OF THE DISCLOSURE

Problem(s) to be Solved by the Disclosure

The fluid discharging system described above can continue the discharge of the fluid by the discharging device, while the fluid prepared inside the container of the pump device remains. However, once the fluid prepared on the pump device side is used up, the supply of the fluid to the discharging device stops. Therefore, the fluid discharging system described above needs to suspend the discharge of the fluid by the discharging device for refilling the fluid in the pump device etc. every time the fluid is emptied from the container of the pump device.

Thus, regarding the fluid discharging system, the present inventors examined preparing a plurality of (for example, two) pump devices for one discharging device so that a pump device which can supply the fluid to the discharging device is suitably switched between the pump devices. As a result, the present inventors acquired the knowledge that, according to the fluid discharging system having such a configuration, at a timing when the fluid is emptied in the pump device connected to the discharging device, the connection of the discharging device can be switched to another pump device which is ready for the fluid, and thereby, the suspension of the discharge of the fluid can be minimized. However, the present inventors reached the knowledge that, when having such a configuration, there are problems that, as a result of providing a plurality of (for example, two) pump devices to one discharging device, a larger installation space is needed and the cost increases accordingly.

Therefore, one purpose of the present disclosure is to provide a fluid discharging system which is capable of continuously supplying fluid to a discharging device, while suppressing an increase in an installation space and cost.

SUMMARY OF THE DISCLOSURE

In order to solve the above problem, the present inventors examined configuring a fluid discharging system including a discharging device which discharges fluid, a pump, having a reservoir which stores the fluid and configured to supply the fluid stored in the reservoir to the discharging device, a supply line connecting the discharging device with the pump to allow the fluid to pass therethrough, and a buffer tank disposed at an intermediate location of the supply line and configured to suck and discharge the fluid. The fluid discharging system with such a configuration can realize operation for continuing the supply of the fluid to the discharging device (discharge continuous operation) by discharging the fluid from the buffer tank to the supply line, when limiting the supply of the fluid from the pump to the discharging device. According to such a configuration, while supplying the fluid discharged from the buffer tank to the discharging device in the discharge continuous operation, it is possible to perform works for refilling the reservoir with the fluid, and replacing the reservoir where the residual quantity of the fluid is decreased with a reservoir where the residual quantity of the fluid is fully secured, for example.

On the other hand, as a result of extensive examination, the present inventors reached the knowledge that, unless optimizing a storage volume V of the fluid in the buffer tank, it may become impossible to continuously supply the fluid to the discharging device, or the fluid may be excessively accumulated in the buffer tank. In detail, if the storage volume V of the fluid in the buffer tank is small, the residual quantity of the fluid in the buffer tank may become empty, while refilling the reservoir with the fluid or replacing the reservoir, thereby stopping the supply of the fluid to the discharging device. Further, if the storage volume V of the fluid in the buffer tank is more than necessary, the fluid which has accumulated in the buffer tank may stay in the buffer tank for a long period of time. If the fluid remains in the buffer tank for a long period of time, consideration of deterioration etc. of the fluid becomes necessary. Further, the storage volume V of the buffer tank may be set considering variable elements, such as a variation in time required for a work of refilling the reservoir with the fluid or replacing the reservoir, and the length of the supply line. Therefore, in the fluid discharging system, when performing the discharge continuous operation, the storage volume V of the fluid in the buffer tank may be optimized in consideration of the discharge amount of the fluid discharged from the discharging device while limiting the supply of the fluid from the pump to the discharging device, and various kinds of variable elements.

(1-1) A fluid discharging system of the present disclosure provided based on such a knowledge includes a discharging device configured to discharge fluid, a pump, having a reservoir configured to store the fluid, and configured to supply the fluid stored in the reservoir to the discharging device, a supply line connecting the discharging device with the pump to allow the fluid to pass therethrough, and a buffer tank, disposed at an intermediate location of the supply line, and configured to suck and discharge the fluid. A discharge continuous operation in which supply of the fluid to the discharging device continues is possible by discharging the fluid from the buffer tank to the supply line, while limiting the supply of the fluid from the pump to the discharging device. Based on an average discharge flow rate "a" of the fluid discharged from the discharging device while limiting the supply of the fluid from the pump to the discharging device in the discharge continuous operation, and a time limit "t" during which the supply of the fluid from the pump to the discharging device is limited in the discharge continuous operation, and a variable parameter "x," a storage volume V of the fluid in the buffer tank is set using a relationship of V=a·(t+x).

The fluid discharging system of the present disclosure can realize the discharge continuous operation for continuing the supply of the fluid to the discharging device by discharging the fluid from the buffer tank to the supply line, while limiting the supply of the fluid from the pump to the discharging device. Thus, according to the fluid discharging system of the present disclosure, during the discharge continuous operation, it is possible to perform works for refilling the reservoir with the fluid, and replacing the reservoir where the residual quantity of the fluid is decreased with the reservoir where the residual quantity of the fluid is fully secured, for example. Therefore, according to the fluid discharging system of the present disclosure, the fluid can be supplied continuously to the discharging device, while suppressing the increase in the installation space and the cost.

Further, according to the fluid discharging system of the present disclosure, the storage volume V of the fluid in the buffer tank is defined based on the average discharge flow rate "a" of the fluid discharged from the discharging device while limiting the supply of the fluid from the pump to the discharging device in the discharge continuous operation, the time limit "t" during which the supply of the fluid from the pump to the discharging device is limited in the discharge continuous operation, and the variable parameter "x." Here, the storage volume V is defined by the relationship of V=a·(t+x), and is at least the volume obtained by multiplying the average discharge flow rate "a" by the time limit "t." Therefore, the fluid discharging system of the present disclosure can store in the buffer tank the amount of fluid required for being discharged from the discharging device, while limiting the supply of the fluid from the pump to the discharging device in the discharge continuous operation. Further, the formula which defines the storage volume V takes the variable parameter "x" in consideration. Therefore, the fluid discharging system of the present disclosure can optimize the storage volume V while taking the variable elements into consideration as well, by setting the variable parameter "x" according to the variable elements described above. Therefore, according to the present disclosure, the storage volume V of the fluid in the buffer tank can be optimized in consideration of the discharge amount of the fluid discharged from the discharging device, while limiting the supply of the fluid from the pump to the discharging device in the discharge continuous operation, and various kinds of variable elements.

(1-2) In the fluid discharging system of the present disclosure described above, in the discharge continuous operation, the supply of the fluid from the pump to the discharging device may be limited under a condition that a residual quantity of the fluid in the reservoir becomes below a given lower limit, and the limitation of the supply of the fluid from the pump to the discharging device may be canceled under a condition that the residual quantity of the fluid in the reservoir is recovered to satisfy a given limitation canceling condition. The time limit "t" may be defined based on a recovery period R required for the residual quantity of the fluid in the reservoir to recover the state satisfying the given limitation canceling condition after the residual quantity of the fluid in the reservoir becomes below the lower limit.

According to the fluid discharging system of the present disclosure, by having the above-described configuration, the time limit "t" can be set to be a value reflecting the recovery period R required for recovering the residual quantity of the fluid in the reservoir, which became below the given lower limit, until it becomes in the state where the given limitation canceling condition is satisfied. Therefore, according to the fluid discharging system of the present disclosure, the storage volume V of the fluid can be set as an optimal value in consideration of the recovery period R.

(1-3) In the fluid discharging system of the present disclosure described above, in the discharge continuous operation, the supply of the fluid from the pump to the discharging device may be limited under a condition that a residual quantity of the fluid in the reservoir becomes below a given lower limit, and the limitation of the supply of the fluid from the pump to the discharging device may be canceled under a condition that the residual quantity of the fluid in the reservoir is recovered to satisfy a given limitation canceling condition. The variable parameter "x" may be changed according to an operator who performs a recovery work for recovering the residual quantity of the fluid.

By having the above-described configuration, the fluid discharging system of the present disclosure can optimize the storage volume V of the fluid in the buffer tank in consideration of the variable elements, such as the skill level of the operator who performs the recovery work.

(1-4) In the fluid discharging system of the present disclosure described above, the parameter "x" may be changed according to an arriving period S required for the fluid to reach the buffer tank from the pump.

By having the above-described configuration, the fluid discharging system of the present disclosure can optimize the storage volume V of the fluid in the buffer tank in consideration of the arriving period S required for the fluid to reach the buffer tank from the pump.

(1-5) The fluid discharging system of the present disclosure includes the discharging device configured to discharge fluid, the pump, having the reservoir configured to store the fluid, and configured to supply the fluid stored in the reservoir to the discharging device, the supply line connecting the discharging device with the pump to allow the fluid to pass therethrough, and the buffer tank, disposed at the intermediate location of the supply line, and configured to suck and discharge the fluid, and is capable of continuing supply of the fluid to the discharging device by discharging the fluid from the buffer tank to the supply line, while limiting the supply of the fluid from the pump to the discharging device. The buffer tank may realize a pressure acting state where pressure acts on the fluid, and a holding state where no pressure acts on the fluid.

The fluid discharging system of the present disclosure is configured so that the buffer tank can realize the pressure acting state where the pressure acts on the fluid. Thus, when supplying the fluid from the buffer tank to the discharging device while stopping the pumping by the pump, the fluid discharging system of the present disclosure can pump the fluid to the discharging device by making the buffer tank into the pressure acting state and applying the pressure to the fluid toward the outside of the buffer tank. Therefore, the fluid discharging system of the present disclosure can suppress pressure fluctuation due to the supply source of the fluid to the discharging device changing from the pump to the buffer tank.

Further, for example, when sucking the fluid into the buffer tank, the fluid discharging system of the present disclosure can smoothly suck the fluid into the buffer tank by making the buffer tank into the pressure acting state so that the pressure in the direction toward the inside of the buffer tank acts on the fluid. Therefore, it is possible to suck the fluid into the buffer tank, prior to the supply of the fluid from the buffer tank to the discharging device, thereby contributing to stable supply of the fluid to the discharging device.

Note that, according to the present disclosure, the pressure acting state where the buffer tank applies the pressure to the fluid may be realized by changing a balance between the pressure on the buffer tank side and the pressure on the supply line side. The fluid discharging system of the present disclosure may be configured so that the balance between the pressure on the buffer tank side and the pressure on the supply line side is actively changeable, for example, by providing a device capable of depressurizing or pressurizing the buffer tank side, or so that the balance between the pressure on the buffer tank side and the pressure on the supply line side is changeable, for example, as a result of communicating the buffer tank side with the outside environment.

The fluid discharging system of the present disclosure is configured so that the buffer tank can realize the holding state where no pressure acts on the fluid, in addition to the pressure acting state described above. Thus, for example, when making the discharging device discharge the fluid supplied from the pump without using the buffer tank, or when the residual quantity of the fluid in the discharging device is enough, it can be suppressed that the supply pressure of the fluid to the discharging device is changed due to the influence of the buffer tank, or the discharge pressure of the fluid in the discharging device is changed. Therefore, according to the present disclosure, it is possible to suppress the change in the supply pressure of the fluid to the discharging device due to the pressure acting on the fluid from the buffer tank, and the change in the discharge pressure in the discharging device.

The fluid discharging system of the present disclosure can stably supply the fluid to the discharging device by performing the operation described above, without providing a plurality of pumps. Therefore, the fluid discharging system of the present disclosure can suppress the increase in the installation space and the cost, as compared with the case where a plurality of pumps are provided.

(1-6) In the fluid discharging system of the present disclosure, as the pressure acting state where pressure acts on the fluid, the buffer tank may realize a pressurized state where a pressurizing force acts on the fluid, and a depressurized state where a decompression force acts on the fluid.

According to the fluid discharging system of the present disclosure, by making the buffer tank into the pressurized state, for example, in a case where the fluid is supplied from the buffer tank toward the discharging device, the fluid can be pumped to the discharging device. Therefore, the fluid discharging system of the present disclosure can suppress the pressure fluctuation due to the supply source of the fluid to the discharging device changing from the pump to the buffer tank. Further, by making the buffer tank into the depressurized state, for example, when sucking the fluid into the buffer tank, the fluid discharging system of the present disclosure can smoothly suck the fluid into the buffer tank. Thus, the fluid discharging system of the present disclosure can pump the fluid toward the discharging device by making the buffer tank into the pressurized state where the pressure is applied, and suck the fluid smoothly by making the buffer tank into the depressurized state. Therefore, according to the present disclosure, the fluid discharging system can be provided, which is capable of stably supplying the fluid to the discharging device while suppressing the increase in the installation space and the cost.

(1-7) In the fluid discharging system of the present disclosure, the buffer tank may include a tank part connected to the supply line, and configured to allow the fluid to flow out of and into the tank part, and a variable volume mechanism configured to change a volume of a communicating space communicating with the supply line in the tank part. The variable volume mechanism may achieve the pressurized state by reducing the volume of the communicating space, achieve the depressurized state by increasing the volume of the communicating space, and achieve the holding state by stopping the change in the volume of the communicating space.

According to such a configuration, by controlling the change in the volume of the communicating space in the buffer tank, the fluid discharging system capable of realizing the pressurized state, the depressurized state, and the holding state can be provided. Therefore, according to the present disclosure, it is possible to provide the fluid discharging system which can control the state of the buffer tank suitably by controlling the increase and decrease in the volume of the communicating space and stably supply the fluid to the discharging device.

(1-8) In the fluid discharging system of the present disclosure, the variable volume mechanism may include a partition part dividing the inside of the tank part into the communicating space and a non-communicating space not communicating with the supply line, and an actuator configured to move the partition part. The pressurized state, the depressurized state, and the holding state may be achieved by controlling movement of the partition part by the actuator.

According to such a configuration, by the movement control of the partition part which separates the communicating space and the non-communicating space in the buffer tank, the fluid discharging system capable of realizing the pressurized state, the depressurized state, and the holding state can be provided. Therefore, according to the present disclosure, it is possible to provide the fluid discharging system which can control the state of the buffer tank suitably by controlling the movement of the partition part, and stably supply the fluid to the discharging device.

(1-9) In the fluid discharging system of the present disclosure, the actuator may change pressure acting on the partition part via the fluid in the non-communicating space to move the partition part. The pressurized state may be achieved by increasing the pressure acting on the partition part on the non-communicating space side, the depressurized state may be achieved by reducing the pressure acting on the partition part on the non-communicating space side, and the holding state may be achieved by stopping the change in the pressure acting on the partition part on the non-communicating space side.

According to such a configuration, by controlling the pressure acting on the partition part which separates the communicating space and the non-communicating space in the buffer tank, the fluid discharging system capable of realizing the pressurized state, the depressurized state, and the holding state can be provided. Therefore, according to the present disclosure, it is possible to provide the fluid discharging system which can control the state of the buffer tank suitably by controlling the pressure acting on the partition part and stably supply the fluid to the discharging device.

(1-10) The fluid discharging system of the present disclosure may include a cylinder device configured to exert a driving force by outflow and inflow of the fluid therethrough. The drive of the cylinder device may be controlled to adjust an acting state of the fluid.

According to such a configuration, it is possible to provide the fluid discharging system which can control the state of the buffer tank suitably by controlling the drive of the cylinder device and stably supply the fluid to the discharging device.

(1-11) In the fluid discharging system of the present disclosure, the buffer tank may include a position changing member configured to change in the position within a given varying range according to a residual quantity of the fluid, and a detecting device configured to detect the position of the position changing member. The residual quantity of the fluid in the buffer tank may be grasped based on a relationship between a volume of the buffer tank and the position of the position changing member.

According to such a configuration, the residual quantity of the fluid in the buffer tank can be detected continuously. Further, according to the above-described configuration, operation of the fluid discharging system can be controlled, while suitably setting or changing an upper limit and a lower limit of a storing amount of the fluid in the buffer tank.

(2-1) A fluid discharging system according to the second aspect of the present disclosure includes a discharging device configured to discharge fluid, a pump, having a reservoir and configured to pump the fluid stored in the reservoir to supply the fluid to the discharging device, a supply line connecting the pump with the discharging device to allow the fluid to pass therethrough, a buffer tank, disposed at an intermediate location of the supply line, and configured to suck and discharge the fluid, and a residual quantity grasping part configured to grasp a residual quantity of the fluid in the discharging device. Based on the residual quantify of the fluid grasped by the residual quantity grasping part, operation of the buffer tank is controlled.

The fluid discharging system of the present disclosure is provided with the buffer tank capable of sucking and discharging the fluid, in addition to the pump capable of supplying the fluid to the discharging device. Thus, the fluid discharging system of the present disclosure can operate so that the fluid is sucked into the buffer tank and accumulated therein, and the fluid is supplied at a suitable timing by being discharged from the buffer tank. Therefore, the fluid discharging system of the present disclosure can operate the pump and the buffer tank complementarily so that the fluid can be stably supplied to the discharging device.

Further, according to the fluid discharging system of the present disclosure, the operation of the buffer tank can be controlled based on the residual quantify of the fluid in the discharging device grasped by the residual quantity grasping part. Thus, the fluid discharging system of the present disclosure can control the suction operation and the discharge operation of the fluid in the buffer tank so that the operations are performed suitably according to the residual quantity of the fluid in the discharging device. Therefore, according to the fluid discharging system of the present disclosure, it is possible to minimize risks of insufficient residual quantity and excessive residual quantity of the fluid in the discharging device.

The fluid discharging system of the present disclosure can stably supply the fluid to the discharging device by performing the operation described above, without providing a plurality of pumps. Therefore, the fluid discharging system of the present disclosure can suppress the increase in the installation space and the cost, as compared with the case where a plurality of pumps are provided.

(2-2) In the fluid discharging system of the present disclosure, the residual quantity grasping part may include a pressure detecting device disposed in the supply line between the buffer tank and the discharging device, or disposed in the discharging device. Based on a measurement of the pressure detecting device, the residual quantity of the fluid in the discharging device may be grasped.

According to such a configuration, the residual quantity of the fluid in the discharging device can be grasped appropriately based on the pressure detected by the pressure detecting device. Therefore, according to the fluid discharging system of the present disclosure, the fluid can be appropriately and stably supplied to the discharging device so that the insufficiency or excess of the residual quantity of the fluid in the discharging device does not occur, by suitably operating the pump and the buffer tank according to the residual quantity of the fluid in the discharging device.

(2-3) In the fluid discharging system of the present disclosure, when the supply of the fluid by the pump is limited, the buffer tank may discharge the fluid so that continuous supply of the fluid to the discharging device is possible.

The fluid discharging system of the present disclosure can compensate for a decrease in the supplying capability in connection with the limitation of the supply of the fluid by the pump, by the discharge of the fluid by the buffer tank. Thus, the fluid discharging system of the present disclosure can appropriately and stably supply the fluid to the discharging device so that the insufficiency of the residual quantity of the fluid in the discharging device does not occur, even if the supply of the fluid by the pump is inevitably limited, for example, as a result of the insufficiency of the residual quantity of the fluid in the pump.

(2-4) The fluid discharging system of the present disclosure may perform, when supplying the fluid to the discharging device, one or both of making the buffer tank discharge the fluid under a condition that the residual quantity of the fluid in the discharging device grasped by the residual quantity grasping part becomes below a given lower limit, and making the buffer tank stop the discharge of the fluid under a condition that the residual quantity of the fluid in the discharging device grasped by the residual quantity grasping part becomes above a given upper limit.

When supplying the fluid to the discharging device, by making the buffer tank discharge the fluid under the condition that the residual quantity of the fluid in the discharging device becomes below the given lower limit, the fluid discharging system of the present disclosure can achieve the stable supply of the fluid to the discharging device. In detail, even if the supply of the fluid by the pump is inevitably limited, for example, as a result of the insufficiency of the residual quantity of the fluid in the pump, the fluid discharging system of the present disclosure can supply the fluid to the discharging device from the buffer tank when the residual quantity of the fluid in the discharging device becomes below the given lower limit, thereby suppressing the insufficiency of the residual quantity of the fluid in the discharging device.

Further, by making the buffer tank stop the discharge of the fluid under the condition that the residual quantity of the fluid in the discharging device becomes above the given upper limit, the fluid discharging system of the present disclosure can suppress the excessive supply of the fluid to the discharging device. Therefore, it can be suppressed that a problem, such as unstable supply pressure, discharge pressure, or discharge amount of the fluid in the discharging device, for example, occurs.

(2-5) In the fluid discharging system of the present disclosure, the buffer tank may be configured to accumulate the fluid inside the buffer tank by sucking the fluid. During the accumulation of the fluid, the discharge of the fluid by the discharging device may continue.

In the fluid discharging system of the present disclosure, the discharging device can continue the discharge of the fluid also during the accumulation of the fluid in the buffer tank. Therefore, the fluid discharging system of the present disclosure can minimize a decrease in productivity, for example, due to suspension of the discharge of the fluid by the discharging device for the accumulation of the fluid in the buffer tank.

(2-6) The fluid discharging system of the present disclosure may perform, when accumulating the fluid in the buffer tank, one or both of making the buffer tank suck the fluid under a condition that the residual quantity of the fluid in the discharging device grasped by the residual quantity grasping part becomes above a given upper limit, and making the buffer tank stop the suction of the fluid under a condition that the residual quantity of the fluid in the discharging device grasped by the residual quantity grasping part becomes below a given lower limit.

By making the buffer tank suck the fluid under the condition that the residual quantity of the fluid in the discharging device becomes above the given upper limit, the fluid discharging system of the present disclosure can effectively utilize a period during which the discharging device does not need to be supplied with the fluid, so that the buffer tank can suck and accumulate the fluid. Further, by having such a configuration, the fluid discharging system of the present disclosure can suppress that the fluid is supplied to the discharging device excessively when the supply of the fluid to the discharging device is unnecessary. Therefore, it can be suppressed that a problem, such as unstable supply pressure, discharge pressure, or discharge amount of the fluid in the discharging device, for example, occurs.

Further, by making the buffer tank stop the suction of the fluid under the condition that the residual quantity of the fluid in the discharging device becomes below the given lower limit, the fluid discharging system of the present disclosure can supply the fluid to the discharging device with higher priority than the buffer tank, when the residual quantity of the fluid in the discharging device is decreased. Therefore, the fluid discharging system of the present disclosure can suppress that poor discharge occurs due to the insufficient residual quantity of the fluid. Note that, as for the grasping of the residual quantity of the fluid in the discharging device, the amount of the fluid may be derived and grasped directly or indirectly, for example, by a method of directly measuring and deriving the amount by using a residual quantity sensor etc., disposed in the discharging device, or a method of deriving the amount by detecting an inflow rate and an outflow rate of the fluid into/from the discharging device, and subtracting one amount from the other, or the amount may be grasped indirectly based on time of the inflow and outflow of the fluid into/from the discharging device.

(2-7) In the fluid discharging system of the present disclosure, the buffer tank may be configured to accumulate the fluid inside the buffer tank by sucking the fluid. When limiting the supply of the fluid by the pump, the buffer tank may discharge the fluid accumulated therein so that the continuous supply of the fluid to the discharging device is possible. In both the accumulation of the fluid and the supply of the fluid, the operation of the buffer tank may be controlled based on the residual quantity of the fluid in the discharging device grasped by the residual quantity grasping part.

According to the fluid discharging system of the present disclosure, when limiting the supply of the fluid by the pump, by the buffer tank discharging the fluid accumulated therein, the supply of the fluid to the discharging device can continue. Further, in both the accumulation of the fluid and the supply of the fluid, the operation of the buffer tank is controlled based on the residual quantity of the fluid in the discharging device. Therefore, the fluid discharging system of the present disclosure can operate the pump and the buffer tank complementarily to each other so that the fluid can be stably supplied to the discharging device.

(2-8) In the fluid discharging system of the present disclosure, the buffer tank may perform, when accumulating the fluid, at least one of an operation of sucking the fluid under a condition that the residual quantity of the fluid in the discharging device grasped by the residual quantity grasping part becomes above a given first upper limit, and an operation of stopping the suction of the fluid under a condition that the residual quantity of the fluid in the discharging device grasped by the residual quantity grasping part becomes below a given first lower limit. The buffer tank may perform, when supplying the fluid, at least one of an operation of discharging the fluid under a condition that the residual quantity of the fluid in the discharging device grasped by the residual quantity grasping part becomes below a given second lower limit, and an operation of stopping the discharge of the fluid under a condition that the residual quantity of the fluid in the discharging device grasped by the residual quantity grasping part becomes above a given second upper limit.

According to the fluid discharging system of the present disclosure, the control for the accumulation in the buffer tank is performed based on the first upper limit and the first lower limit for the residual quantity of the fluid in the discharging device. In detail, the fluid discharging system of the present disclosure can accumulate the fluid in the buffer tank when the residual quantity of the fluid in the discharging device becomes above the first upper limit, and stop the accumulation of the fluid in the buffer tank when the residual quantity of the fluid in the discharging device becomes below the given first lower limit. Therefore, the fluid discharging system of the present disclosure can accumulate the fluid in the buffer tank at a suitable timing, according to the residual quantity of the fluid in the discharging device.

Further, according to the fluid discharging system of the present disclosure, the control for the discharge of the fluid from the buffer tank is performed based on the second upper limit and the second lower limit for the residual quantity of the fluid in the discharging device. In detail, the fluid discharging system of the present disclosure can discharge and supply the fluid to the discharging device when the residual quantity of the fluid in the discharging device becomes below the second lower limit, and stop the discharge of the fluid to stop the supply to the discharging device when the residual quantity becomes above the second upper limit. Therefore, the fluid discharging system of the present disclosure can discharge the fluid from the buffer tank at a suitable timing, according to the residual quantity of the fluid in the discharging device.

Note that, as for the grasping of the residual quantity of the fluid in the discharging device, the amount of the fluid may be derived and grasped directly or indirectly, for example, by a method of directly measuring and deriving the amount by using a residual quantity sensor etc., disposed in the discharging device, or a method of deriving the amount by detecting an inflow rate and an outflow rate of the fluid into/from the discharging device, and subtracting one amount from the other, or the amount may be grasped indirectly based on time of the inflow and outflow of the fluid into/from the discharging device.

(2-9) In the fluid discharging system of the present disclosure, the buffer tank may include a position changing member configured to change in the position within a given varying range according to the residual quantity of the fluid, and a detecting device configured to detect the position of the position changing member. The residual quantity of the fluid in the buffer tank may be grasped based on a relationship between the volume of the buffer tank and the position of the position changing member.

According to such a configuration, the residual quantity of the fluid in the buffer tank can be detected continuously. Further, according to the above-described configuration, the operation of the fluid discharging system can be controlled, while suitably setting or changing the upper limit and the lower limit of the storing amount of the fluid in the buffer tank.

(3-1) A fluid discharging system according to the third aspect of the present disclosure includes a discharging device configured to discharge fluid, a pump, having a reservoir and configured to pump the fluid stored in the reservoir to supply the fluid to the discharging device, a supply line connecting the discharging device with the pump to allow the fluid to pass therethrough, and a buffer tank, disposed at an intermediate location of the supply line, and configured to suck and discharge the fluid. The fluid discharging system of the present disclosure is capable of performing operation in a tank accumulation mode in which the fluid is sucked and accumulated in the buffer tank, operation in a pump supply mode in which the fluid is supplied from the pump to the discharging device, while limiting the discharge of the fluid by the buffer tank, operation in a tank supply mode in which the fluid is discharged to be supplied to the discharging device from the buffer tank while limiting the supply of the fluid to the discharging device by the pump, and operation in a multiple supply mode in which the fluid is supplied to the discharging device from both the pump and the buffer tank.

The fluid discharging system of the present disclosure is provided with the buffer tank in the supply line connecting the discharging device with the pump. The fluid discharging system of the present disclosure can perform not only the operation in the pump supply mode in which the fluid is supplied to the discharging device from the pump but also the operation using the buffer tank. In detail, the fluid discharging system of the present disclosure can perform the operation in the tank accumulation mode in which the fluid is sucked and accumulated in the buffer tank, the operation in the tank supply mode in which the fluid is discharged to be supplied to the discharging device from the buffer tank while limiting the supply of the fluid to the discharging device by the pump, and the operation in the multiple supply mode in which the fluid is supplied to the discharging device from both the pump and the buffer tank. Therefore, by performing the operation in each operating mode one by one, the fluid discharging system of the present disclosure can use the pump and the buffer tank complementarily for supplying the fluid to the discharging device, and can achieve the stable supply of the fluid to the discharging device.

(3-2) In the fluid discharging system of the present disclosure, during performing the operation in the tank supply mode, the operation may transit to the operation in the multiple supply mode under a condition that the residual quantity of the fluid in the buffer tank becomes below a given value.

According to such a configuration, before the fluid in the buffer tank is used up in the operation in the tank supply mode, the operating mode is switched to the multiple supply mode so that the fluid can be supplied to the discharging device. Thus, it can be suppressed that the supply of the fluid to the discharging device becomes impossible during the operation in the tank supply mode. Therefore, according to the above-described configuration, the stable supply of the fluid to the discharging device can be achieved.

(3-3) In the fluid discharging system of the present disclosure, during performing the operation in the pump supply mode, the operation may transit to the operation in the tank supply mode under a condition that the residual quantity of the fluid in the reservoir of the pump becomes below a given value. During performing the operation in the tank supply mode, the operation may transit to the operation in the multiple supply mode under a condition that the residual quantity of the fluid in the buffer tank becomes below a given value. During performing the operation in the multiple supply mode, the operation may transit to the operation in the tank accumulation mode under a condition that the residual quantity of the fluid in the buffer tank reaches a lower limit. During performing the operation in the tank accumulation mode, the operation may transit to the operation in the pump supply mode under a condition that the residual quantity of the fluid in the buffer tank becomes above a given value.

During performing the operation in the pump supply mode, the fluid discharging system of the present disclosure can transit to the operation in the tank supply mode under the condition that the residual quantity of the fluid in the reservoir of the pump becomes below the given value. Thus, according to the fluid discharging system of the present disclosure, the operating mode is switched to the tank supply mode before the supply of the fluid to the discharging device from the pump becomes impossible, so that the supply of the fluid to the discharging device can be stably continued. Further, during performing the operation in the tank supply mode, the fluid discharging system of the present disclosure transits to the operation in the multiple supply mode under the condition that the residual quantity of the fluid in the buffer tank becomes below the given value. Thus, the operating mode is switched to the multiple supply mode before the supply of the fluid to the discharging device from the buffer tank becomes impossible, so that the supply of the fluid to the discharging device can be stably continued. Further, during performing the operation in the multiple supply mode, the fluid discharging system of the present disclosure transits to the operation in the tank accumulation mode under the condition that the residual quantity of the fluid in the buffer tank reaches the lower limit. Thus, the fluid can be accumulated in the buffer tank to prepare for a next timing at which the fluid should be supplied to the discharging device using the buffer tank. Further, during performing the operation in the tank accumulation mode, the fluid discharging system of the present disclosure can transit to the operation in the pump supply mode under the condition that the fluid has accumulated until the residual quantity of the fluid in the buffer tank becomes above the given value. By performing the operation in each operating mode while switching one by one, the fluid discharging system of the present disclosure can use the pump and the buffer tank complementarily for supplying the fluid to the discharging device, and can achieve the stable supply of the fluid to the discharging device.

(3-4) In the fluid discharging system of the present disclosure, during performing the operation in the pump supply mode, the operation may transit to the operation in the tank accumulation mode under a condition that the residual quantity of the fluid in the reservoir of the pump becomes below a given value. During performing the operation in the tank accumulation mode, the operation may transit to the operation in the tank supply mode when one or more of a condition that the residual quantity of the fluid in the buffer tank becomes above a given value, and a condition that the residual quantity of the fluid in the reservoir reaches a lower limit, is satisfied. During performing the operation in the tank supply mode, the operation may transit to the operation in the multiple supply mode under a condition that the residual quantity of the fluid in the buffer tank becomes below a given value. During performing the operation in the multiple supply mode, the operation may transit to the operation in the pump supply mode under a condition that the residual quantity of the fluid in the buffer tank reaches a lower limit.

During performing the operation in the pump supply mode, the fluid discharging system of the present disclosure can transit to the operation in the tank accumulation mode under the condition that the residual quantity of the fluid in the reservoir of the pump becomes below the given value. Thus, according to the fluid discharging system of the present disclosure, the operating mode is switched to the tank accumulation mode before the supply of the fluid to the discharging device from the pump becomes impossible, so that the fluid can be accumulated in the buffer tank. Further, during performing the operation in the tank accumulation mode, the fluid discharging system of the present disclosure transits to the operation in the tank supply mode when one or more of the condition that the fluid is accumulated in the buffer tank until the given value is exceeded, and the condition that the residual quantity of the fluid in the reservoir reaches the lower limit, is satisfied. Thus, the fluid discharging system of the present disclosure becomes in the state where the fluid can be supplied to the discharging device from the buffer tank, instead of the pump. Further, during the operation in the tank supply mode, the fluid discharging system of the present disclosure transits to the operation in the multiple supply mode under the condition that the residual quantity of the fluid in the buffer tank has decreased to become below the given value. Thus, the fluid discharging system of the present disclosure can stably continue the supply of the fluid to the discharging device by supplementing the discharging capability of the fluid of the buffer tank by the operation of the pump. Further, during performing the operation in the multiple supply mode, the fluid discharging system of the present disclosure can transit to the operation in the pump supply mode under the condition that the residual quantity of the fluid in the buffer tank reaches the lower limit, thereby stably continuing the supply of the fluid to the discharging device. By performing the operation in each operating mode while switching one by one, the fluid discharging system of the present disclosure can use the pump and the buffer tank complementarily for supplying the fluid to the discharging device, and can achieve the stable supply of the fluid to the discharging device.

(3-5) The fluid discharging system of the present disclosure may include in the supply line a residual quantity grasping part configured to grasp a residual quantity of the fluid in the discharging device. In the tank accumulation mode, the pump supply mode, the tank supply mode, and the multiple supply mode, operations of the pump and the buffer tank may be controlled based on a measurement of the pressure detecting part.

According to such a configuration, the operations of the pump and the buffer tank can be controlled so that they operate under an optimal condition for the stable supply of the fluid in each operating mode, based on the residual quantity of the fluid in the discharging device grasped by the residual quantity grasping part.

(3-6) In the fluid discharging system of the present disclosure, the discharge of the fluid by the discharging device may continue during the operation in the tank accumulation mode.

According to such a configuration, the discharge of the fluid in the discharging device and the accumulation of the fluid in the buffer tank can be progressed concurrently. Therefore, the fluid discharging system of the present disclosure can minimize the decrease in the productivity, for example, due to the suspension of the discharge of the fluid in the discharging device for the accumulation of the fluid in the buffer tank.

(3-7) In the fluid discharging system of the present disclosure, the buffer tank may perform the suction operation intermittently in a state where the supply of the fluid by the pump continues in the tank accumulation mode.

According to such a configuration, the decrease in the residual quantity of the fluid in the discharging device in connection with the suction operation of the buffer tank can be minimized. Therefore, the supplying state of the fluid to the discharging device can be further stabilized.

(3-8) The fluid discharging system of the present disclosure may include in the supply line a residual quantity grasping part configured to grasp a residual quantity of the fluid in the discharging device. The buffer tank may perform the suction operation under a condition that a measurement of the residual quantity grasping part becomes above a given upper limit.

According to such a configuration, it is possible to minimize a problem, such as unstable supply pressure, discharge pressure, and discharge amount of the fluid in the discharging device due to the decrease in the residual quantity of the fluid in the discharging device in connection with the suction operation of the buffer tank. Therefore, the supplying state of the fluid to the discharging device can be further stabilized.

(3-9) In the fluid discharging system of the present disclosure, in the multiple supply mode, the fluid in the buffer tank may be consumed with higher priority than the fluid stored in the reservoir.

According to such a configuration, the fluid accumulated in the buffer tank can be used with priority in the multiple supply mode. Therefore, it is possible to minimize a concern of deterioration etc. of the fluid in connection with the accumulation of the fluid in the buffer tank.

(3-9) In the fluid discharging system of the present disclosure, the buffer tank may include a position changing member configured to change in the position within a given varying range according to a residual quantity of the fluid, and a detecting device configured to detect the position of the position changing member. The residual quantity of the fluid in the buffer tank may be grasped based on a relationship between a volume of the buffer tank and the position of the position changing member.

According to such a configuration, the residual quantity of the fluid in the buffer tank can be detected continuously. Further, according to the above-described configuration, the operation of the fluid discharging system can be controlled, while suitably setting or changing the upper limit and the lower limit of the storing amount of the fluid in the buffer tank.

Effect of the Disclosure

According to the present disclosure, the fluid discharging system can be provided which is capable of stably supplying fluid to the discharging device while suppressing the increase in the installation space and cost.

MODES FOR CARRYING OUT THE DISCLOSURE

Hereinafter, a fluid discharging system 10 according to one embodiment of the present disclosure is described in detail with reference to the drawings. Note that, in the following description, a configuration of the fluid discharging system 10 is first described, and operation of the fluid discharging system 10 is then described.

<<Configuration of Fluid Discharging System 10>>

Figure 1:
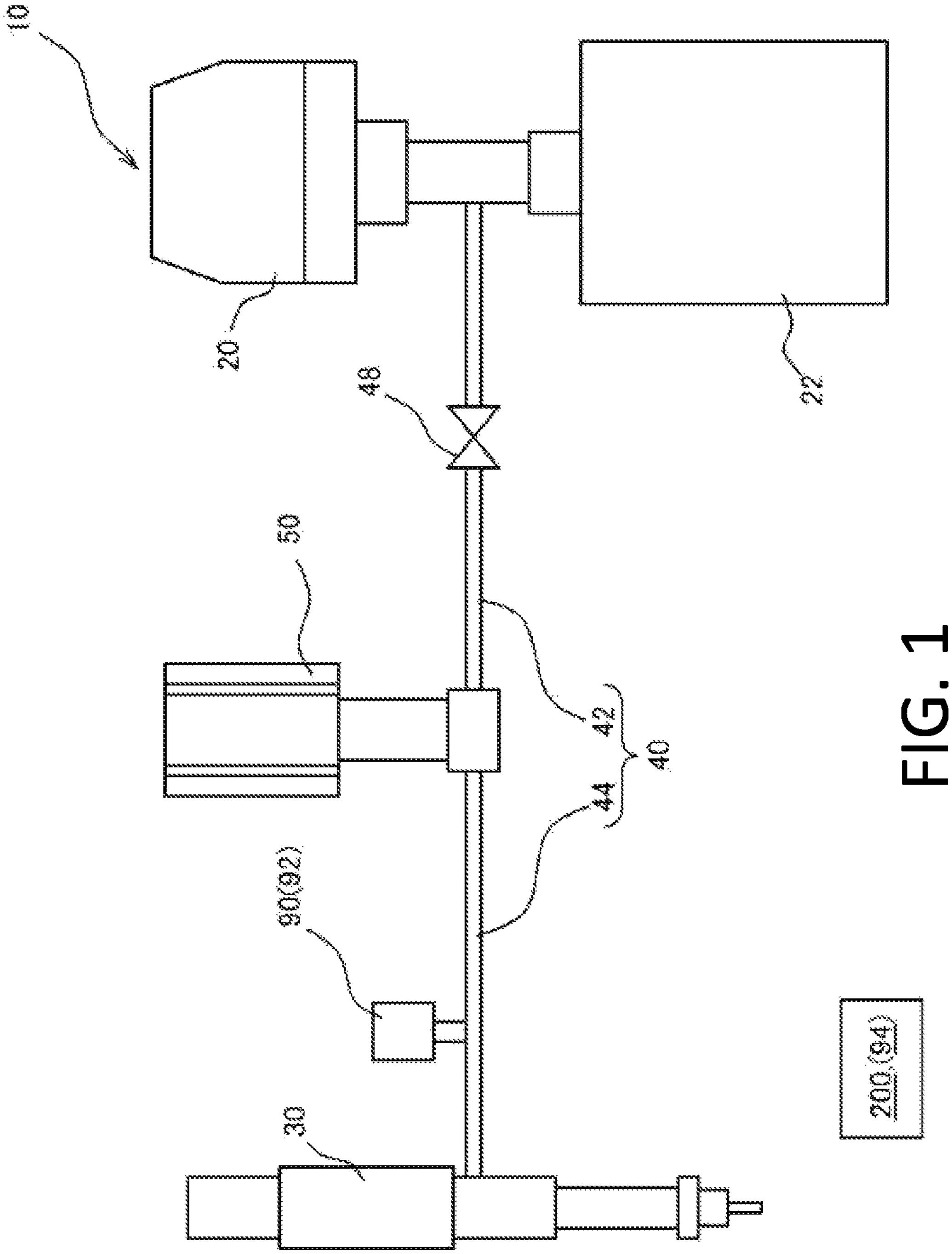
FIG. 1 is a schematic diagram illustrating one example of a fluid discharging system of the present disclosure.

As illustrated in FIG. 1, the fluid discharging system 10 is configured so that a pump 20 is connected with a discharging device 30 through a supply line 40. The fluid discharging system 10 is configured so that a buffer tank 50 is provided at an intermediate location of the supply line 40. Further, the fluid discharging system 10 is provided with a residual quantity grasping part 90 for grasping a residual quantity of fluid in the discharging device 30. Further, the fluid discharging system 10 is provided with a control device 200 for controlling operations of the pump 20, the discharging device 30, and the buffer tank 50. The fluid discharging system 10 can discharge the fluid supplied from the pump 20 or the buffer tank 50 toward a workpiece at the discharging device 30.

The pump 20 is a device for pumping up and pumping fluid from a reservoir 22 where the fluid is stored. The pump 20 is piping-connected to the supply line 40. Therefore, the fluid pumped up by the pump 20 from the reservoir can be pumped to the discharging device 30 side via the supply line 40.

Figure 2:
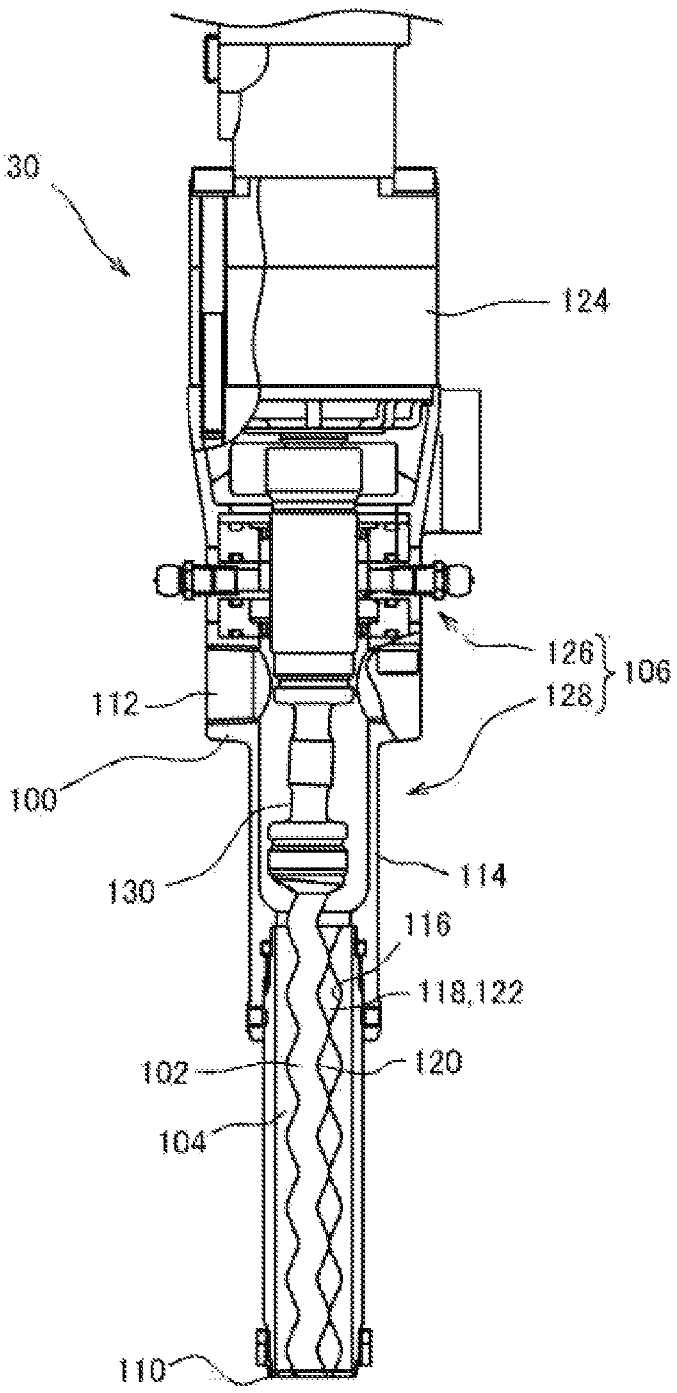
FIG. 2 is a cross-sectional view illustrating one example of a discharging device used for the fluid discharging system of FIG. 1.

The discharging device 30 is comprised of a rotary displacement pump. In this embodiment, the discharging device 30 is comprised of a so-called uniaxial eccentric screw pump. As illustrated in FIG. 2, the discharging device 30 is configured so that a rotor 102, a stator 104, a power transmission mechanism 106, etc. are accommodated inside a casing 100. The casing 100 is a cylindrical member made of metal, which is provided with a first opening 110 on one end side in the longitudinal direction. Further, a second opening 112 is provided to an outer circumferential part of the casing 100. The second opening 112 communicates with an interior space of the casing 100 at an intermediate part 114 located at an intermediate portion of the casing 100 in the longitudinal direction.

The first opening 110 and the second opening 112 are parts which function as a suction port and a discharge port of the uniaxial eccentric screw pump which constitutes the discharging device 30, respectively. The discharging device 30 can rotate the rotor 102 in the positive direction to make the first opening 110 function as the discharge port, and the second opening 112 as the suction port. Further, it can rotate the rotor 102 in the opposite direction to make the first opening 110 function as the suction port, and the second opening 112 as the discharge port.

The stator 104 is a member having a substantially cylindrical appearance shape made of an elastic material, such as rubber, or resin. An inner circumferential wall 116 of the stator 104 is formed in a female thread shape of single twist or multiple twists with n grooves. In this embodiment, the stator 104 is formed in a female thread shape of multiple twists with two grooves. Further, even if a penetration bore 118 of the stator 104 is cross-sectioned at any position in the longitudinal direction of the stator 104, it is formed so that its cross-sectional shape (aperture shape) is a substantially elongated circle or oval.

The rotor 102 is a metal shaft body, and is formed in a male thread shape of single twist or multiple twists with n−1 grooves. In this embodiment, the rotor 102 is formed in an eccentric male thread shape with one groove. Even if the rotor 102 is cross-sectioned at any position in the longitudinal direction, it is formed so that its cross-sectional shape is substantially a true circle. The rotor 102 is fitted in the penetration bore 118 formed in the stator 104 described above, and it is eccentrically rotatable inside the penetration bore 118.

When the rotor 102 is fitted into the stator 104, an outer circumferential wall 120 of the rotor 102 becomes in a state where it closely contacts with the inner circumferential wall 116 of the stator 104 at their tangent lines. Therefore, a fluid carrying path 122 (cavity) is formed between the inner circumferential wall 116 of the stator 104 and the outer circumferential wall 120 of the rotor 102. The fluid carrying path 122 extends spirally in the longitudinal direction of the stator 104 and the rotor 102.

When the rotor 102 is rotated inside the penetration bore 118 of the stator 104, the fluid carrying path 122 advances in the longitudinal direction of the stator 104, while rotating inside the stator 104. Therefore, when the rotor 102 is rotated, it is possible to suck fluid into the fluid carrying path 122 from one end side of the stator 104, transfer this fluid toward the other end side of the stator 104 in a state where the fluid is trapped inside the fluid carrying path 122, and discharge it on the other end side of the stator 104. In detail, when the rotor 102 is rotated in the positive direction, operation (discharge operation) in which the fluid is sucked from the second opening 112, and is discharged from the first opening 110 can be performed. On the other hand, when the rotor 102 is rotated in the opposite direction, operation (pull-back operation) in which the fluid is sucked in the opposite direction from the discharge operation (i.e., from the first opening 110 side toward the second opening 112 side) can be performed.

The power transmission mechanism 106 is for transmitting motive power from an actuator 124 to the rotor 102 described above. The power transmission mechanism 106 has a power transmission part 126 and an eccentric rotation part 128. The power transmission part 126 is provided to one end side in the longitudinal direction of the casing 100. Further, the eccentric rotation part 128 is provided to the intermediate part 114. The eccentric rotation part 128 is a part which connects the power transmission part 126 with the rotor 102 so that power transmission is possible. The eccentric rotation part 128 is provided with a coupling shaft 130 which is comprised of a coupling rod, a screw rod, etc. which are conventionally known. Therefore, the eccentric rotation part 128 can transmit to the rotor 102 a rotational motive force generated by operating the actuator 124, to eccentrically rotate the rotor 102.

The supply line 40 is a passage which connects the pump 20 with the discharging device 30 so that the fluid can pass through between the pump 20 and the discharging device 30. The buffer tank 50 (described later in detail) is provided at an intermediate location of the supply line 40. In detail, the supply line 40 has a primary supply line 42 which connects the primary side of the buffer tank 50 (the upstream side of the fluid in the supply line 40) with the pump 20, and a secondary supply line 44 which connects the secondary side of the buffer tank 50 (the downstream side of the fluid in the supply line 40) with the discharging device 30.

A sensor 92 which constitutes the residual quantity grasping part 90 (described later in detail), and a valve 48 are provided at intermediate locations of the supply line 40. The sensor 92 may be one which can detect a state of the fluid in the supply line 40 (for example, a pressure gauge or a flowmeter). The sensor 92 is the pressure gauge in this embodiment. The sensor 92 is disposed in the supply line 40 between the discharging device 30 and the buffer tank 50. The valve 48 is disposed in the supply line 40 between the pump 20 and the buffer tank 50. The valve 48 is capable of limiting (intercepting in this embodiment) a flow of the fluid from the pump 20 to the discharging device 30 side. The valve 48 may be comprised of a so-called two-way valve, check valve (one-way valve), etc.

Figure 3:
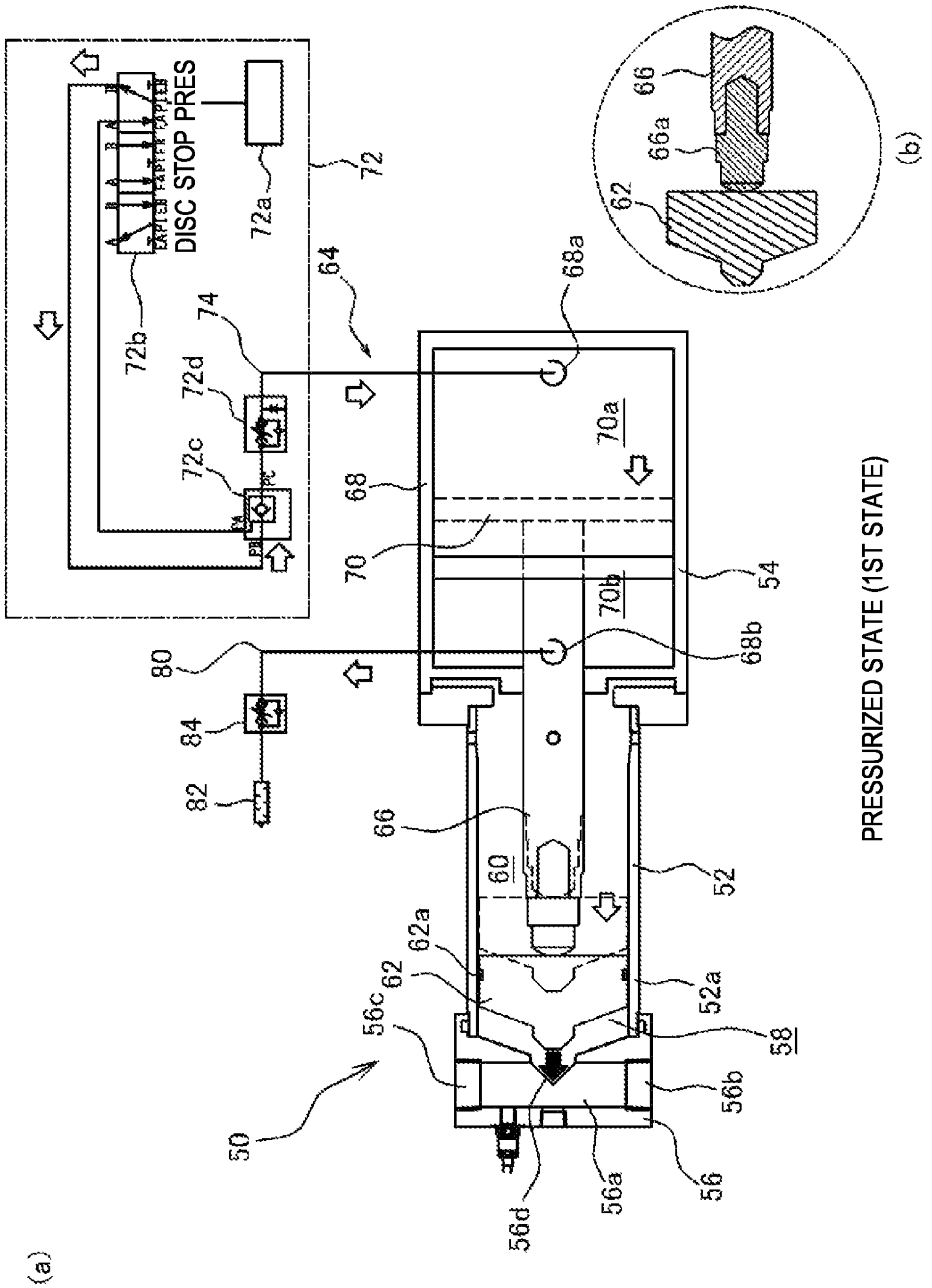
FIG. 3 (*a*) is a cross-sectional view illustrating a configuration of a buffer tank in a pressurized state, which is used for the fluid discharging system of FIG. 1, and (b) is a cross-sectional view in which a substantial part of (a) is enlarged.
Figure 4:
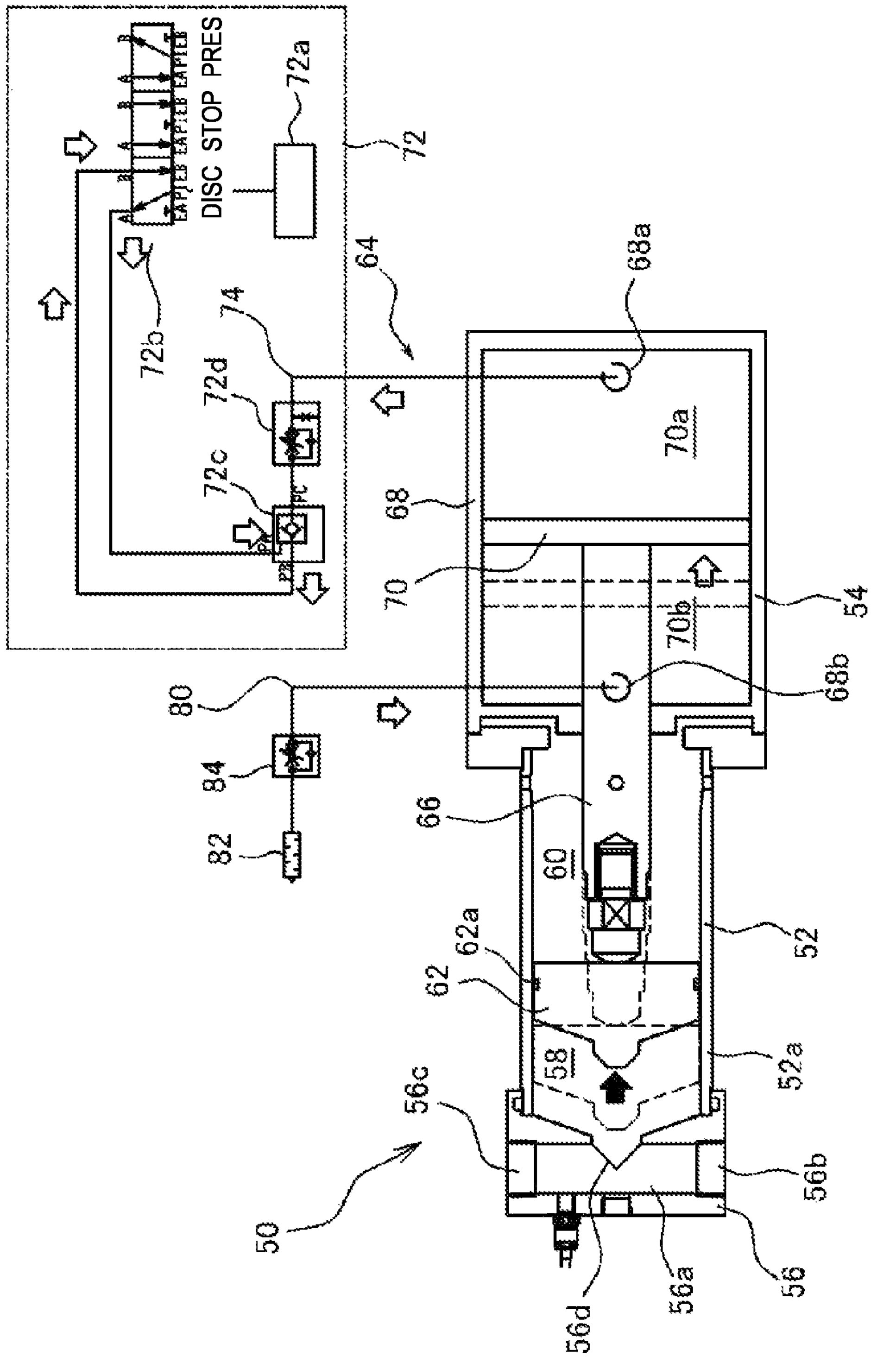
FIG. 4 is a cross-sectional view illustrating a configuration of the buffer tank in a depressurized state, which is used for the fluid discharging system of FIG. 1.
Figure 5:
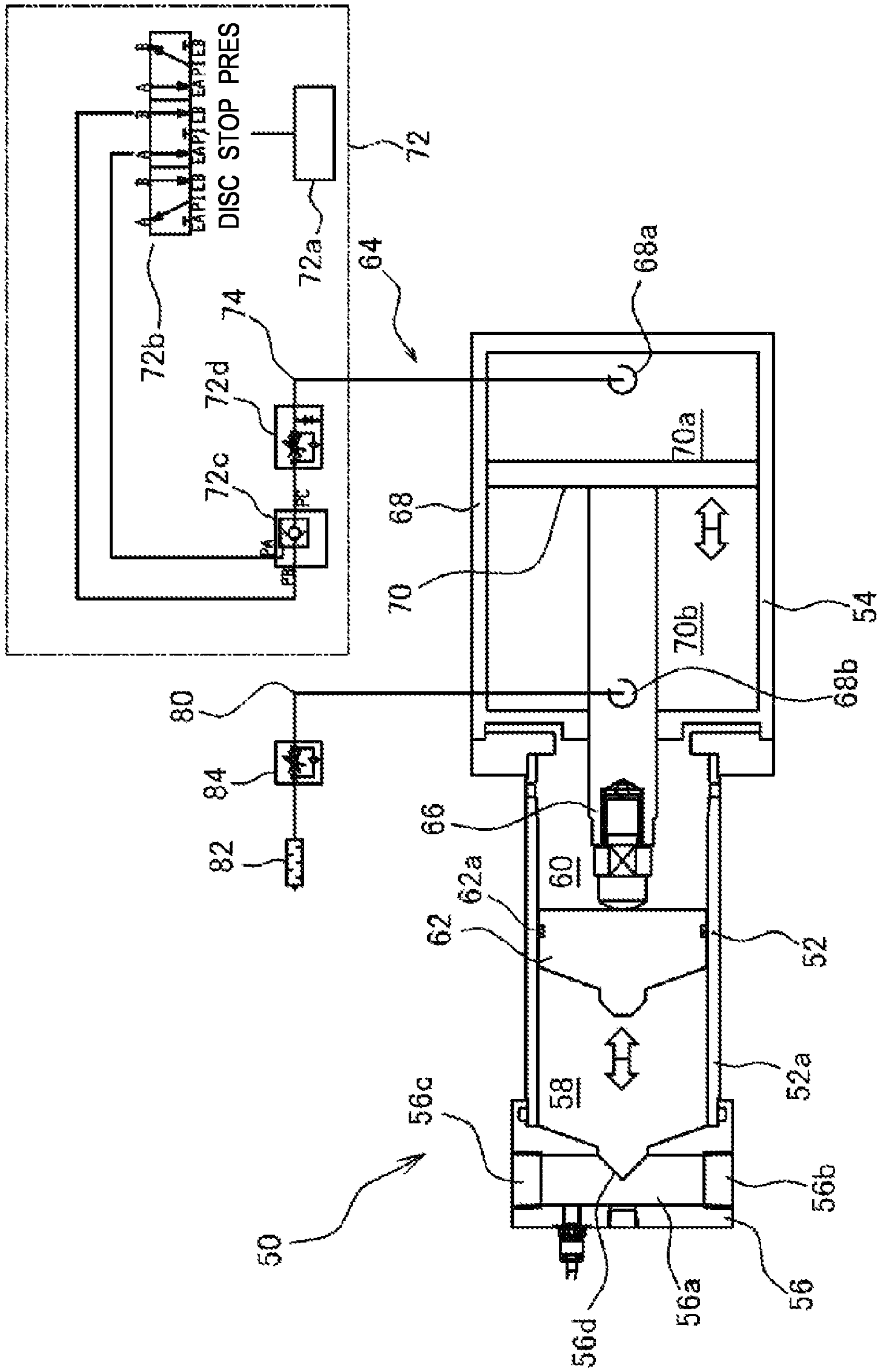
FIG. 5 is a cross-sectional view illustrating a configuration of the buffer tank in a holding state, which is used for the fluid discharging system of FIG. 1.

The buffer tank 50 is disposed at the intermediate location of the supply line 40 described above. The buffer tank 50 is capable of sucking and discharging the fluid. The buffer tank 50 sucks the fluid to accumulate the fluid therein. Further, when the pump 20 suspends the supply of the fluid, the buffer tank 50 can discharge the fluid accumulated therein so that the supply of the fluid to the discharging device 30 can continue. The operation of the buffer tank 50 is controlled by the control device 200 according to the residual quantity of the fluid in the discharging device 30. As illustrated in FIGS. 3 to 5, the buffer tank 50 has a tank part 52 and a variable volume mechanism 54.

The tank part 52 can make the fluid flow into/from the supply line 40. In this embodiment, the tank part 52 is provided with a connecting part 56 on one end side of a cylindrical (substantially cylindrical in this embodiment) tank body **52*a* extending in a given axial direction, and is provided with a communicating space 58 and a non-communicating space 60 inside the tank body 52*a***.

The connecting part 56 is provided on one end side in the axial direction of the tank body **52*a* which constitutes the tank part 52. The connecting part 56 is a part connected to the supply line 40. The connecting part 56 has a passage 56*a* which extends in a direction intersecting with the axial direction of the tank part 52 (in this embodiment, the radial direction). The connecting part 56 has connection openings 56*b* and 56*c* at both ends of the passage 56*a*. The connection openings 56*b* and 56*c* open in the circumferential part of the tank part 52, and are connectable with piping which constitutes the supply line 40. Further, the connecting part 56 has a communicating hole 56*d* at an intermediate part in the radial direction of the tank part 52. The tank part 52** communicates the passage 56*a* with the interior space (communicating space 58) of the tank body 52*a* via the communicating hole 56*d*.

The communicating space 58 is a space in the tank part 52, which is provided on the side where the connecting part 56 is provided. The communicating space 58 is formed so as to communicate with the supply line 40 via the connecting part 56 described above. Therefore, the tank part 52 is capable of sucking and discharging the fluid from/into the communicating space 58, between the tank part 52 and the supply line 40 connected to the connecting part 56.

The non-communicating space 60 is a space which does not communicate with the supply line 40. The non-communicating space 60 is a space which is adjacent to the tank part 52 in the axial direction, on the opposite side from the connecting part 56 with respect to the communicating space 58. The non-communicating space 60 is separated from the communicating space 58 by a piston part 62 (partition part) of the variable volume mechanism 54 (described later in detail). An end of the non-communicating space 60 is connected to the variable volume mechanism 54. Therefore, the non-communicating space 60 communicates with a casing 68 which constitutes an actuator 64 of the variable volume mechanism 54.

The variable volume mechanism 54 is an operation mechanism which varies the volume of the communicating space 58 in the tank part 52. The variable volume mechanism 54 has the piston part 62 and the actuator 64, and the piston part 62 is movable by the actuator 64 in the axial direction of the tank part 52 inside the tank part 52. Therefore, the variable volume mechanism 54 can change the volumes (volume ratio) of the communicating space 58 and the non-communicating space 60 inside the tank part 52 by the actuator 64 changing the position of the piston part 62.

The piston part 62 divides the inside of the tank part 52 into the communicating space 58 and the non-communicating space 60. The piston part 62 is a piston in this embodiment. An outer diameter of the piston which constitutes the piston part 62 is substantially the same as an inner diameter of the tank part 52. Further, a sealing member 62*a* is attached to an outer circumferential part of the piston part 62. Therefore, the piston part 62 divides the interior space of the tank body 52*a* into the communicating space 58 and the non-communicating space 60, while sealing so that liquid such as the fluid, and gas do not leak.

The actuator 64 is for moving the piston part 62 in the axial direction inside the tank body 52*a*. The actuator 64 has a rod part 66, a casing 68, a partition 70, and a ventilation device 72. The rod part 66 is inserted into the tank body 52*a* from the non-communicating space 60 side. The rod part 66 is disposed so as to extend in the axial direction of the tank body 52*a*. The piston part 62 is connected to one end side of the rod part 66. As for the connecting part between the rod part 66 and the piston part 62, they may be integrated, for example, by forming a female thread on one of the rod part 66 and the piston part 62, forming a male thread on the other, and threadedly engaging one with the other, or by using a fastener, such as a screw or a bolt. Further, without fixing and integrating the piston part 62 and the rod part 66 like this embodiment, the piston part 62 may be connected to the rod part 66 by bringing the piston part 62 in contact with a tip-end part of the rod part 66. Further, the rod part 66 may have a tip-end part 66*a* attachable and detachable to a shank 66*b* of the rod part 66. If a plurality of tip-end parts 66*a* with different lengths are prepared, the length of the rod part 66 can be changed on the tip-end-part 66*a* side to adjust the stroke of the piston part 62.

Further, the partition 70 is connected to the other end side of the rod part 66. The partition 70 is integrated with the rod part 66. Although in this embodiment the other end side of the rod part 66 is formed in the shaft shape, it may be adjustable in the length similarly to the tip-end part 66*a*.

The casing 68 is a cylindrical member having a hollow interior space. The casing 68 is closed at one end side. Further, the casing 68 is connected at the other end side so that it communicates with the non-communicating space 60 of the tank body 52*a* and does not communicate with the exterior space. The casing 68 has a first casing connection opening 68*a* and a second casing connection opening 68*b* on one end side in the axial direction and the other end side, respectively.

The partition 70 divides the interior space of the casing 68 into a first space 70*a* on the first casing connection opening 68*a* side, and a second space 70*b* on the second casing connection opening 68*b* side. The partition 70 has a plate-like shape, and is disposed so that its outer circumferential surface substantially close-contacts an inner circumferential surface of the casing 68 via a sealing member, such as an O ring. Further, the partition 70 is connected at its surface on the second space 70*b* side to the other end side of the rod part 66 (the opposite side from the connecting end of the piston part 62). The partition 70 is reciprocatable in the axial direction of the casing 68, along with the rod part 66, while maintaining such a posture that the outer circumferential surface contacts the inner circumference surface of the casing 68. The partition 70 is reciprocatable in the axial direction inside the casing 68 by introducing and discharging gas via the first casing connection opening 68*a* and the second casing connection opening 68*b* to change the pressure balance between the first space 70*a* and the second space 70*b*.

The first casing connection opening 68*a* is piping-connected to the ventilation device 72. The ventilation device 72 can not only introduce and discharge gas (in this embodiment, air) into/from the casing 68 but also stop the introduction and the discharge of the gas into/from the casing 68. The ventilation device 72 is configured so that, at intermediate locations of a first piping line 74 which connects a supply source 72*a* of the gas to the first casing connection opening 68*a* of the casing 68, a solenoid valve 72*b*, a pilot check valve 72*c*, and a first speed controller 72*d* are disposed in this order from the supply source 72*a* to the casing 68.

The supply source 72*a* is capable of pumping the gas toward the casing 68. The supply source 72*a* may be comprised of a pump, a compressor, etc., for example. The solenoid valve 72*b* switches, in the first piping line 74, a passing route of the gas supplied from the supply source 72*a*. Although the solenoid valve 72*b* may be of a suitable switching type, such as a three-position closed-center type and a three-position pressure-center type, for example, a solenoid valve which adopts a three-position exhaust-center type is used in this embodiment. If the three-position exhaust-center type solenoid valve is used as the solenoid valve 72*b* like this embodiment, a sufficient response can be secured, even when the distance between the solenoid valve 72*b* and the casing 68 increases.

The supply source 72*a* is connected to an air supply port PI of the solenoid valve 72*b*. Further, two output ports A and B provided to the solenoid valve 72*b* are piping-connected to the pilot check valve 72*c*. Further, two discharge ports EA and EB which open to the outside air are provided to the solenoid valve 72*b*. The solenoid valve 72*b* is capable of switching between three states (a first state, a second state, and a third state), by changing the valve position. In detail, as illustrated in FIG. 3, the first state is a state where the air supply port PI is connected to the output port B, and the discharge port EA is connected to the output port A. As illustrated in FIG. 4, the second state is a state where the air supply port PI is connected to the output port A, and the discharge port EB is connected to the output port B. As illustrated in FIG. 5, the third state is a state where the output ports A and B are connected to the discharge ports EA and EB, respectively.

The pilot check valve 72*c* has three connection ports PA, PB, and PC. The pilot check valve 72*c* is piping-connected at the connection ports PA and PB to the output ports A and B provided to the solenoid valve 72*b*, respectively. Further, the pilot check valve 72*c* is connected at the connection port PC to piping which leads to the first casing connection opening 68*a*. The pilot check valve 72*c* functions as a check valve which permits a flow of the gas from the connection port PB to the connection port PC, and prevents the opposite flow to the connection port PB from the connection port PC, in a state where pressure does not act on the connection port PA. Further, as the pilot check valve 72*c* makes pressure above a given value act on the connection port PA, the function as a check valve is canceled so that the flow from the connection port PC to the connection port PB is permitted.

The pilot check valve 72*c* is connected to the solenoid valve 72*b* via the first piping line 74 described above. Therefore, when the solenoid valve 72*b* is set to the first state where pressure does not act on the connection port PA of the pilot check valve 72*c*, but pressure acts on the connection port PB, gas flows from the connection port PB to the connection port PC, and the gas can be introduced from the first casing connection opening 68*a* into the casing 68. Further, when the solenoid valve 72*b* is set to the second state, pressure above the given value acts on the connection port PA, and the pilot check valve 72*c* does not function as a check valve. Further, the connection port PA becomes open to the outside air via the discharge port EB of the solenoid valve 72*b*. Therefore, when the solenoid valve 72*b* is set to the second state, the gas can be discharged from the first casing connection opening 68*a* of the casing 68. When the solenoid valve 72*b* is set to the third state, the pressure acts on neither one of the connection ports PA and PB, and the pilot check valve 72*c* functions as a check valve. Therefore, when the solenoid valve 72*b* is set to the third state, the gas does not go in or out of the casing 68.

The first speed controller 72*d* is provided at an intermediate location of piping which connects the pilot check valve 72*c* described above to the first casing connection opening 68*a* of the casing 68. The first speed controller 72*d* has a residual pressure exhaust valve. Further, the first speed controller 72*d* is capable of performing a meter-out control.

On the other hand, a second piping line 80 is connected to the second casing connection opening 68*b* of the casing 68. The second piping line 80 is provided with a silencer 82 and a second speed controller 84. The second piping line 80 opens to the outside air via the silencer 82. Therefore, the second piping line 80 is configured so that inflow and discharge of gas (in this embodiment, air) are possible in an area of the casing 68 on the second casing connection opening 68*b* side. Further, the second speed controller 84 is capable of performing a meter-out control.

The buffer tank 50 utilizes the above-described configuration to realize the three states comprised of a pressurized state, a depressurized state, and a holding state. These states can be realized by performing a movement control of the piston part 62 inside the tank part 52 by the actuator 64 which constitutes the variable volume mechanism 54.

In detail, the pressurized state is a state where pressurizing force is applied to the fluid. The pressurized state can be realized by reducing the volume of the communicating space 58 which communicates with the supply line 40, inside the tank part 52 by the variable volume mechanism 54. Describing in more detail, when making the buffer tank 50 into the pressurized state, as illustrated in FIG. 3, the solenoid valve 72*b* which constitutes the actuator 64 is set to the first state, and the gas is supplied to the solenoid valve 72*b* from the supply source 72*a*. Therefore, it becomes in the state where the pressure does not act on the connection port PA of the pilot check valve 72*c* but the pressure acts on the connection port PB, the gas flows from the connection port PB to the connection port PC, and the gas is introduced into the first space 70*a* from the first casing connection opening 68*a* provided to the casing 68 of the actuator 64. In connection with this, the partition 70 moves in a direction in which the first space 70*a* expands inside the casing 68. Therefore, the pressure which acts on the non-communicating space 60 side of the piston part 62 connected to the partition 70 via the rod part 66 is increased. In connection with this, the piston part 62 moves in a direction in which the volume of the communicating space 58 is reduced. Thus, the buffer tank 50 becomes in the pressurized state where pressurizing force is applied to the fluid.

The depressurized state is a state where negative pressure is applied to the fluid. The depressurized state can be realized by increasing the volume of the communicating space 58 which communicates with the supply line 40, inside the tank part 52 by the variable volume mechanism 54. Describing in more detail, when making the buffer tank 50 into the depressurized state, the solenoid valve 72*b* which constitutes the actuator 64 is set to the second state, and the gas is supplied to the solenoid valve 72*b* from the supply source 72*a*, as illustrated in FIG. 4. Therefore, it becomes in the state where the pressure above the given value acts on the connection port PA of the pilot check valve 72*c* and the pilot check valve 72*c* does not function as a check valve. Further, the connection port PA opens to the outside air via the discharge port EB of the solenoid valve 72*b*. Therefore, when the solenoid valve 72*b* is set to the second state, the gas is discharged from the first casing connection opening 68*a* of the casing 68. In connection with this, the partition 70 moves in a direction in which the second space 70*b* increases inside the casing 68. In connection with this, the pressure which acts on the non-communicating space 60 side of the piston part 62 connected to the partition 70 via the rod part 66 is reduced. Therefore, the piston part 62 moves in the direction in which the volume of the communicating space 58 increases. Thus, the buffer tank 50 becomes in the depressurized state where the negative pressure force or the decompression force acts on the fluid.

The holding state is a state where neither the pressurizing force nor the decompression force acts on the fluid. The holding state can be realized by suspending the change in the volume of the communicating space 58 by the variable volume mechanism 54. Describing in more detail, when the buffer tank 50 is made into the holding state, the solenoid valve 72*b* which constitutes the actuator 64 is set to the third state, as illustrated in FIG. 5. Therefore, it becomes in the state where the pressure acts on neither of the connection ports PA and PB provided to the pilot check valve 72_c_, and the pilot check valve 72_c_ functions as a check valve. Therefore, when the solenoid valve 72_b_ is set to the third state, it can be made into the state where the gas does not go in and out of the casing 68. Therefore, the partition 70 is stopped inside the casing 68. In connection with this, it becomes in the state where neither a change in the pressure which acts on the piston part 62 connected to the partition 70 via the rod part 66, nor the change in the volume of the communicating space 58 occurs. Thus, the buffer tank 50 becomes in the holding state where neither the pressurizing force nor the decompression force acts on the fluid.

As illustrated in FIG. 1, the residual quantity grasping part 90 is provided downstream of the buffer tank 50 described above in the fluid flow direction toward the discharging device 30. The residual quantity grasping part 90 is for grasping the residual quantity of the fluid in the discharging device 30. For example, the residual quantity grasping part 90 may be what grasps the residual quantity of the fluid in the discharging device 30 by directly measuring it, or may be what indirectly grasps the residual quantity of the fluid in the discharging device 30 based on the supplying state of the fluid to the discharging device 30, and the discharging state of the fluid from the discharging device 30. In detail, for example, the residual quantity grasping part 90 may be what indirectly grasps the residual quantity of the fluid in the discharging device 30 based on measurements related to the supply pressure of the fluid to the discharging device 30, and the supplying state of the fluid, such as a flow rate of the fluid to the discharging device 30.

Further, for example, the residual quantity grasping part 90 may be what includes the sensor 92 which measures the supply pressure and the flow rate of the fluid, and a processing part 94 which performs processing for grasping the residual quantity of the fluid in the discharging device 30 based on the measurement of the sensor 92, which are provided integrally or separately. In this embodiment, as the sensor 92, a pressure sensor for detecting the supply pressure (hereinafter, also referred to as "supply pressure P") of the fluid to the discharging device 30 is adopted. Moreover, the control device 200 (described later) functions as the processing part 94. Therefore, by inputting the measurement of the sensor 92 into the control device 200, the control device 200 is capable of grasping the residual quantity of the fluid in the discharging device 30. In this embodiment, under a condition that the supply pressure P detected by the sensor 92 is within a range ($PL<P<PH$) between an upper limit (hereinafter, also referred to as "the upper limit pressure PH"), and a lower limit (hereinafter, "the lower limit pressure PL") of a given pressure range, the control device 200 grasps that the residual quantity of the fluid in the discharging device 30 is within an appropriate range.

The control device 200 is for controlling operation of the fluid discharging system 10. The control device 200 also controls operations of the pump 20, the discharging device 30, and the buffer tank 50, in addition to the function as the processing part 94 of the residual quantity grasping part 90 described above.

<<Operation of Fluid Discharging System 10>>

The fluid discharging system 10 is capable of operating in four kinds of operating modes under the control by the control device 200. In detail, the fluid discharging system 10 is capable of operating in the four kinds of operating modes, comprised of (1) a pump supply mode, (2) a tank accumulation mode, (3) a tank supply mode, and (4) a multiple supply mode. Further, the fluid discharging system 10 is capable of stably performing the discharge of the fluid in the discharging device 30 by performing the operations in the four kinds of operating modes one by one. Below, regarding the operation of the fluid discharging system 10, the operations in the four kinds of operating modes are described first. Further, after describing the operation in each operating mode, the operation of the fluid discharging system 10 which is realized by performing the operations in the operating modes one by one will be described.

(1) Pump Supply Mode

Figure 6:
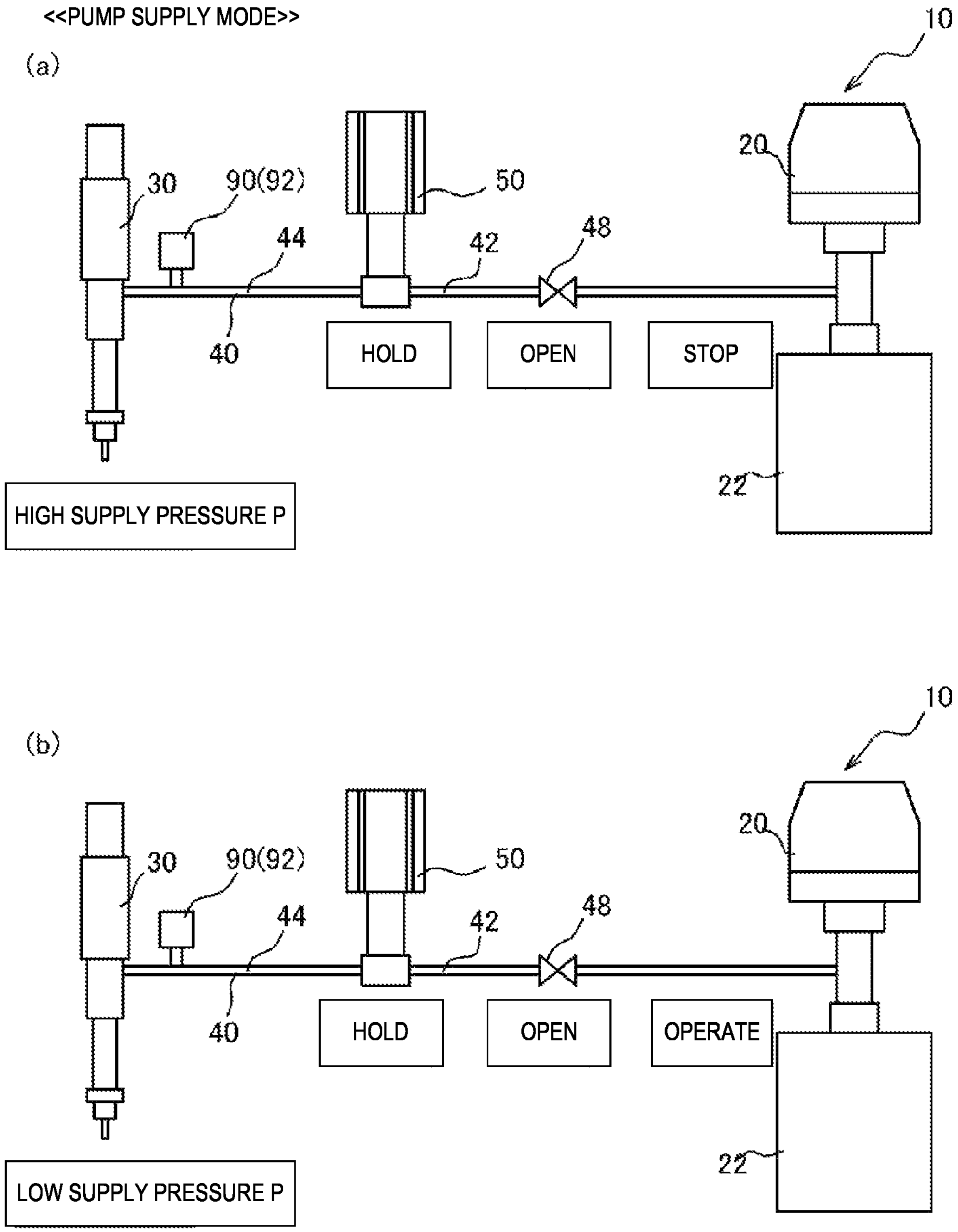
FIGS. 6 (*a*) and (*b*) are views illustrating operating states of each part in cases where the fluid discharging system of FIG. 1 is high and low, respectively, in a supply pressure in a pump supply mode.

The pump supply mode is an operating mode in which the fluid is supplied from the pump 20 to the discharging device 30, while making the buffer tank 50 into the holding state. As illustrated in FIG. 6, in the pump supply mode, the control device 200 opens the valve 48 provided between the buffer tank 50 and the pump 20 in the supply line 40. Further, the control device 200 controls operation of the pump 20 so that the pump 20 operates or stops according to the residual quantity of the fluid in the discharging device 30 which is grasped by the residual quantity grasping part 90.

Figure 7:
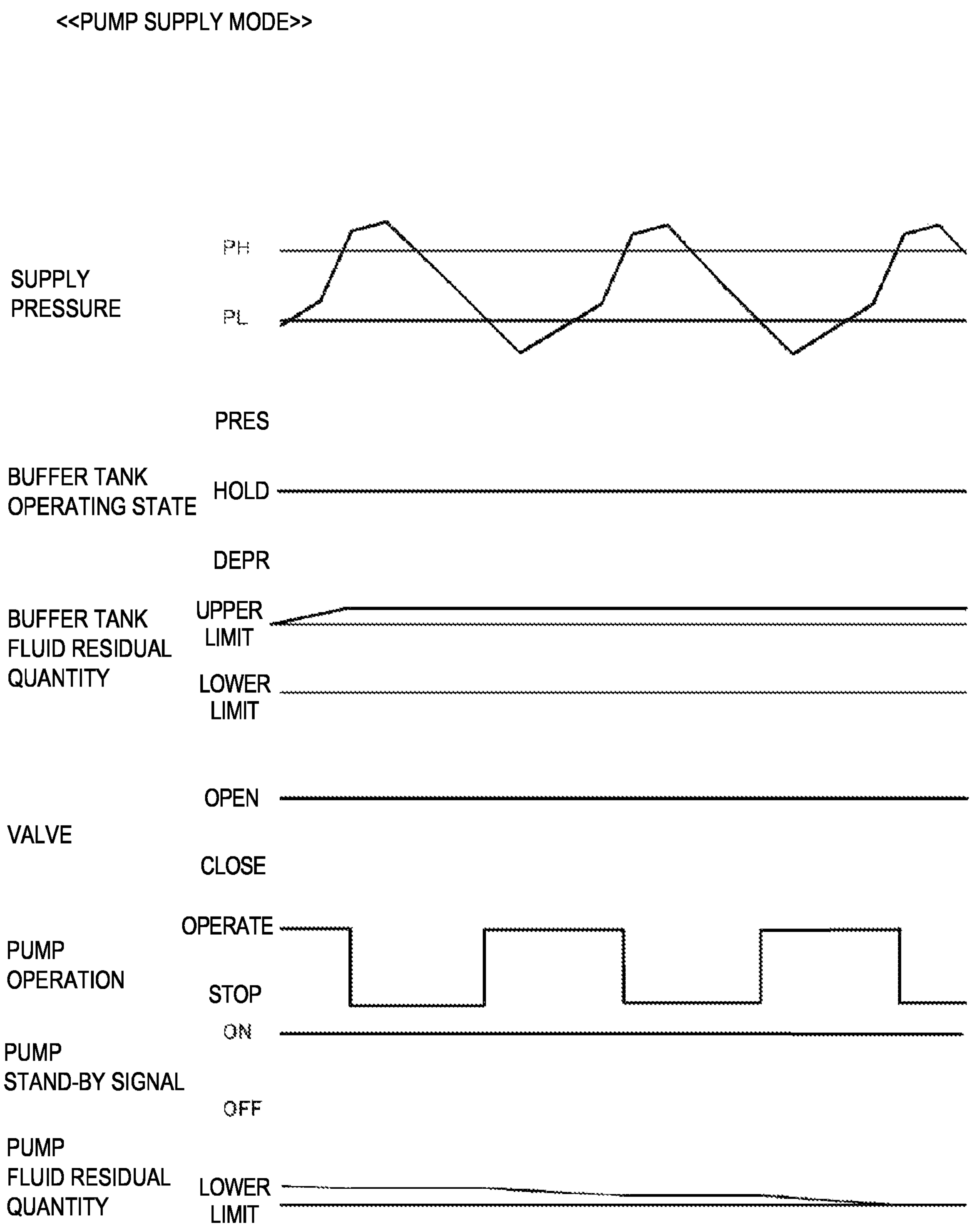
FIG. 7 is a timing chart when the fluid discharging system of FIG. 1 operates in the pump supply mode.

In this embodiment, the control device 200 grasps the residual quantity of the fluid in the discharging device 30 by using the supply pressure P to the discharging device 30 detected by the sensor 92 as an index, and controls the operation of the pump 20 according to the supply pressure P. In detail, as illustrated by a timing chart in FIG. 7, under a condition that the supply pressure P is above the given upper limit pressure PH, the control device 200 suspends the operation of the pump 20 because the supply of the fluid to the discharging device 30 is unnecessary. On the other hand, under a condition that the supply pressure P is below the given lower limit pressure PL, the control device 200 activates the pump 20 because the residual quantity of the fluid in the discharging device 30 is below an appropriate value. Operation of the fluid discharging system 10 in the pump supply mode is as illustrated in a flowchart of FIG. 8. Below, the operation of the fluid discharging system 10 in the pump supply mode is described in more detail with reference to the flowchart of FIG. 8.

(Step 1-1)

At Step 1-1, the control device 200 opens the valve 48. Here, when the valve 48 is already in the open state, it maintains the valve 48 in the open state. Then, the control device 200 transits the control flow to Step 1-2.

(Step 1-2)

At Step 1-2, the control device 200 checks whether the residual quantity of the fluid in the reservoir 22 of the pump 20 has decreased to the lower limit of the reservoir 22. Here, if the residual quantity of the fluid in the reservoir 22 is at the lower limit, since the fluid cannot be pumped even if the pump 20 operates, it ends the control flow. On the other hand, if the fluid exceeding the lower limit remains in the reservoir 22, the control device 200 transits the control flow to Step 1-3.

(Step 1-3)

At Step 1-3, the control device 200 checks whether the supply pressure P detected by the sensor 92 which constitutes the residual quantity grasping part 90 is below the lower limit pressure PL. Here, if the supply pressure P is higher than the lower limit pressure PL, it does not need to activate the pump 20 to supply the fluid to the discharging device 30. Therefore, if the supply pressure P is above the lower limit pressure PL, the control device 200 stands by at Step 1-3. On the other hand, if the supply pressure P is below the lower limit pressure PL, the supply of the fluid to the discharging device 30 is needed. Thus, in this case, the control device 200 transits the control flow to Step 1-4.

(Step 1-4)

At Step 1-4, the control device 200 activates the pump 20. Therefore, the fluid stored in the reservoir 22 is pumped toward the discharging device 30 by the pump 20. Then, the control device 200 transits the control flow to Step 1-5.

(Step 1-5)

At Step 1-5, the control device 200 checks whether the residual quantity of the fluid in the reservoir 22 of the pump 20 reaches the lower limit. Here, if the residual quantity of the fluid in the reservoir 22 reaches the lower limit, the control device 200 transits the control flow to Step 1-6. On the other hand, if the residual quantity of the fluid does not reach the lower limit, the control device 200 transits the control flow to Step 1-7.

(Step 1-6)

If the residual quantity of the fluid in the reservoir 22 reaches the lower limit at Step 1-5 described above, the fluid cannot be supplied to the discharging device 30 even if the pump 20 operates more. Therefore, at Step 1-6, the control device 200 terminates the control flow.

(Step 1-7)

At Step 1-7, the control device 200 checks whether the supply pressure P becomes above the upper limit pressure PH. Here, if the supply pressure P does not reach the upper limit pressure PH, the control device 200 returns the control flow to Step 1-5 to continue the supply of the fluid to the discharging device 30. On the other hand, if the supply pressure P becomes above the upper limit pressure PH, the control device 200 transits the control flow to Step 1-8.

(Step 1-8)

At Step 1-8, the control device 200 stops the pump 20. Therefore, the supply of the fluid from the pump 20 to the discharging device 30 is stopped. Then, the control device 200 transits the control flow to Step 1-9.

(Step 1-9)

At Step 1-9, the control device 200 checks the residual quantity of the fluid in the reservoir 22 of the pump 20. Here, if the residual quantity of the fluid does not reach the lower limit of the reservoir 22, the control device 200 returns the control flow to Step 1-3. On the other hand, if the residual quantity of the fluid reaches the lower limit of the reservoir 22, since the fluid cannot be supplied to the discharging device 30 any more by the pump 20, it terminates the control flow.

(2) Tank Accumulation Mode

Then, the tank accumulation mode is described in detail. The tank accumulation mode is an operating mode in which the fluid is accumulated (charged) in the buffer tank 50 in order to prepare for the tank supply mode (described later in detail), while continuing the supply of the fluid from the pump 20. The tank accumulation mode is an operating mode in which the fluid is accumulated inside the buffer tank 50 (the communicating space 58) by sucking the fluid into the buffer tank 50. In the tank accumulation mode, operation of the buffer tank 50 during the accumulation is controlled based on the measurement of the residual quantity grasping part 90. Further, the tank accumulation mode is an operating mode in which the discharge of the fluid by the discharging device 30 can be continued also during the accumulation of the fluid in the buffer tank.

Figure 9:
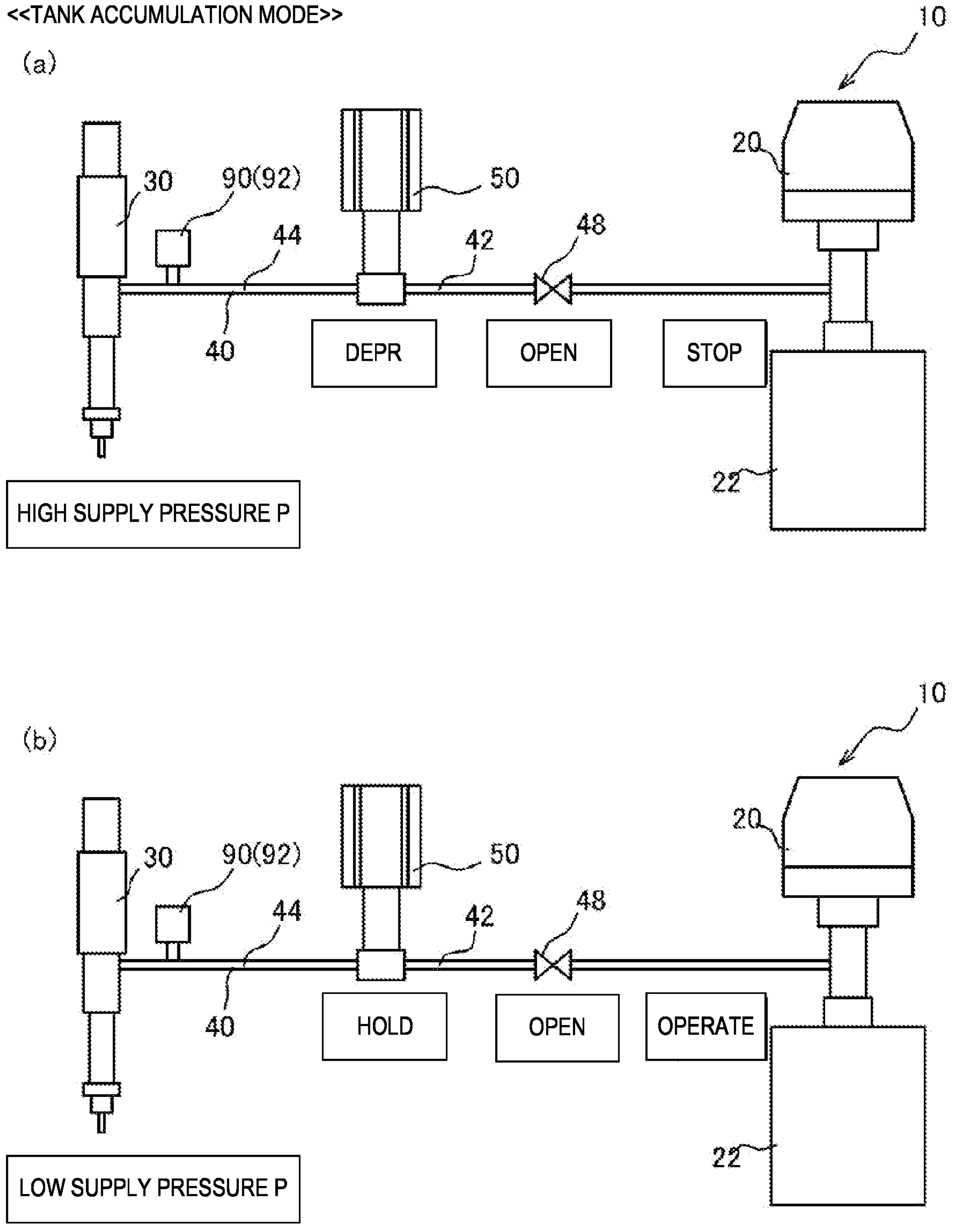
FIGS. 9 (*a*) and (*b*) are views illustrating operating states of each part in cases where the fluid discharging system of FIG. 1 is high and low, respectively, in the supply pressure in a tank accumulation mode.

As illustrated in FIG. 9, when operating in the tank accumulation mode, the control device 200 opens the valve 48 provided to the supply line 40 so that the fluid is allowed to be supplied from the pump 20 to the buffer tank 50. Further, the control device 200 controls operation of the pump 20 so that the pump 20 operates and stops according to the residual quantity of the fluid in the discharging device 30 grasped by the residual quantity grasping part 90.

Figure 10:
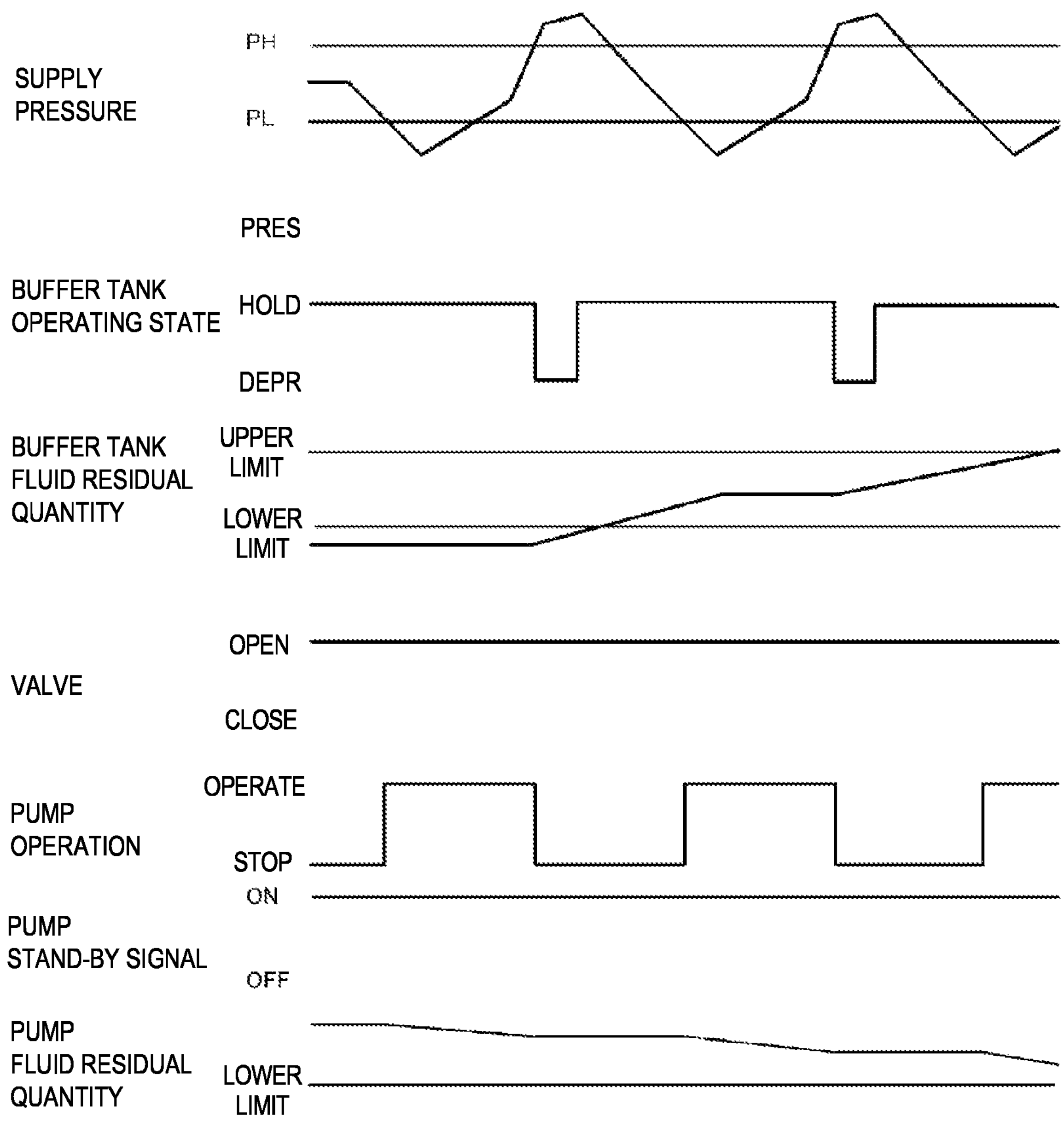
FIG. 10 is a timing chart when the fluid discharging system of FIG. 1 operates in the tank accumulation mode.

In the tank accumulation mode, as illustrated by an operation diagram of FIG. 9 and a timing chart of FIG. 10, the control device 200 controls operations of the pump 20 and the buffer tank 50 based on the measurement of the residual quantity grasping part 90. The control device 200 grasps the residual quantity of the fluid in the discharging device 30 by using the supply pressure P to the discharging device 30 as an index, and controls the operations of the pump 20 and the buffer tank 50 according to the supply pressure P. In detail, when the supply pressure P is above the given upper limit pressure PH (first upper limit), since the fluid stored in the discharging device 30 is enough, the buffer tank 50 is made into the depressurized state to accumulate the fluid in the communicating space 58 of the tank part 52. In more detail, as illustrated in FIG. 9(*a*), the control device 200 opens the valve 48, stops the pump 20, and makes the buffer tank 50 into the depressurized state. Therefore, the fluid is accumulated in the buffer tank 50. The operating conditions, such as the timing and the period when the buffer tank 50 is made into the depressurized state may be determined in consideration of an undershoot of the supply pressure P, for example, by limiting the timing and the period to a given time after the supply pressure P reaches the upper limit pressure PH.

On the other hand, when the supply pressure P is below the given lower limit pressure PL (first lower limit), since the residual quantity of the fluid in the discharging device 30 is below the appropriate value, the buffer tank 50 is made into the holding state to stop the accumulation of the fluid in the communicating space 58. In more detail, as illustrated in FIG. 9(*b*), the control device 200 opens the valve 48, activates the pump 20, and makes the buffer tank 50 into the holding state. Therefore, the control device 200 supplies the fluid pumped by the pump 20 to the discharging device 30.

By performing such a control in the tank accumulation mode, the control device 200 stores the fluid in the buffer tank 50, while targeting the state where the supply pressure P is sufficiently high (when the residual quantity of the fluid in the discharging device 30 is enough). That is, in the fluid discharging system 10, the control device 200 utilizes the advantage that the buffer tank 50 is what can realize the holding state to control the operation in the tank accumulation mode. Operation of the fluid discharging system 10 in the tank accumulation mode is as illustrated in a flowchart of FIG. 11. Below, the operation of the fluid discharging system 10 in the tank accumulation mode is described in more detail with reference to the flowchart of FIG. 11.

(Step 2-1)

At Step 2-1, the control device 200 opens the valve 48. Here, if the valve 48 is already in the open state, it maintains the valve 48 in the open state. Therefore, the fluid is allowed to be pumped from the pump 20 to the buffer tank 50 and the discharging device 30. Then, the control device 200 transits the control flow to Step 2-2.

(Step 2-2)

At Step 2-2, the control device 200 checks whether the residual quantity of the fluid in the reservoir 22 of the pump 20 has decreased to the lower limit of the reservoir 22. If the residual quantity of the fluid in the reservoir 22 is at the lower limit, it terminates the control flow of FIG. 11. On the other hand, if the fluid exceeding the lower limit still remains in the reservoir 22, the control device 200 transits the control flow to Step 2-3.

(Step 2-3)

At Step 2-3, the control device 200 checks whether the supply pressure P detected by the sensor 92 which constitutes the residual quantity grasping part 90 is below the lower limit pressure PL. Here, when the supply pressure P is above the lower limit pressure PL, since the pump 20 does not need to operate to supply the fluid to the discharging device 30, it becomes in a standby state at Step 2-3. On the other hand, if the supply pressure P is below the lower limit pressure PL, the supply of the fluid to the discharging device 30 is needed. Thus, in this case, the control device 200 transits the control flow to Step 2-4.

(Step 2-4)

At Step 2-4, the control device 200 activates the pump 20. Therefore, the fluid stored in the reservoir 22 is pumped toward the discharging device 30 by the pump 20. Then, the control device 200 transits the control flow to Step 2-5.

(Step 2-5)

At Step 2-5, the control device 200 checks whether the residual quantity of the fluid in the reservoir 22 of the pump 20 reaches the lower limit. Here, if the residual quantity of the fluid in the reservoir 22 reaches the lower limit, the control device 200 transits the control flow to Step 2-6. On the other hand, if the residual quantity of the fluid does not reach the lower limit, the control device 200 transits the control flow to Step 2-7.

(Step 2-6)

In a state where the control flow is transited to Step 2-6, the residual quantity of the fluid in the reservoir 22 is not enough. Therefore, the control device 200 stops the pump 20. Then, it terminates the control flow.

(Step 2-7)

At Step 2-7, the control device 200 checks whether the supply pressure P becomes below the upper limit pressure PH. Here, if the supply pressure P is below the upper limit pressure PH, it returns the control flow to Step 2-5 to continue the operation of the pump 20. On the other hand, if the supply pressure P is above the upper limit pressure PH, the control device 200 transits the control flow to Step 2-8.

(Step 2-8)

At Step 2-8, the control device 200 stops the pump 20. Then, the control device 200 transits the control flow to Step 2-9.

(Step 2-9)

At Step 2-9, the control device 200 makes the buffer tank 50 into the depressurized state. In detail, the control device 200 controls operation of the solenoid valve **72*b* which constitutes the variable volume mechanism 54 of the buffer tank 50 so that the solenoid valve 72*b* becomes in the second state. Further, the gas is supplied to the solenoid valve 72*b* from the supply source 72*a* comprised of an air compressor etc. Therefore, the function of the pilot check valve 72*c* as a check valve is taken away, and the gas is discharged from the first casing connection opening 68*a* in the casing 68 of the variable volume mechanism 54 via the connection port PA of the pilot check valve 72*c* and the discharge port EB of the solenoid valve 72*b*. In connection with this, the partition 70 begins to move inside the casing 68, and the piston part 62 moves in the direction in which the volume of the communicating space 58 increases. Thus, the buffer tank 50 becomes in the depressurized state where the decompression force acts on the fluid. When the communicating space 58 of the buffer tank 50 becomes in the depressurized state, the fluid begins to flow from the supply line 40 into the communicating space 58**, and the fluid is accumulated therein.

When the buffer tank 50 is made into the depressurized state at Step 2-9, the control device 200 transits the control flow to Step 2-10.

(Step 2-10)

At Step 2-10, the control device 200 manages an accumulating amount so that the accumulating amount after the accumulation of the fluid in the buffer tank 50 is started at Step 2-9 is within a given range. As for the accumulating amount of the fluid in the buffer tank 50, the amount of the fluid can be derived and grasped directly or indirectly, for example, by a method of directly measuring and deriving the amount by using a residual quantity sensor etc., or a method of deriving the amount by detecting an inflow rate and an outflow rate of the fluid into/from the buffer tank 50, and subtracting one amount from the other, or the amount can be grasped indirectly based on time of the inflow and outflow of the fluid into/from the buffer tank 50. In this embodiment, the control device 200 manages the accumulating amount after the accumulation of the fluid in the buffer tank 50 is started at Step 2-9, based on the time having passed after the buffer tank 50 is made into the depressurized state at Step 2-9. At Step 2-10, the control device 200 checks whether a lapsed time Tx after the accumulation of the fluid in the buffer tank 50 is started at Step 2-9 is more than a given time T2. The lapsed time T can be measured by a timer provided to the control device 200, for example. Here, when it is checked that the lapsed time T is more than the given time T2, the control device 200 transits the control flow to Step 2-11.

(Step 2-11)

At Step 2-11, the control device 200 switches the buffer tank 50 to the holding state in which neither the pressurizing force nor the decompression force acts on the fluid. In detail, the control device 200 makes the solenoid valve **72*b* provided to the actuator 64 of the buffer tank 50 into the third state. Accordingly, the pressure acts on neither of the connection ports PA and PB provided to the pilot check valve 72*c*, the pilot check valve 72*c* functions as a check valve, and entering and exiting of the gas into/from the casing 68 of the actuator 64 is stopped. Therefore, the partition 70 disposed inside the casing 68 stops, and the piston part 62 connected to the partition 70 also stops inside the tank part 52. Thus, the control device 200 makes the buffer tank 50 into the holding state. Then, the control device 200 transits the control flow to Step 2-12**.

(Step 2-12)

At Step 2-12, the control device 200 checks whether a storing amount of the fluid in the buffer tank 50 has reached the upper limit. As for the storing amount of the fluid in the buffer tank 50, for example, a residual quantity sensor may be provided to the buffer tank 50, or a position sensor capable of detecting the position of the partition 70 may be provided, to determine the storing amount based on output values from these sensors, or an inflow rate and an outflow rate of the fluid to/from the buffer tank 50 may be detected or derived to determine the storing amount based on the inflow rate and the outflow rate. At Step 2-12, if determined that the storing amount of the fluid in the buffer tank 50 does not reach the upper limit, the control device 200 returns the control flow to Step 2-2 in order to further proceed the accumulation of the fluid. On the other hand, if determined that the storing amount of the fluid in the buffer tank 50 reached the upper limit of the buffer tank 50, the control device 200 terminates the control flow.

(3) Tank Supply Mode

Then, the tank supply mode is described in detail. The tank supply mode is an operating mode in which the fluid is supplied to the discharging device 30 from the buffer tank 50 while the pump 20 is stopped. The operation in the tank supply mode is an operating mode for continuously supplying the fluid to the discharging device 30 by discharging the fluid from the buffer tank 50 to the supply line 40 when the pump 20 is stopped, for example, for replacing the reservoir 22 of the pump 20, or refilling of the fluid to the reservoir 22.

Figure 12:
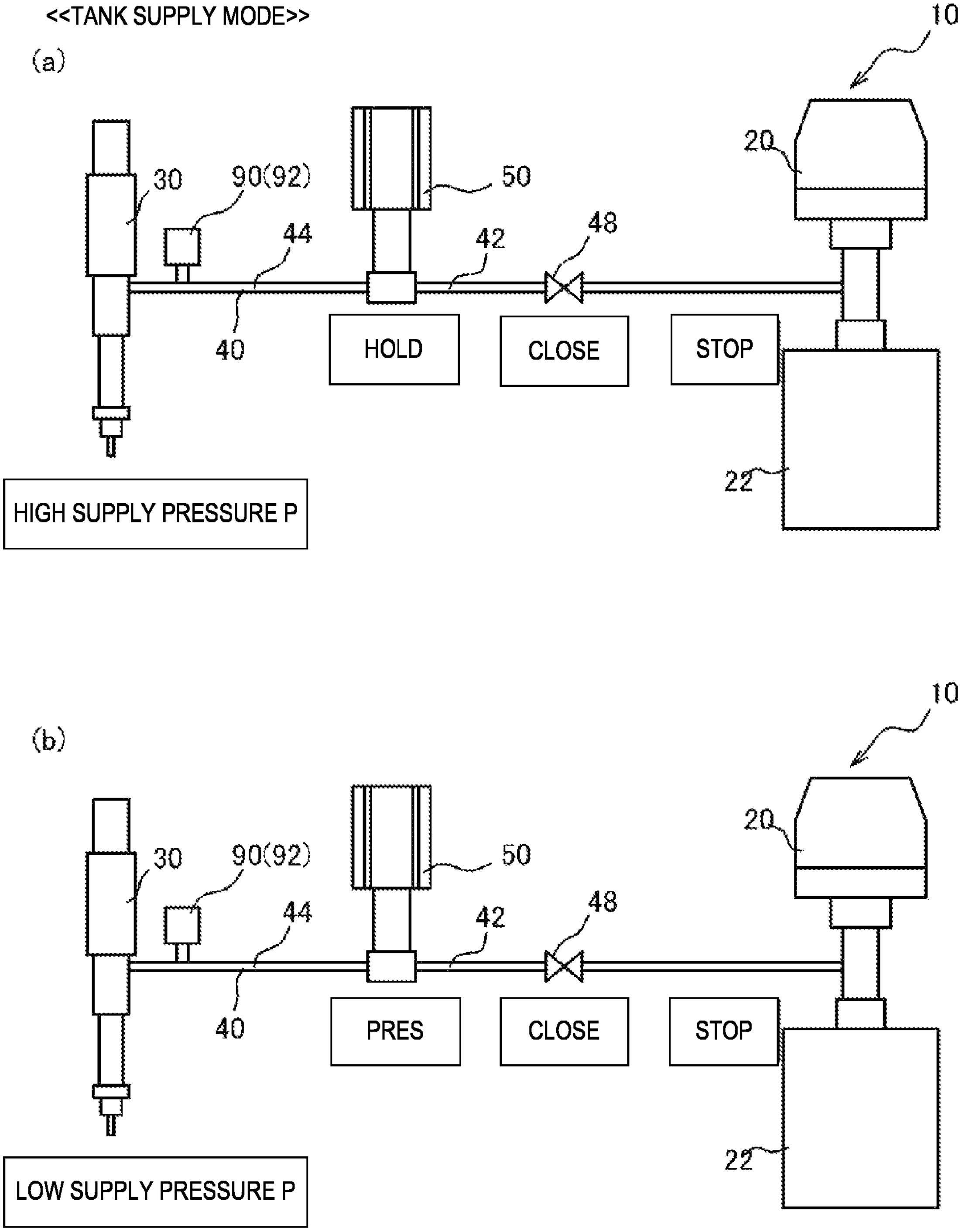
FIGS. 12 (*a*) and (*b*) are views illustrating operating states of each part in cases where the fluid discharging system of FIG. 1 is high and low, respectively, in the supply pressure in a tank supply mode.
Figure 13:
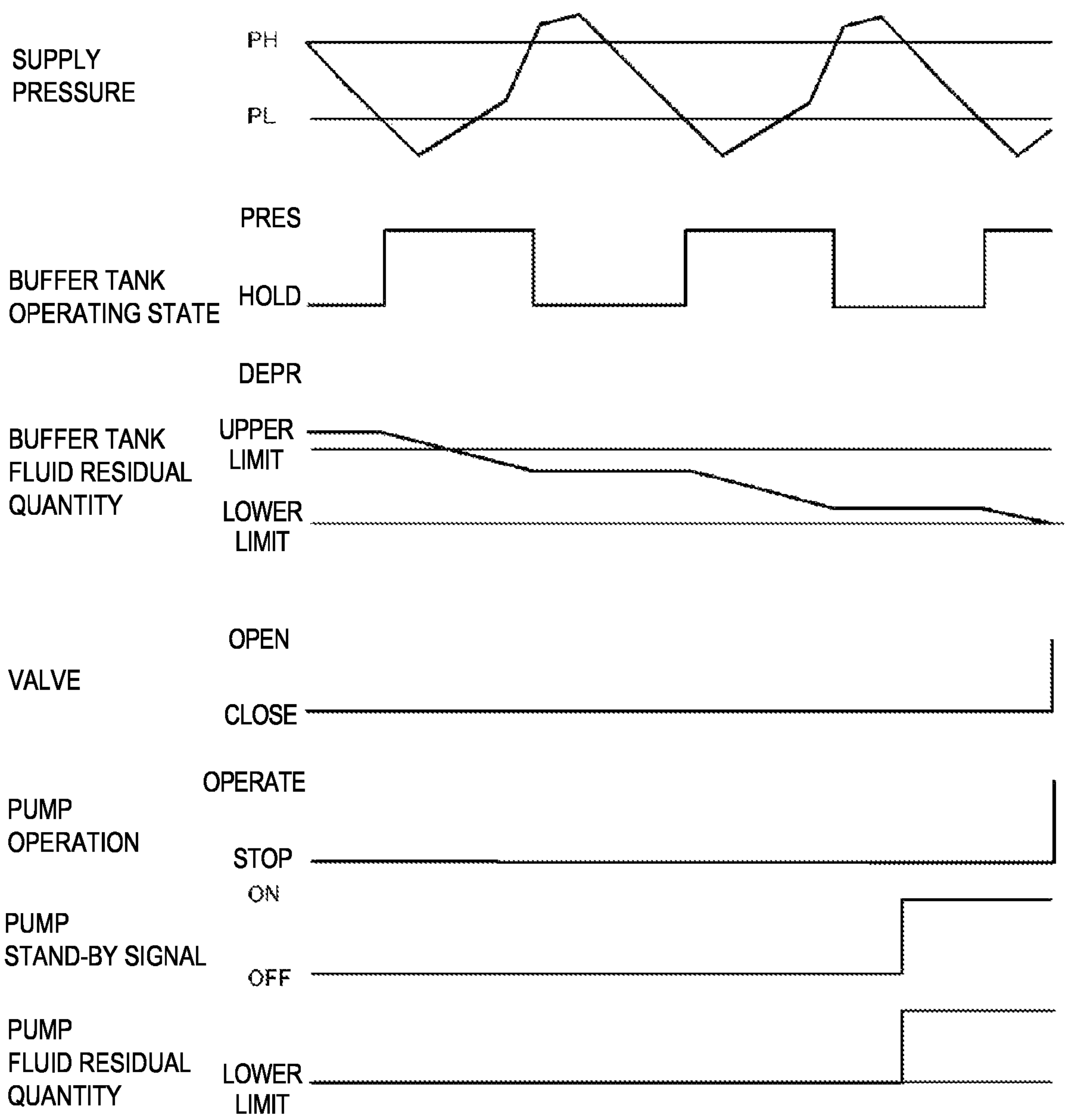
FIG. 13 is a timing chart when the fluid discharging system of FIG. 1 operates in the tank supply mode.

In the tank supply mode, as illustrated by an operation diagram in FIG. 12 or a timing chart in FIG. 13, operations of the pump 20 and the buffer tank 50 are controlled based on the measurement of the residual quantity grasping part 90. In detail, in the tank supply mode, when supplying the fluid to the discharging device 30, operation is controlled so that the buffer tank 50 discharges the fluid under a condition that the measurement of the residual quantity grasping part 90 is below the given lower limit (second lower limit). In more detail, under a condition that the supply pressure P detected by the sensor 92 is below the given lower limit pressure PL, the buffer tank 50 is made into the pressurized state while the pump 20 is stopped and the valve 48 is closed. Therefore, while the fluid is not pumped by the pump 20, the fluid is supplied from the buffer tank 50 to the discharging device 30. Note that, although the lower limit pressure PL which is the second lower limit is the same value (pressure) as the first lower limit in the tank accumulation mode described above, they may be mutually different values (pressures).

On the other hand, in the tank supply mode, operation is controlled so that the buffer tank 50 stops the discharge of the fluid under a condition that the measurement of the residual quantity grasping part 90 exceeds the given upper limit (second upper limit). In more detail, in the tank supply mode, under a condition that the supply pressure P detected by the sensor 92 exceeds the given upper limit pressure PH, the buffer tank 50 is made into the holding state, while the pump 20 is stopped and the valve 48 is closed. This suppresses that the fluid is excessively supplied to the discharging device 30 where the fluid is filled up. Note that, although the upper limit pressure PH which is the second upper limit is the same value (pressure) as the first upper limit in the tank accumulation mode described above, the may be mutually different values (pressures).

Figure 14:
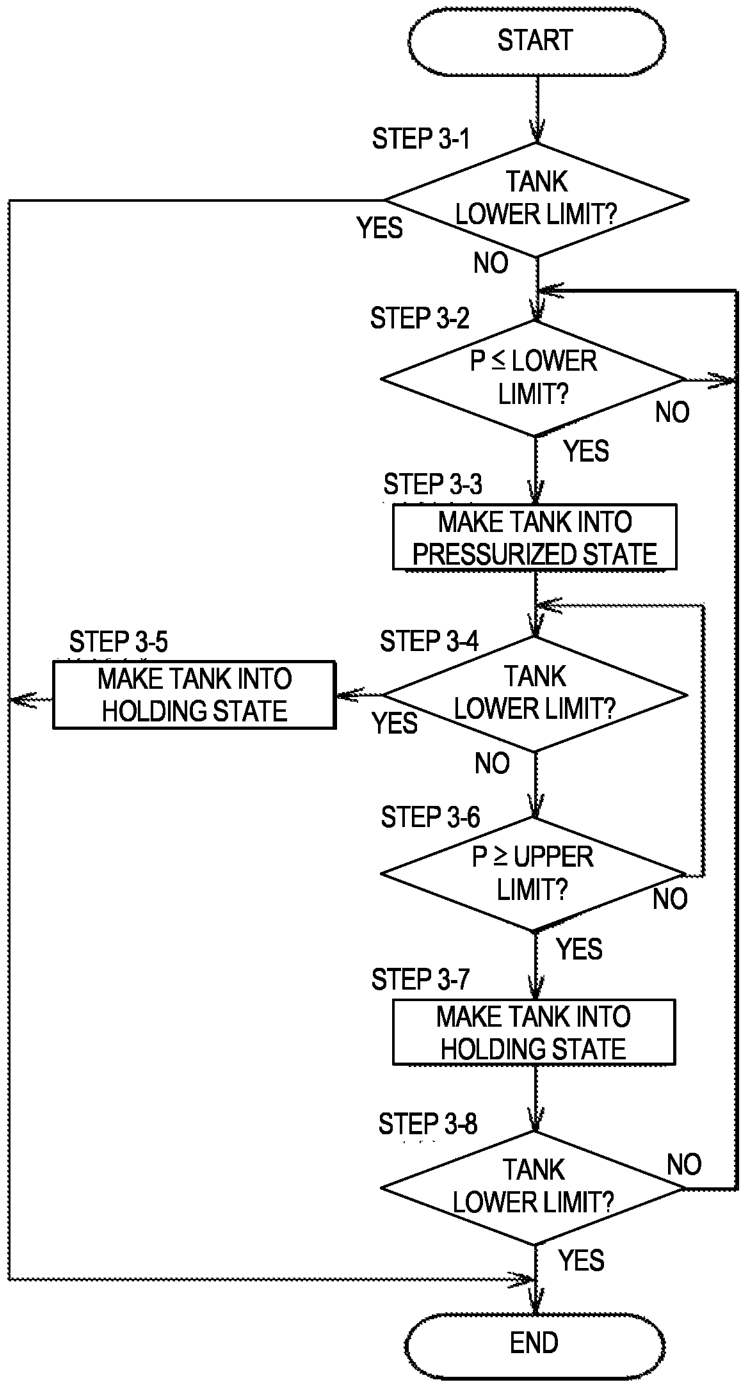
FIG. 14 is a flowchart when the fluid discharging system of FIG. 1 operates in the tank supply mode.

In the tank supply mode, the operation described above is performed in accordance with a flowchart illustrated in FIG. 14. Below, the operation of the fluid discharging system 10 in the tank supply mode is described in more detail with reference to the flowchart of FIG. 14.

(Step 3-1)

At Step 3-1, the control device 200 checks a storing state of the fluid in the buffer tank 50. As a result, if the storing amount of the fluid in the buffer tank 50 is at the lower limit, since the fluid may not be supplied by the buffer tank 50, the control device 200 terminates the control flow. Here, at and after this step, although "when the storing amount of the fluid in the buffer tank 50 is at the lower limit" may be a state where the storing amount decreases to a level where the supply of the fluid becomes impossible, the control device 200 controls operation, while defining a stage slightly before the level where the supply of the fluid becomes impossible (a state where a small amount of fluid remains) as the condition in which the storing amount of the fluid is at the lower limit, in this embodiment. On the other hand, if the storing amount of the fluid in the buffer tank 50 is above the lower limit, the control device 200 transits the control flow to Step 3-2.

(Step 3-2)

At Step 3-2, the control device 200 checks the residual quantity of the fluid in the discharging device 30. In detail, the control device 200 checks whether the supply pressure P detected by the sensor 92 of the residual quantity grasping part 90 is below the given lower limit pressure PL (second lower limit). Here, if the supply pressure P is above the lower limit pressure PL, an enough amount of fluid remains in the discharging device 30, and the discharging device 30 does not need to be refilled with the fluid. Therefore, in this case, the control device 200 stands by at Step 3-2. On the other hand, if the supply pressure P is below the lower limit pressure PL, the residual quantity of the fluid in the discharging device 30 is low. In this case, the control device 200 transits the control flow to Step 3-3.

(Step 3-3)

At Step 3-3, the control device 200 makes the buffer tank 50 into the pressurized state. Therefore, the control device 200 applies the pressurizing force to the fluid in the buffer tank 50 to discharge the fluid from the buffer tank 50 toward the discharging device 30 via the supply line 40. In detail, the control device 200 performs a control for moving the piston part 62 in a direction in which the volume of the communicating space 58 which communicates with the supply line 40 decreases, by the variable volume mechanism 54 provided to the buffer tank 50. In more detail, the control device 200 supplies the gas to the solenoid valve **72*b* from the supply source 72*a*, while making the solenoid valve 72*b* provided to the actuator 64 into the first state. Therefore, the gas pumped from the supply source 72*a* comprised of the air compressor etc. is introduced through the pilot check valve 72*c* from the solenoid valve 72*b*, into the first space 70*a* of the casing 68 from the first casing connection opening 68*a*. In connection with this, the partition 70 and the piston part 62 operate, and the piston part 62 moves in the direction in which the volume of the communicating space 58 is reduced. Thus, the control device 200 makes the buffer tank 50 into the pressurized state. When the buffer tank 50 becomes in the pressurized state, the fluid stored in the communicating space 58 is discharged toward the discharging device 30 via the supply line 40**.

(Step 3-4)

At Step 3-4, the control device 200 checks whether the residual quantity of the fluid in the buffer tank 50 decreases to the lower limit. Here, if the residual quantity of the fluid in the buffer tank 50 decreases to the lower limit, the control flow is proceeded to Step 3-5, and if not reaching the lower limit, the control flow is proceeded to Step 3-6.

(Step 3-5)

At Step 3-5, the control device 200 stops the discharge of the fluid from the buffer tank 50. In detail, the control device 200 makes the buffer tank 50 into the holding state, similarly to Step 2-11 described above. Then, the control device 200 terminates the control flow.

(Step 3-6)

At Step 3-6, the control device 200 checks whether the enough amount of the fluid is refilled in the discharging device 30. In detail, the control device 200 checks whether the supply pressure P has reached the given upper limit pressure PH (second upper limit). Here, if the supply pressure P is below the upper limit pressure PH, the control device 200 returns the control flow to Step 3-4. On the other hand, if the supply pressure P is above the upper limit pressure PH, the control device 200 transits the control flow to Step 3-7.

(Step 3-7)

At Step 3-7, the control device 200 makes the buffer tank 50 into the holding state, similarly to Step 2-11 and Step 3-5 which are described above. Then, the control device 200 transits the control flow to Step 3-8.

(Step 3-8)

At Step 3-8, the control device 200 checks the storing state of the fluid in the buffer tank 50. As a result, if the storing amount of the fluid in the buffer tank 50 is above the lower limit, the control device 200 returns the control flow to Step 3-2. On the other hand, if the storing amount of the fluid in the buffer tank 50 is at the lower limit, since the operation in the tank supply mode cannot be performed any more, it terminates the control flow.

(4) Multiple Supply Mode

Then, the multiple supply mode is described in detail. The multiple supply mode is an operating mode in which the fluid is supplied to the discharging device 30 from both the pump 20 and the buffer tank 50. The operation in the multiple supply mode is an operating mode performed for the purpose of supplementing the supply of the fluid from the buffer tank 50 to the discharging device 30 by the supply of the fluid from the pump 20, for example, when the residual quantity of the fluid in the tank part 52 is assumed to be low in an end period of the tank supply mode described above. If the operation in the multiple supply mode is performed when the residual quantity of the fluid in the tank part 52 is assumed to be low, both stabilization of the supply pressure of the fluid to the discharging device 30, and use-up or emptying of the fluid accumulated in the buffer tank 50 are achieved.

That is, as the residual quantity of the fluid in the buffer tank 50 decreases in the tank supply mode, the distance between the bottom surface of the tank body 52*a* and the piston part 62 decreases, thereby increasing a pressure loss. Therefore, the flow rate of the fluid discharged toward the discharging device 30 from the buffer tank 50 decreases. When the flow rate of the fluid from the buffer tank 50 to the discharging device 30 becomes below the discharging amount of the fluid from the discharging device 30, the short in the fluid supply occurs. Therefore, when the residual quantity of the fluid accumulated in the buffer tank 50 becomes below a certain quantity, the operating mode is changed to the multiple supply mode, and the pump 20 is activated for the supply of the fluid in addition to the buffer tank 50. Therefore, it becomes possible to use up the fluid accumulated in the buffer tank 50, while stabilizing the supply pressure of the fluid to the discharging device 30.

Figure 15:
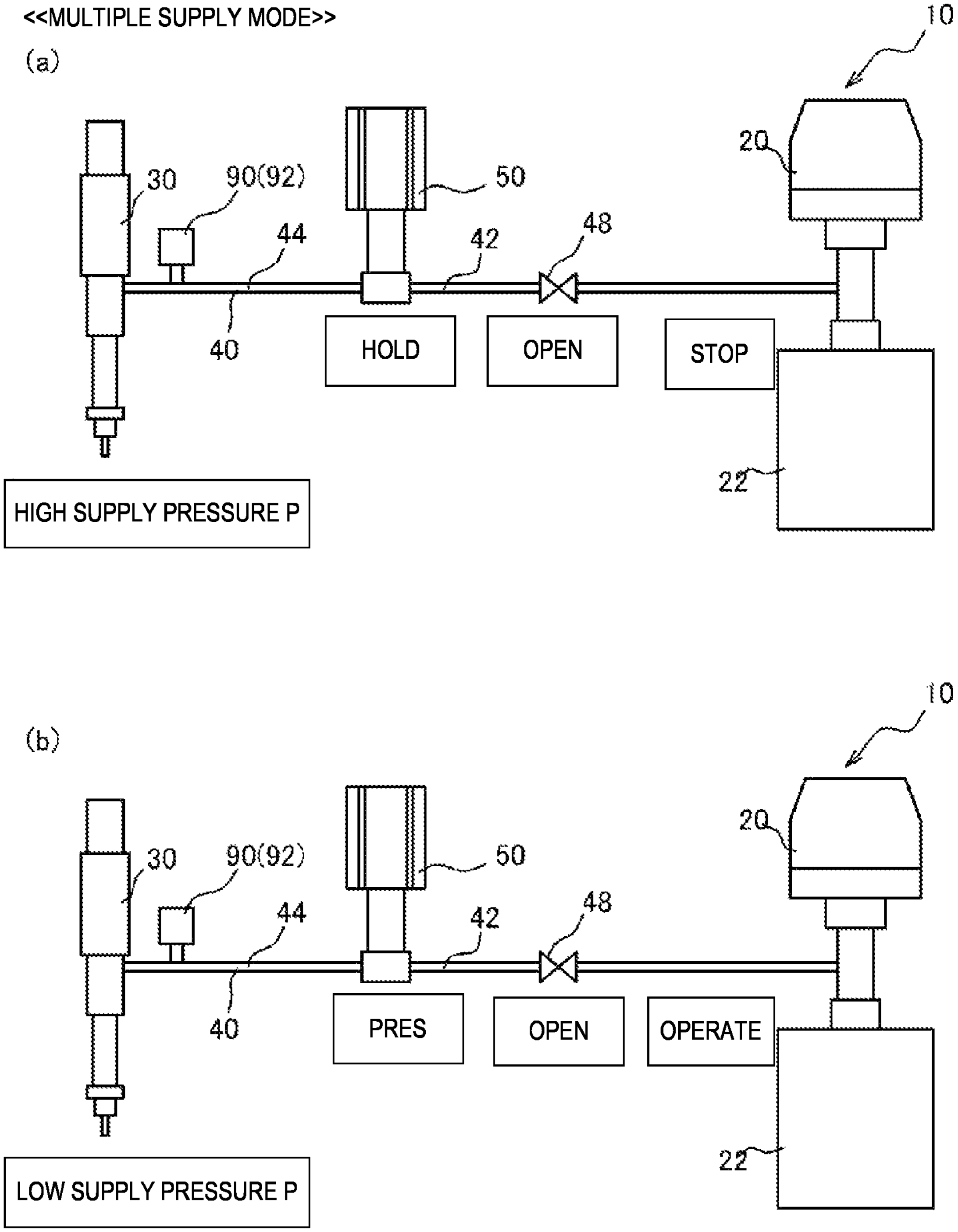
FIGS. 15 (*a*) and (*b*) are views illustrating operating states of each part in cases where the fluid discharging system of FIG. 1 is high and low, respectively, in the supply pressure in a multiple supply mode.
Figure 16:
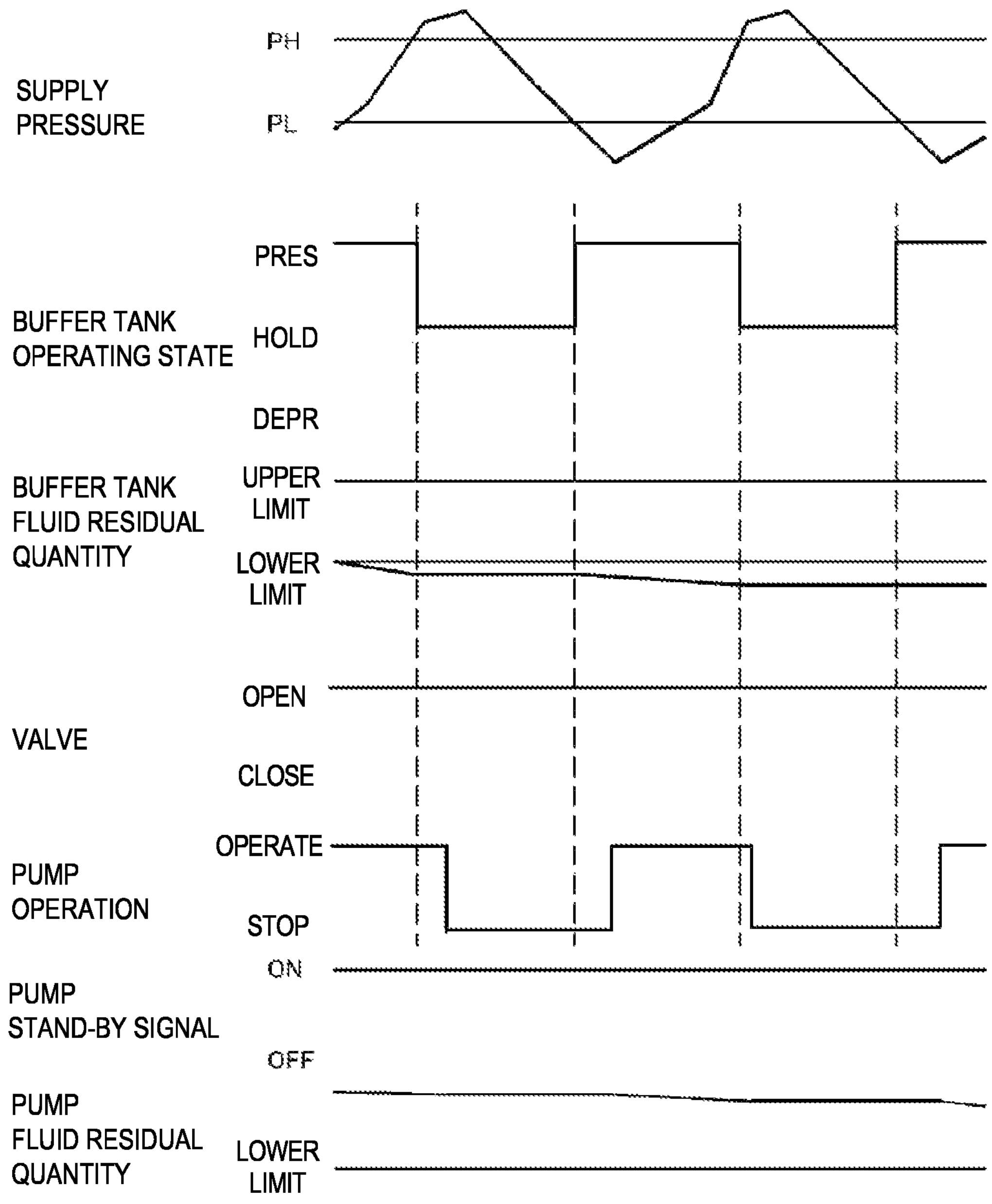
FIG. 16 is a timing chart when the fluid discharging system of FIG. 1 operates in the multiple supply mode.

In the multiple supply mode, as illustrated by an operation diagram in FIG. 15 and a timing chart in FIG. 16, operations of the pump 20 and the buffer tank 50 are controlled based on the measurement of the residual quantity grasping part 90. In detail, in the multiple supply mode, upon the supply of the fluid to the discharging device 30, operation is controlled under a condition that the measurement of the residual quantity grasping part 90 is below the given lower limit so that the fluid is supplied toward the discharging device 30 from both the pump 20 and the buffer tank 50. In more detail, the control device 200 makes the buffer tank 50 into the pressurized state, and opens the valve 48 to activate the pump 20, under a condition that the supply pressure P detected by the sensor 92 is below the given lower limit pressure PL. Therefore, the control device 200 makes both the buffer tank 50 and the pump 20 supply the fluid to the discharging device 30. When supplying the fluid from both the pump 20 and the buffer tank 50 in the multiple supply mode, by changing start timings of the pumping of the fluid by the pump 20 and the buffer tank 50, it can be adjusted that which of the fluid existing in the pump 20 and the fluid existing in the buffer tank 50 is used with priority. In this embodiment, the control device 200 performs a control for delaying the timing of the pumping start of the fluid by the pump 20 from the timing of the pumping start of the fluid by the buffer tank 50, in order to satisfy the demand of using up the fluid in the buffer tank 50 certainly for every cycle for preventing deterioration of the fluid accumulated in the buffer tank 50.

On the other hand, in the multiple supply mode, operation is controlled so that the pump 20 and the buffer tank 50 stop the discharge of the fluid, under a condition that the measurement of the residual quantity grasping part 90 exceeds the given upper limit. In more detail, in the multiple supply mode, under a condition that the supply pressure P detected by the sensor 92 exceeds the given upper limit pressure PH, the pump 20 is stopped, and the buffer tank 50 is made into the holding state. This suppresses that the fluid is excessively supplied to the discharging device 30 where the fluid is filled up.

Figure 17:
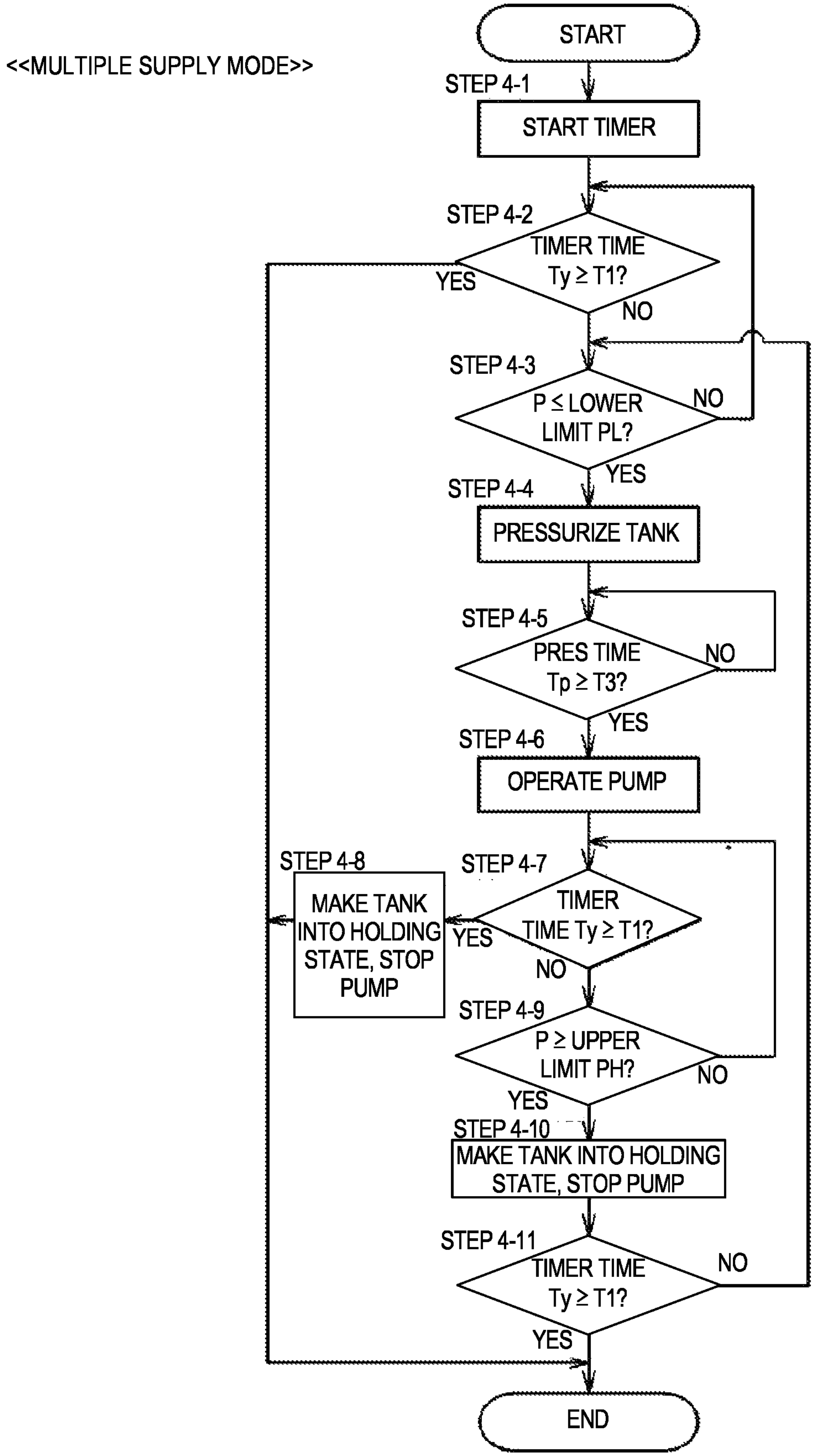
FIG. 17 is a flowchart when the fluid discharging system of FIG. 1 operates in the multiple supply mode.

In the multiple supply mode, the operation described above is performed in accordance with a flowchart illustrated in FIG. 17. Below, the operation of the fluid discharging system 10 in the multiple supply mode is described in more detail with reference to the flowchart of FIG. 17.

(Step 4-1)

At Step 4-1, a time count by a timer provided to the control device 200 is started. Then, the control device 200 transits the control flow to Step 4-2.

(Step 4-2)

At Step 4-2, the control device 200 checks whether the measuring time or time count by the timer (hereinafter, also referred to as "the timer time Ty") becomes more than a given time T1. Here, the given time T1 is time measured in order to determine when the multiple supply mode is to be terminated. By using the given time T1 as the determination condition at Step 4-2, instead of providing limit switches etc. at two locations (slightly before the lower limit, and at the lower limit of the buffer tank 50), the limit switch may be provided only at the location slightly before the lower limit of the buffer tank 50. In detail, when operation is continued after the timing at which the residual quantity of the fluid is detected by the sensor provided at the location slightly before the lower limit of the buffer tank 50, the multiple supply mode can be terminated at a suitable timing by defining the given time T1 based on an estimated time of the buffer tank 50 becoming empty. Thus, instead of providing the limit switches etc. at the two locations (slightly before the lower limit, and at the lower limit of the buffer tank 50), the multiple supply mode is terminated using the given time T1 as an index after the fluid is detected slightly before the lower limit of the buffer tank 50. Therefore, even if the fluid hardens at the bottom part of the buffer tank 50 and the piston is stuck before reaching the bottom, it is advantageous that it can be suppressed that occurrence of the inconvenience that the multiple supply mode cannot be terminated forever. Here, if it is checked that the timer time Ty becomes more than the given time T1, the control device 200 terminates the control flow. On the other hand, if the timer time Ty is less than the given time T1, the control device 200 transits the control flow to Step 4-3.

(Step 4-3)

At Step 4-3, the control device 200 checks the supply pressure P to the discharging device 30. Here, if the supply pressure P is above the given lower limit pressure PL, it returns the control flow to Step 4-2. On the other hand, if the supply pressure P is below the lower limit pressure PL, the control device 200 transits the control flow to Step 4-4.

(Step 4-4)

At Step 4-4, the control device 200 makes the buffer tank 50 into the pressurized state, similarly to Step 3-3 described above. Therefore, the pressurizing force acts on the fluid in the buffer tank 50, and the fluid is supplied toward the discharging device 30 from the buffer tank 50. Then, the control device 200 transits the control flow to Step 4-5.

(Step 4-5)

At Step 4-5, the control device 200 checks a lapsed time after the buffer tank 50 is made into the pressurized state at Step 4-4 (hereinafter, also referred to as the "pressurization time Tp"). A given time T3 corresponds to a delay time for delaying the timing of the pumping start of the fluid by the pump 20 from the timing of the pumping start of the fluid by the buffer tank 50 in the multiple supply mode. While the pressurization time Tp is less than the given time T3, the control device 200 stands by the proceeding of the control flow at Step 4-5. If the pressurization time Tp becomes more than the given time T3, the control device 200 transits the control flow to Step 4-6.

(Step 4-6)

At Step 4-6, the control device 200 activates the pump 20 to supply the fluid to the discharging device 30. At this time, the supply of the fluid to the discharging device 30 by the buffer tank 50 which has already been started at Step 4-4 described above is also continued. Therefore, by activating the pump 20 at Step 4-6, the fluid is supplied by both the buffer tank 50 and the pump 20 toward the discharging device 30. When operation of the pump 20 is started, the control device 200 transits the control flow to Step 4-7.

(Step 4-7)

At Step 4-7, the control device 200 checks the timer time Ty of which the time count was started at Step 4-1. Here, if the timer time Ty is more than the given time T1, the control device 200 transits the control flow to Step 4-8. If the timer time Ty is less than the given time T1, the control device 200 transits the control flow to Step 4-9.

(Step 4-8)

At Step 4-8, the control device 200 stops the pump 20, and makes the buffer tank 50 into the holding state. The control for making the buffer tank 50 into the holding state is performed similarly to Step 2-11 described above. Therefore, in both the pump 20 and the buffer tank 50, the supply of the fluid to the discharging device 30 is stopped. Then, the control device 200 terminates the control flow.

(Step 4-9)

At Step 4-9, the control device 200 checks the supply pressure P to the discharging device 30. Here, if the supply pressure P is below the given upper limit pressure PH, it returns the control flow to Step 4-7. On the other hand, if the supply pressure P is above the upper limit pressure PH, the control device 200 transits the control flow to Step 4-10.

(Step 4-10)

At Step 4-10, the control device 200 stops the pump 20, and makes the buffer tank 50 in the holding state, similarly to Step 4-8. Then, the control device 200 transits the control flow to Step 4-11.

(Step 4-11)

At Step 4-11, the control device 200 checks the timer time Ty of which the time count was started at Step 4-1. Here, if the timer time Ty is more than the given time T1, the control device 200 terminates the control flow. If the timer time Ty is less than the given time T1, the control device 200 returns the control flow to Step 4-3.

As described above, the fluid discharging system 10 is operable in the four kinds of operating modes, which are comprised of (1) the pump supply mode, (2) the tank accumulation mode, (3) the tank supply mode, and (4) the multiple supply mode. Next, the entire operation of the fluid discharging system 10 which is realized by performing the operations in these operating modes one by one is described. Note that the entire operation of the fluid discharging system 10 is operable in either one of a first operating pattern in which the fluid is accumulated in the buffer tank 50 during an initial stage, and a second operating pattern in which the fluid is accumulated in the buffer tank 50 during a middle phase. Therefore, in the following description, operation in the first operating pattern is first described, and operation in the second operating pattern is then described.

Figure 18:
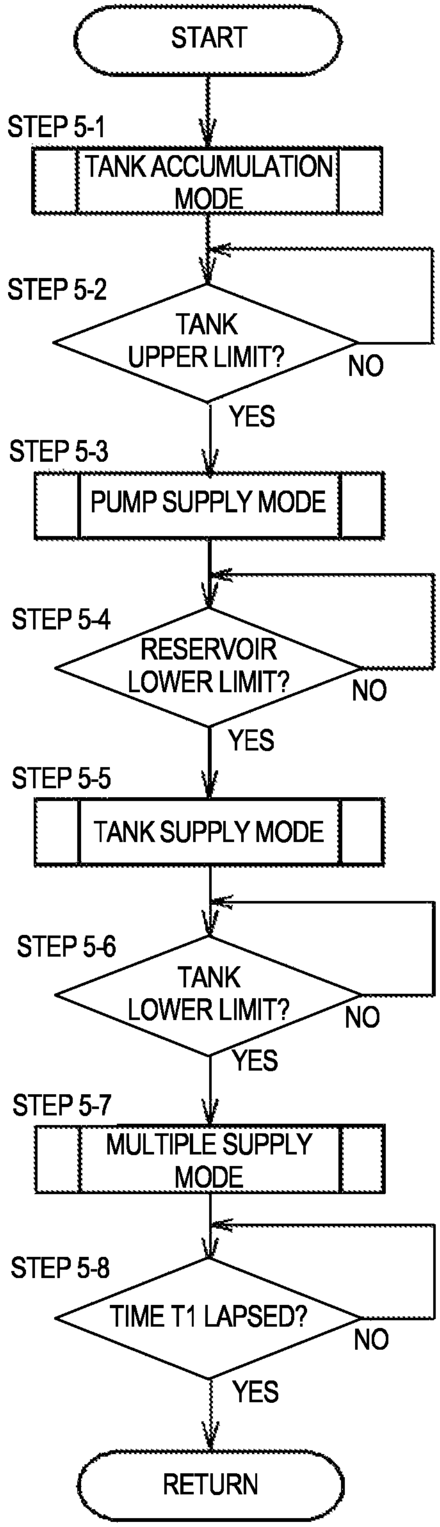
FIG. 18 is a flowchart when the fluid discharging system of FIG. 1 operates in a first operating mode.
Figure 19:
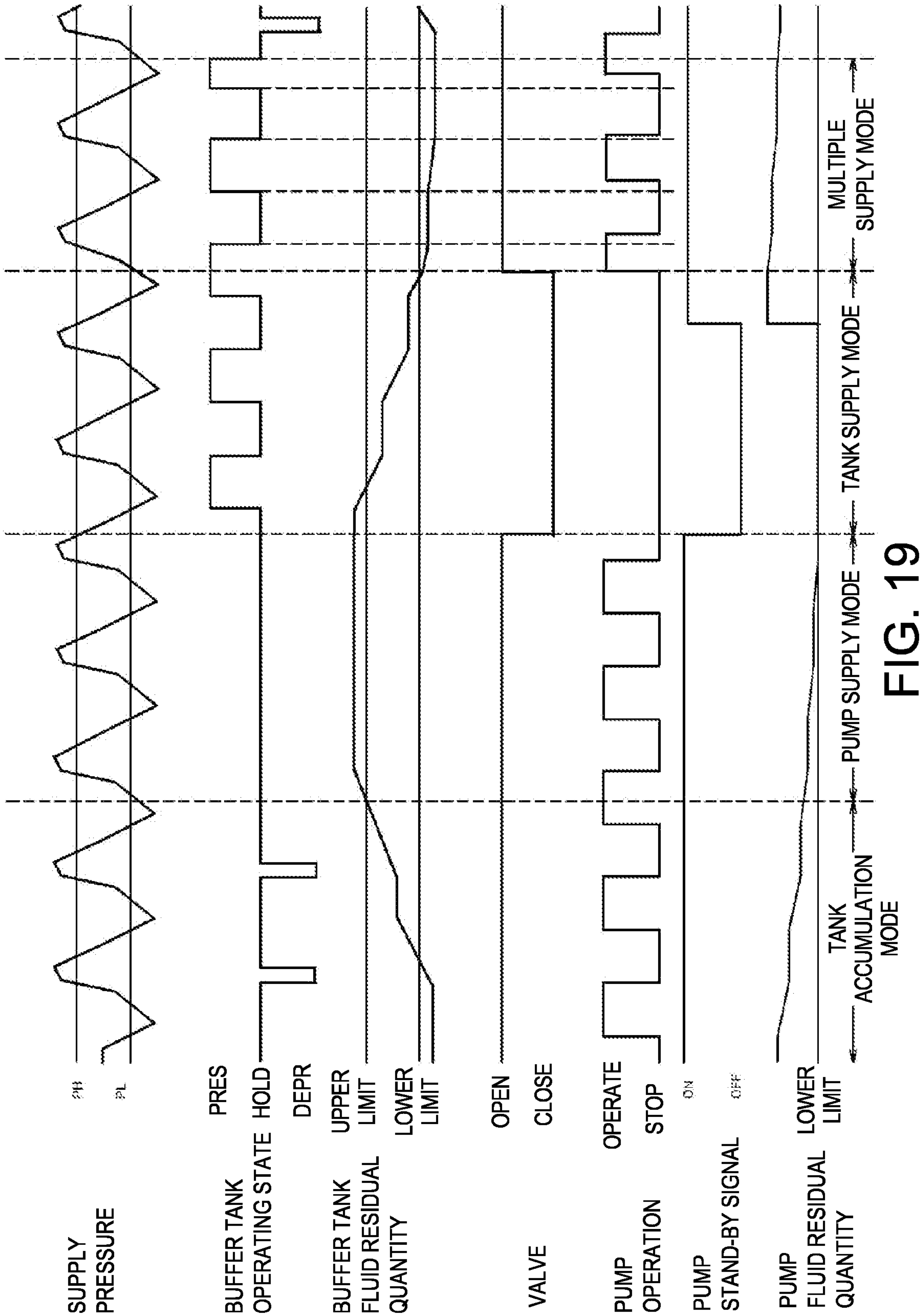
FIG. 19 is a timing chart when the fluid discharging system of FIG. 1 operates in the first operating mode.

[Entire Operation of Fluid Discharging System 10 by First Operating Pattern] The first operating pattern is an operating pattern in which operation in each operating mode is repeated in order of the tank accumulation mode→the pump supply mode→the tank supply mode→the multiple supply mode. A mode change condition for changing operation in each operating mode to the next operating mode is set for every operating mode. The control device 200 performs a control for changing the operating mode each time the mode change condition is satisfied. When the fluid discharging system 10 operates in the first operating pattern, the control device 200 controls operation of the fluid discharging system 10 in accordance with a flowchart illustrated in FIG. 18 and a timing chart illustrated in FIG. 19. Below, the operation of the fluid discharging system 10 in the first operating pattern is described in more detail with reference to FIGS. 18 and 19.

(Step 5-1)

Figure 11:
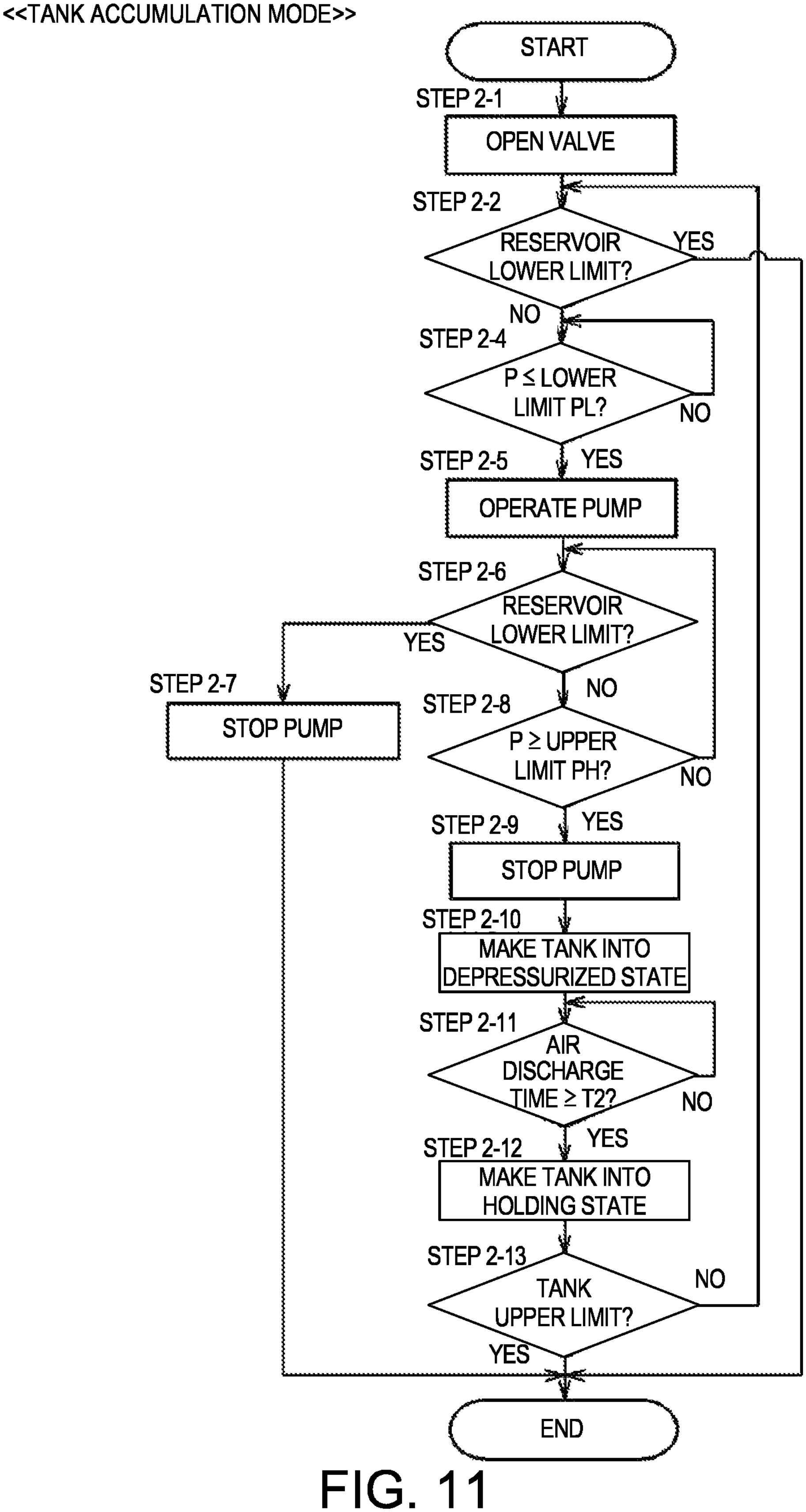
FIG. 11 is a flowchart when the fluid discharging system of FIG. 1 operates in the tank accumulation mode.

At Step 5-1, the control device 200 starts operation in the tank accumulation mode in accordance with the control flow of FIG. 11. Then, the control device 200 transits the control flow to Step 5-2.

(Step 5-2)

At Step 5-2, in the fluid discharging system 10 which is under operation in the tank accumulation mode, the control device 200 checks the residual quantity of the fluid accumulated in the buffer tank 50. Here, if it is checked that the accumulating amount of the fluid in the buffer tank 50 reaches the upper limit, the control device 200 transits the control flow to Step 5-3.

(Step 5-3)

Figure 8:
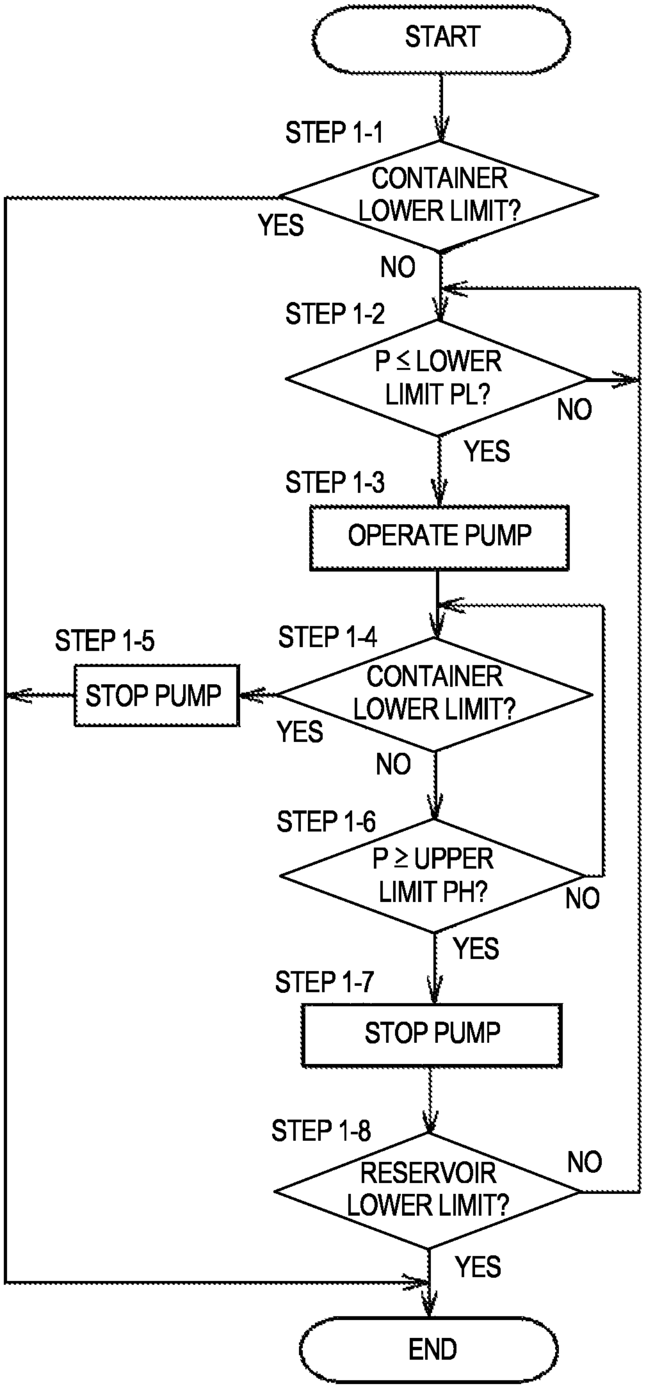
FIG. 8 is a flowchart when the fluid discharging system of FIG. 1 operates in the pump supply mode.

At Step 5-3, the control device 200 starts operation in the pump supply mode in accordance with the control flow of FIG. 8. Then, the control device 200 transits the control flow to Step 5-4.

(Step 5-4)

At Step 5-4, in the fluid discharging system 10 which is under operation in the pump supply mode, the control device 200 checks the residual quantity of the fluid in the reservoir 22 of the pump 20. Here, if it is checked that the residual quantity of the fluid in the reservoir 22 has reached the lower limit, the control device 200 transits the control flow to Step 5-5.

(Step 5-5)

At Step 5-5, the control device 200 starts operation in the tank supply mode in accordance with the control flow of FIG. 14. Then, the control device 200 transits the control flow to Step 5-6.

(Step 5-6)

At Step 5-6, in the fluid discharging system 10 which is under operation in the tank supply mode, the control device 200 checks the residual quantity of the fluid in the buffer tank 50. Here, if it is checked that the residual quantity of the fluid in the buffer tank 50 has reached the lower limit, the control device 200 transits the control flow to Step 5-7. Here, at this step, the state where "the residual quantity of the fluid in the buffer tank 50 has reached the lower limit" may be a state where the storing amount decreases to a level where the supply of the fluid becomes impossible. However, in this embodiment, the state is defined so that the stage slightly before the level where the supply of the fluid becomes impossible (a state where the fluid remains a little) is considered to be the lower limit of the residual quantity of the fluid, and the control device 200 controls operation.

(Step 5-7)

At Step 5-7, the control device 200 starts operation in the multiple supply mode in accordance with the control flow of FIG. 17. Then, the control device 200 transits the control flow to Step 5-8.

(Step 5-8)

At Step 5-8, the control device 200 checks the timer time Ty in the fluid discharging system 10 which is under operation in the multiple supply mode. Here, if it is checked that the timer time Ty becomes more than the given time T1, the control device 200 returns the control flow to Step 5-1.

When the fluid discharging system 10 operates in the first operating pattern, operation is controlled by the control device 200 in accordance with the flow described above. As described above, the first operating pattern accumulates the fluid in the buffer tank 50 during the initial stage (Step 5-1). Therefore, when the fluid discharging system 10 is operated in the first operating pattern, the fluid accumulated in the buffer tank 50 can be supplied to the discharging device 30, for example, not only in a case where the fluid of the reservoir 22 of the pump 20 is used up, but also in a case where the supply of the fluid by the pump 20 becomes impossible because of abnormality of the pump 20.

[Entire Operation of Fluid Discharging System 10 in Second Operating Pattern]

Figure 20:
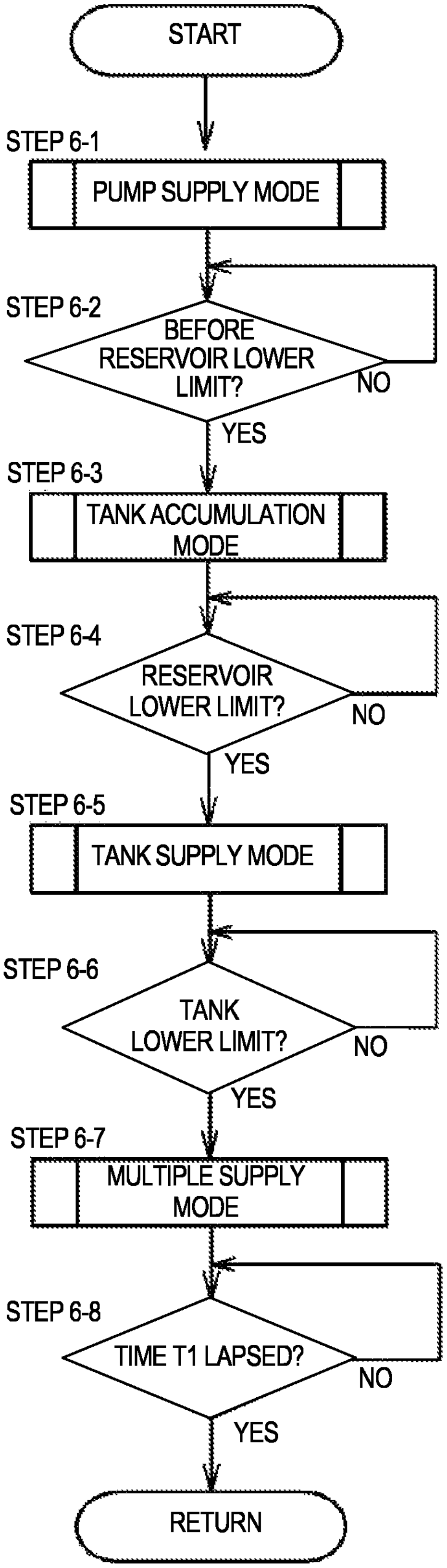
FIG. 20 is a flowchart when the fluid discharging system of FIG. 1 operates in a second operating mode.
Figure 21:
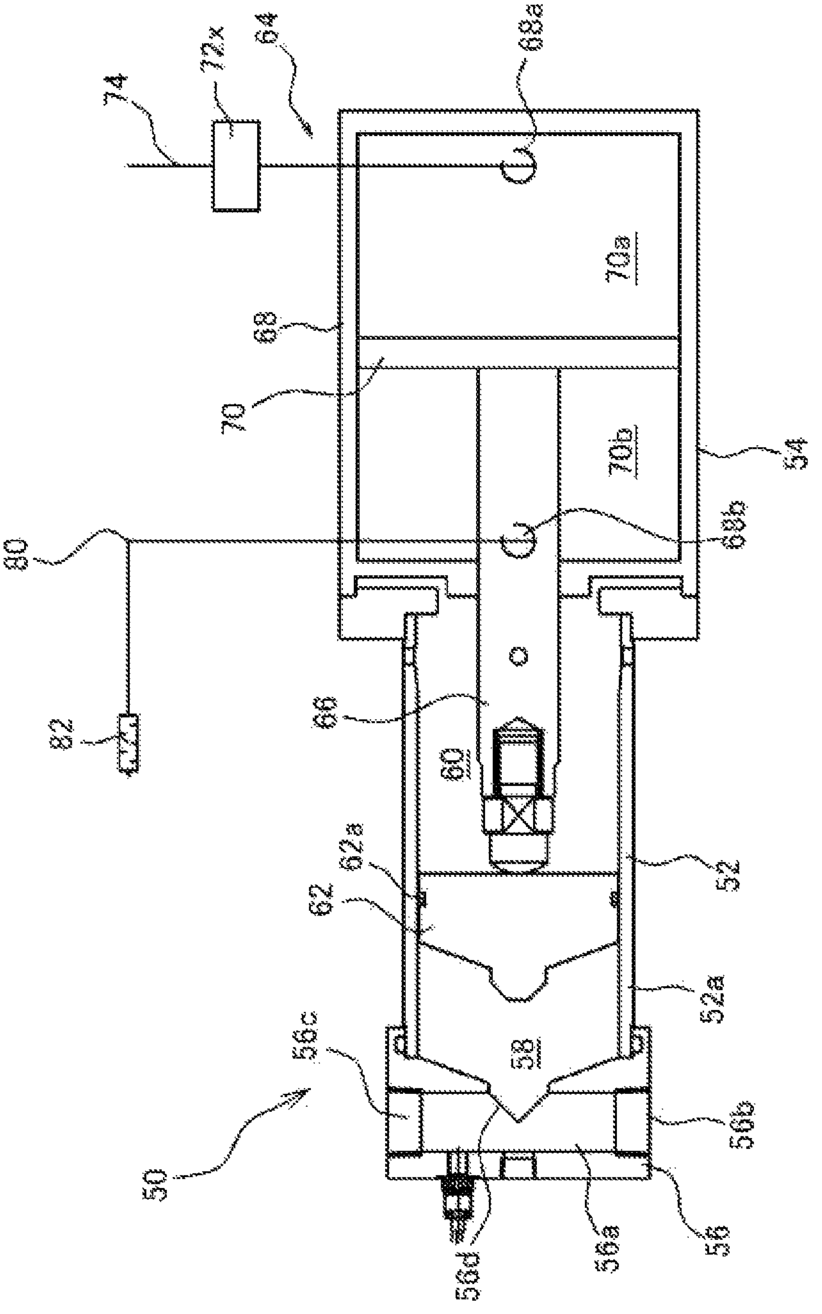
FIG. 21 is a cross-sectional view according to a modification of the buffer tank used for the fluid discharging system of FIG. 1.

Next, the entire operation of the fluid discharging system 10 in the second operating pattern is described. The second operating pattern is an operating pattern in which operation in each operating mode is repeated in order of the pump supply mode→the tank accumulation mode→the tank supply mode→the multiple supply mode. Also in the second operating pattern, a mode change condition for changing operation in each operating mode to operation in the next operating mode is set for every operating mode. The control device 200 performs a control for changing the operating mode each time the mode change condition is satisfied. When the fluid discharging system 10 operates in the second operating pattern, the control device 200 controls operation of the fluid discharging system 10 in accordance with a flowchart illustrated in FIG. 20. Below, operation of the fluid discharging system 10 in the second operating pattern is described in more detail with reference to FIG. 20.

(Step 6-1)

At Step 6-1, the control device 200 starts operation in the pump supply mode in accordance with the control flow of FIG. 8. Then, the control device 200 transits the control flow to Step 6-2.

(Step 6-2)

At Step 6-2, in the fluid discharging system 10 which is under operation in the pump supply mode, the control device 200 checks the residual quantity of the fluid in the reservoir 22 of the pump 20. Here, if it is checked that the residual quantity of the fluid in the reservoir 22 is in the stage slightly before reaching the lower limit, the control device 200 transits the control flow to Step 6-3.

(Step 6-3)

At Step 6-3, the control device 200 starts operation in the tank accumulation mode in accordance with the control flow of FIG. 11. Then, the control device 200 transits the control flow to Step 6-4.

(Step 6-4)

At Step 6-4, in the fluid discharging system 10 which is under operation in the tank accumulation mode, the control device 200 checks the residual quantity of the fluid in the reservoir 22. Here, if it is checked that the accumulating amount of the fluid in the reservoir 22 reached the lower limit, the control device 200 transits the control flow to Step 6-5.

(Step 6-5)

At Step 6-5, the control device 200 starts operation in the tank supply mode in accordance with the control flow of FIG. 14. Then, the control device 200 transits the control flow to Step 6-6.

(Step 6-6)

At Step 6-6, in the fluid discharging system 10 which is under operation in the tank supply mode, the control device 200 checks the residual quantity of the fluid in the buffer tank 50. Here, if it is checked that the residual quantity of the fluid in the buffer tank 50 has reached the lower limit, the control device 200 transits the control flow to Step 6-7. At this step, the state where "the residual quantity of the fluid in the buffer tank 50 has reached the lower limit" may be a state where the storing amount decreases to the level where the supply of the fluid becomes impossible. However, in this embodiment, the control device 200 controls operation, while defining the stage slightly before the level where the supply of the fluid becomes impossible (the state where the fluid remains a little) as the lower limit of the residual quantity of the fluid.

(Step 6-7)

At Step 6-7, the control device 200 starts operation in the multiple supply mode in accordance with the control flow of FIG. 17. Then, the control device 200 transits the control flow to Step 6-8.

(Step 6-8)

At Step 6-8, in the fluid discharging system 10 which is under operation in the multiple supply mode, the control device 200 checks the timer time Ty. Here, if it is checked that the timer time Ty becomes more than the given time T1, the control device 200 returns the control flow to Step 6-1.

When the fluid discharging system 10 operates in the second operating pattern, operation is controlled by the control device 200 in accordance with the flow described above. As described above, the second operating pattern performs operation in the pump supply mode prior to operation in the tank accumulation mode, and accumulates the fluid in the buffer tank 50 in the tank accumulation mode during the middle phase (Step 6-3). Thus, when operating the fluid discharging system 10 in the second operating pattern, the control for accumulating the fluid in the buffer tank 50 and changing to the buffer tank 50 the supply source of the fluid to the discharging device 30 in the stage slightly before the residual quantity of the fluid in the reservoir 22 of the pump 20 reaches the lower limit, is performed. Therefore, according to the second operating pattern, the period during which the fluid is accumulated (stays) in the buffer tank 50 can be minimized.

As described above, the fluid discharging system 10 of this embodiment is configured so that the buffer tank 50 is disposed at an intermediate location of the supply line 40 which connects the pump 20 to the discharging device 30, in addition to the pump 20 and the discharging device 30. The fluid discharging system 10 can realize the pressure acting state where the buffer tank 50 applies the pressure to the fluid. Further, the fluid discharging system 10 can realize the pressurized state where the pressure is applied to the fluid, and the depressurized state where the negative pressure is applied to the fluid, as the pressure acting state. Therefore, by applying the pressure to the fluid toward the outside of the buffer tank 50 as the pressurized state, the fluid discharging system 10 of this embodiment can pump the fluid to the discharging device 30. Therefore, the fluid discharging system 10 can suppress the pressure fluctuation due to the supply source of the fluid to the discharging device 30 changing from the pump 20 to the buffer tank 50.

Further, by making the buffer tank 50 into the depressurized state so that the pressure in the direction toward the inside of the buffer tank 50 is applied to the fluid, the fluid discharging system 10 can smoothly suck the fluid into the buffer tank 50. Therefore, the fluid discharging system 10 can suck and accumulate the fluid in the buffer tank 50, prior to the supply of the fluid from the buffer tank 50 to the discharging device 30. Therefore, the fluid discharging system 10 utilizes the accumulating function of the fluid in the buffer tank 50 to contribute to the stable supply of the fluid to the discharging device 30.

The fluid discharging system 10 of this embodiment is configured so that the buffer tank 50 can realize the holding state where the pressure is not applied to the fluid, in addition to the pressure acting state described above (the pressurized state and the depressurized state). Therefore, like during operation in the pump supply mode, and in a case where the residual quantity of the fluid in the discharging device 30 is enough, when the discharging device 30 can discharge the fluid without using the buffer tank 50, or when the continuation of the accumulation of the fluid in the buffer tank 50 is not appropriate during operation in the tank accumulation mode, if the residual quantity of the fluid in the discharging device 30 is taken into consideration, it can be suppressed that the supply pressure of the fluid to the discharging device 30 is changed due to the influence of the buffer tank 50, or the discharge pressure of the fluid in the discharging device 30 is changed. Therefore, the fluid discharging system 10 of this embodiment can suppress the change in the supply pressure of the fluid to the discharging device 30 due to the pressure acting on the fluid from the buffer tank 50, and the change in the discharge pressure in the discharging device 30.

The fluid discharging system 10 of this embodiment can stably supply the fluid to the discharging device 30 by performing the operation in each operating mode described above, without providing a plurality of pumps 20. Therefore, the fluid discharging system 10 of this embodiment can suppress an increase in the installation space and the cost, as compared with the case where a plurality of pumps 20 are provided.

Note that, although in this embodiment the pressure is changed in three steps comprised of the pressurized state where the positive pressure acts on the fluid from the buffer tank 50 side toward the supply line 40 side and the depressurized state where the negative pressure acts on the fluid from the buffer tank 50 side toward the supply line 40 side, as the pressure acting state where the pressure is applied to the fluid in the buffer tank 50, and the holding state where the pressure does not act on the fluid, the present disclosure is not limited to these states. For example, in the pressurized state and the depressurized state, as for the pressure acting on the fluid, the acting state of the pressure may be changed in a plurality of steps or steplessly.

Figure 22:
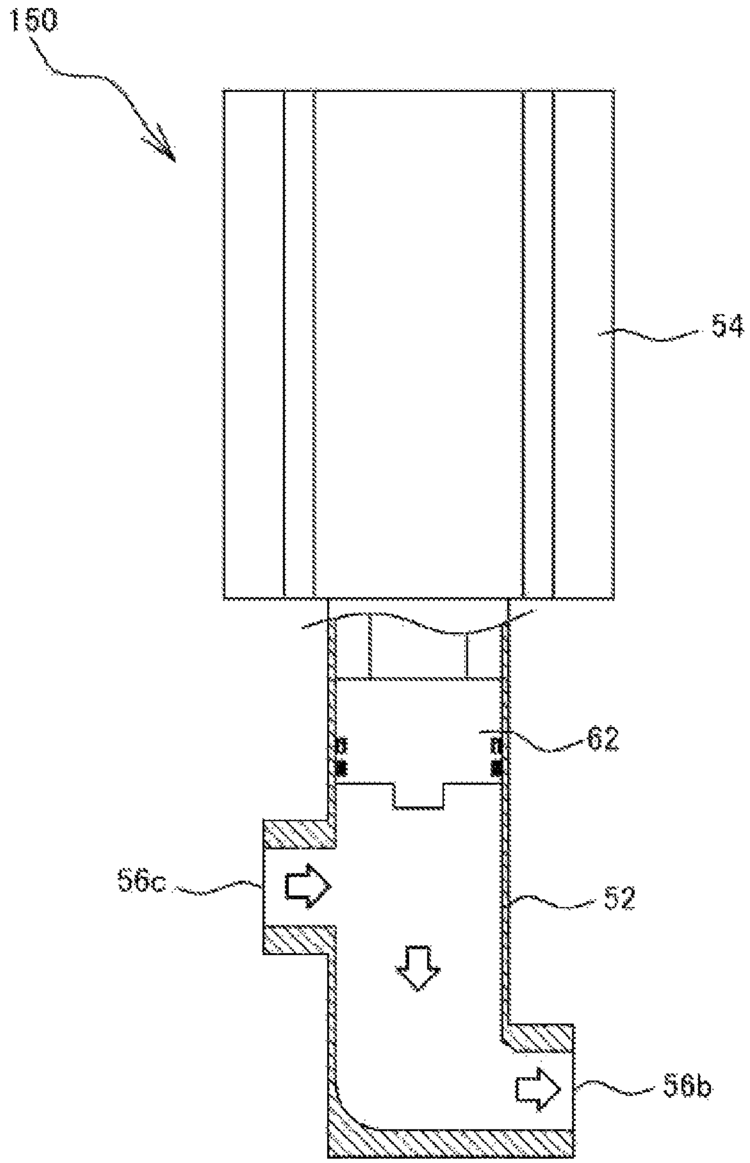
FIG. 22 is a cross-sectional view of a substantial part according to a modification of the buffer tank used for the fluid discharging system of FIG. 1.

In detail, as described above, in the variable volume mechanism 54, instead of providing the solenoid valve 72*b*, the pilot check valve 72*c*, and the first speed controller 72*d* to the first piping line 74 connected to the first casing connection opening 68*a* of the casing 68, a regulator 72*x* may be provided, as illustrated in FIG. 22, for example. According to such a configuration, in the pressurized state and the depressurized state, it becomes possible to change the pressure which acts on the fluid in a multiple-step or stepless fashion. Further, according to such a configuration, for example, in the tank accumulation mode described above, instead of making the buffer tank 50 into the depressurized state, the pressure acting on the fluid may be changed from a strong pressurized state where the pressure is strong to a weak pressurized state. Therefore, it becomes possible to further optimize the pressure control in the buffer tank 50 according to the operating state of the fluid discharging system 10.

Further, according to the fluid discharging system 10 described above, the buffer tank 50 is provided with the tank part 52 and the variable volume mechanism 54, and the variable volume mechanism 54 controls the change in the volume of the communicating space 58 to change the state between the pressurized state, the depressurized state, and the holding state. Therefore, the fluid discharging system 10 can control operation of the buffer tank 50 by controlling the increase and decrease in the volume of the communicating space 58.

As described above, the fluid discharging system 10 is configured so that the variable volume mechanism 54 is provided with the piston part 62 which divides the inside of the tank part 52 into the communicating space 58 and the non-communicating space 60 which does not communicate with the supply line 40, and the actuator 64 which moves the piston part 62. Further, the buffer tank 50 can realize the pressurized state, the depressurized state, and the holding state by the actuator 64 controlling the movement of the piston part 62. Therefore, by the movement control of the piston part 62, the fluid discharging system 10 can appropriately realize the pressurized state, the depressurized state, and the holding state, and can ensure the stable supply of the fluid to the discharging device 30. Note that, although in this embodiment the piston part 62 is provided and the pressure is applied to the fluid via the piston part 62, the present disclosure is not limited to this configuration. For example, the variable volume mechanism 54 may be configured without the piston part 62, by having a configuration for directly applying the pressure to the fluid.

Figure 23:
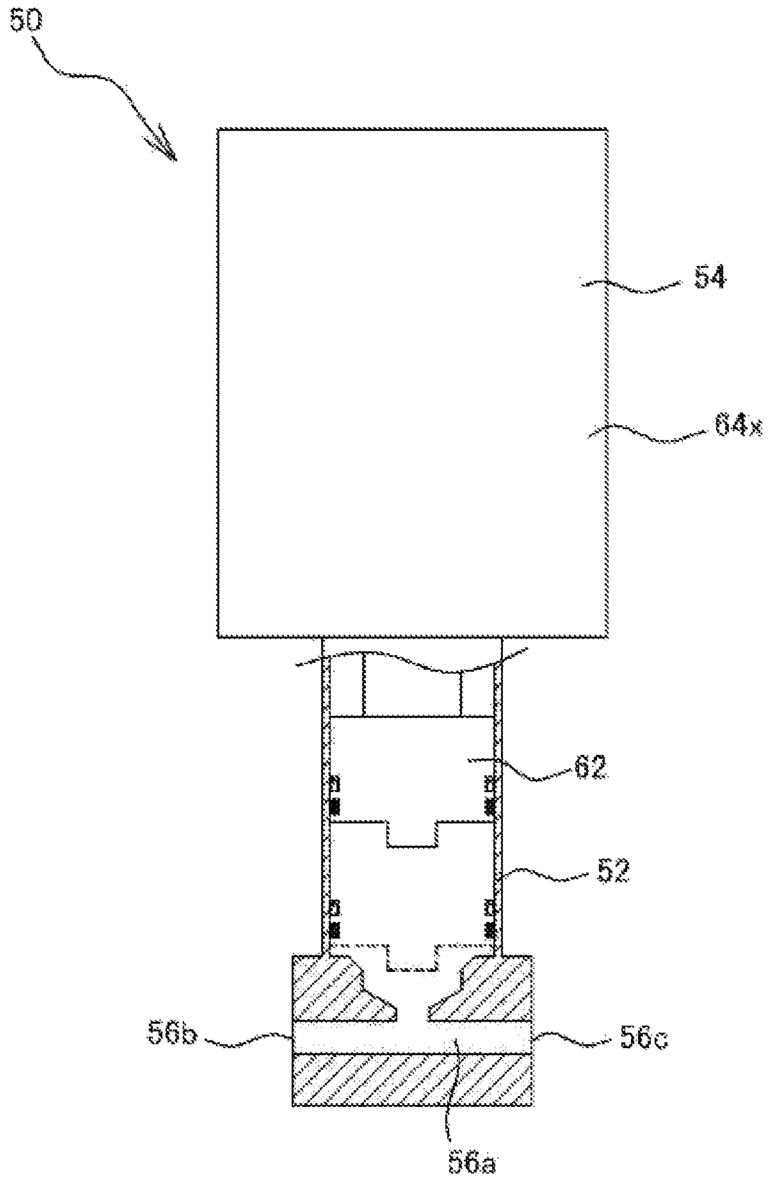
FIG. 23 is a cross-sectional view of a substantial part according to the modification of the buffer tank used for the fluid discharging system of FIG. 1.

Note that, although in this embodiment the actuator 64 is comprised of the gas cylinder device (in this embodiment, the air cylinder device) which can exert a driving force by the inflow and outflow of gas (air), the present disclosure is not limited to this configuration. For example, the fluid discharging system 10 may use, as the actuator 64, a hydraulic cylinder device which uses oil as the fluid and can hydraulically exert a driving force, or a drive 64*x* which uses a motor etc. and can mechanically or electrically exert a driving force (see FIG. 23).

The present disclosure is not limited to what is illustrated in this embodiment and modifications which are described above, and may have other embodiments from the teachings and spirit thereof without departing from the appended claims. For example, the buffer tank 50 described above is configured so that the connecting part 56 connected to the supply line 40 is provided at one end side of the tank part 52, and the fluid flows in and out the tank body 52*a* via the connecting part 56. However, instead, it may be configured as a buffer tank 150 of FIG. 22. Although the buffer tank 150 has substantially the same configuration as the buffer tank 50 described above, it differs in that the connection opening 56*c* used as the entrance of the fluid into the tank body 52*a* is provided above the connection opening 56*b* used as the exit of the fluid in tank body 52*a*. Such a configuration minimizes the staying time of the fluid to further promote the use-up of the accumulated fluid.

Further, although the fluid discharging system 10 described above is configured so that, in the tank accumulation mode, the time limit is provided for the accumulation of the fluid in the buffer tank 50 as a measure for suppressing the reduction in the supply pressure P to the discharging device 30, the present disclosure is not limited to this configuration. The accumulation of the fluid in the buffer tank 50 may be stopped, for example, under a condition that the supply pressure P to the discharging device 30 becomes below the given value. Further, the fluid discharging system 10 may improve the supply performance of the fluid by the pump 20 in the tank accumulation mode as compared with the case where it operates in other operating modes, or may bring forward or advance the startup time of operation of the pump 20 from the timing illustrated in the above embodiment, to suppress the reduction in the supply pressure P. Moreover, as for the accumulating amount of the fluid in the buffer tank 50, the amount of the fluid can be derived and grasped directly or indirectly, for example, by a method of measuring and deriving the amount directly by a residual quantity sensor etc., or a method of deriving the amount by detecting an inflow rate and an outflow rate of the fluid into/from the buffer tank 50, and subtracting one amount from the other, or the amount can be grasped indirectly based on time of the inflow and outflow of the fluid into/from the buffer tank 50.

Further, in the multiple supply mode, the fluid discharging system 10 described above starts the supply of the fluid by the buffer tank 50, and after a while, it operates the pump 20 to give the fluid in the buffer tank 50 the priority for consumption. However, the present disclosure is not limited to this configuration. For example, the fluid in the buffer tank 50 may be consumed first in the multiple supply mode, by reducing the rotational speed of the pump 20 to lower its pumping capability, or increasing the pressurizing force of the buffer tank 50, so that a difference in the supply performance of the fluid is provided between the pump 20 and the buffer tank 50. Note that, when lowering the pumping capability of the pump 20 as described above, the supply of the fluid by the buffer tank 50 and the supply of the fluid by the operation of the pump 20 may be started simultaneously.

Here, the fluid discharging system 10 described above may be installed with a sensor, such as a limit switch, only at a location slightly before the lower limit of the buffer tank 50 (slightly before the residual quantity of the fluid becomes zero), and change the operating mode to the multiple supply mode (Steps 5-7 and 6-7), when the sensor detects that the residual quantity of the fluid in the buffer tank 50 is at the lower limit (corresponding to Steps 5-6 and 6-6). In this case, it may be determined that the residual quantity of the fluid in the buffer tank 50 reaches the lower limit by the determination for changing from the multiple supply mode to the next operating mode (Steps 5-8 and 6-8) being performed by a timer. Alternatively, instead of performing the determination for changing from the multiple supply mode to the next operating mode by such a method, a sensor may be additionally provided at the lower limit position of the buffer tank 50, and the change from the multiple supply mode to the next operating mode may be performed under a condition that this sensor detects that the fluid is reduced to the lower limit position. Further, although the state where "the residual quantity of the fluid in the buffer tank 50 is at the lower limit" may also be the state where the storing amount decreases to the level where the supply of the fluid becomes impossible, the present disclosure is not limited to this configuration, and it may be defined suitably without departing from the spirit of the present disclosure. In detail, as described in this embodiment, it does not depart from the spirit of the present disclosure, even if the state slightly before the level where the supply of the fluid becomes impossible (the state where the fluid remains a little) is considered to be the state where "the residual quantity of the fluid in the buffer tank 50 is at the lower limit."

Although the fluid discharging system 10 described above is provided with the sensor 92 capable of detecting the pressure between the buffer tank 50 and the discharging device 30, and controls each apparatus based on the supply pressure P to the discharging device 30, the present disclosure is not limited to this configuration. For example, the sensor 92 may be a flow rate sensor etc., which grasps the residual quantity of the fluid in the discharging device 30 according to a flow rate of the fluid supplied to the discharging device 30. Further, if additionally providing an accumulator before the discharging device 30, the residual quantity of the fluid in the discharging device 30 may be grasped based on the position of a piston of the accumulator, and each apparatus may be controlled based on the residual quantity. Further, in the fluid discharging system 10, the layout of the sensor 92 is not limited to the layout described above. In detail, the sensor 92 may be provided not only to the supply line 40 and the accumulator, but also to the discharging device 30 itself (for example, the casing 100 and the stator 104 of the discharging device 30).

As described above, in the fluid discharging system 10, for example, the residual quantity sensor may be provided to the buffer tank 50, and the position sensor capable of detecting the position of the partition 70 may be provided so that the storing amount of the fluid in the buffer tank 50 is determined based on the output values from these sensors, or the inflow rate and the outflow rate of the fluid into/from the buffer tank 50 may be detected or derived so that the storing amount of the fluid in the buffer tank 50 is determined based on the inflow rate and the outflow rate. Further, the fluid discharging system 10 may be configured to be capable of continuously detecting the storing amount of the fluid in the buffer tank 50, without being limited to the configuration in which the sensors are disposed at the upper limit position and the lower limit position of the buffer tank 50, and the storing amount of the fluid can be detected in the plurality of stages.

Figure 24:
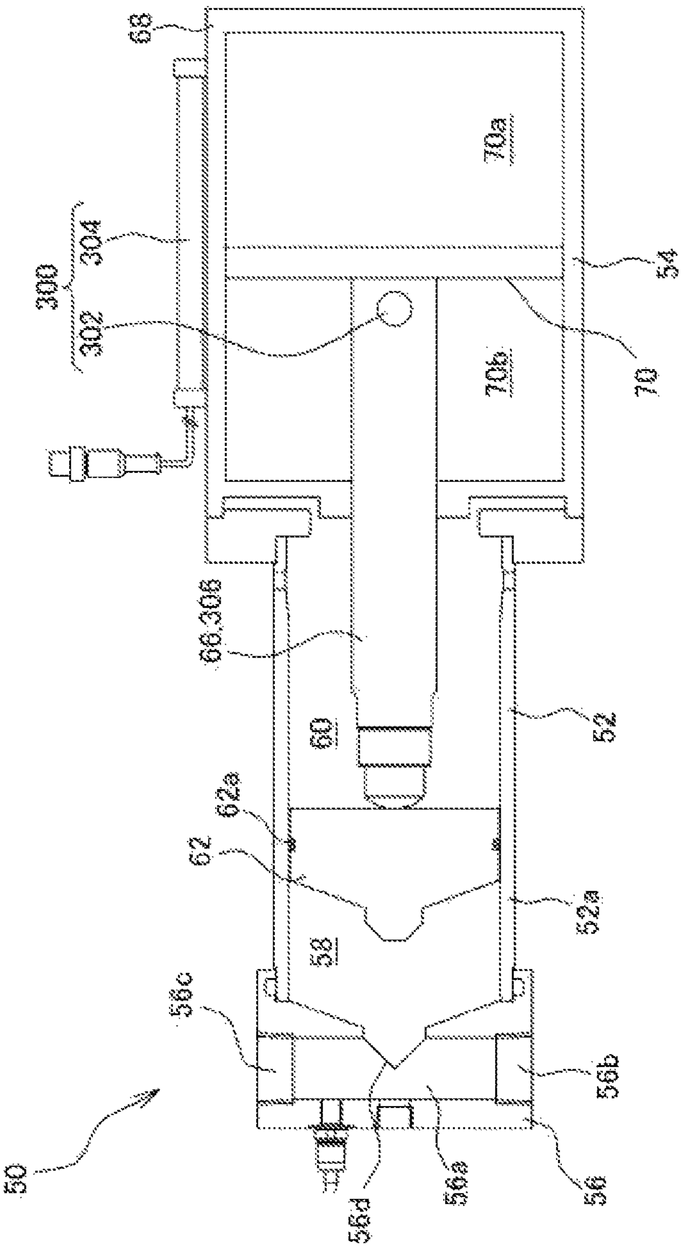
FIG. 24 is a view illustrating one example in which a detection device capable of continuously detecting a storing amount of fluid is provided to the buffer tank.

In detail, as the configuration capable of continuously detecting the storing amount of the fluid in the buffer tank 50, for example, as illustrated in FIG. 24, a detecting device 300 for continuously detecting the storing amount of the fluid may be provided to the buffer tank 50. The detecting device 300 illustrated in FIG. 24 detects the residual quantity of the fluid in the buffer tank 50 by continuously detecting the position of a member which moves according to the residual quantity of the fluid (in the illustrated example, the piston part 62), or the rod part 66 or the partition 70 which moves in an interlocked fashion with the member. In the example illustrated in FIG. 24, the detecting device 300 includes a sensor dog 302 and a magnetic position detection sensor 304.

The sensor dog 302 is formed to generate magnetism, for example, by having a magnet therein. The sensor dog 302 is attachable to a target of the position detection. The sensor dog 302 is attached to a position changing member 306 which changes in the position according to the residual quantity of the fluid in the buffer tank 50, for example, like the piston part 62, the rod part 66, and the partition 70, which constitute the cylinder in the buffer tank 50. In the example illustrated in FIG. 24, the rod part 66 is selected as the position changing member 306, and the sensor dog 302 is attached to the rod part 66.

The magnetic position detection sensor 304 is a sensor capable of detecting the position of the sensor dog 302 based on the magnetism generated by the sensor dog 302. The magnetic position detection sensor 304 is attached to the buffer tank 50 so that a range within which the sensor dog 302 moves according to the change in the amount of the fluid stored in the buffer tank 50 becomes a detection range. In this embodiment, the magnetic position detection sensor 304 is attached to the casing 68 of the buffer tank 50, over the entire range of the moving range within which the sensor dog 302 is assumed to move according to the change in the amount of the fluid. In this embodiment, since the sensor dog 302 moves in the axial direction of the buffer tank 50, the magnetic position detection sensor 304 is disposed so as to extend in the axial direction of the buffer tank 50.

When using what is capable of detecting the entire stroke of the cylinder in the buffer tank 50 like the detecting device 300 illustrated in FIG. 24, the fluid discharging system 10 can grasp the residual quantity value of the fluid in the buffer tank 50 by associating a relationship between the tank volume of the buffer tank 50 (the residual quantity of the fluid) and the stroke of the cylinder. That is, the storing amount of the fluid in the buffer tank 50 is continuously detectable by the detecting device 300.

Further, by having the configuration as illustrated in FIG. 24, operation of the fluid discharging system 10 can be controlled, while suitably setting or changing the upper limit and the lower limit of the storing amount of the fluid in the buffer tank 50. In detail, like the above embodiment, if providing the switches such as the limit switches, or the detection devices such as the sensors, at the position of the upper limit and the position of the lower limit of the storing amount in the buffer tank 50, it is necessary to physically move the installed positions of the detection devices in order to change the upper limit and the lower limit of the storing amount of the fluid. However, if the detecting device 300 described above is used, operation of the fluid discharging system 10 can be controlled, while the upper limit position and the lower limit position are set at the suitable positions, or the positions used as the upper limit position and the lower limit position are changed within a range where the sensor dog 302 is detectable by the magnetic position detection sensor 304.

Further, in the detecting device 300, the residual quantity of the fluid in the buffer tank 50 may be displayed on a user interface 310, such as an operation control console of the fluid discharging system 10, or a monitor of the control device, based on positional information on the sensor dog 302 detected by the magnetic position detection sensor 304.

Figure 25:
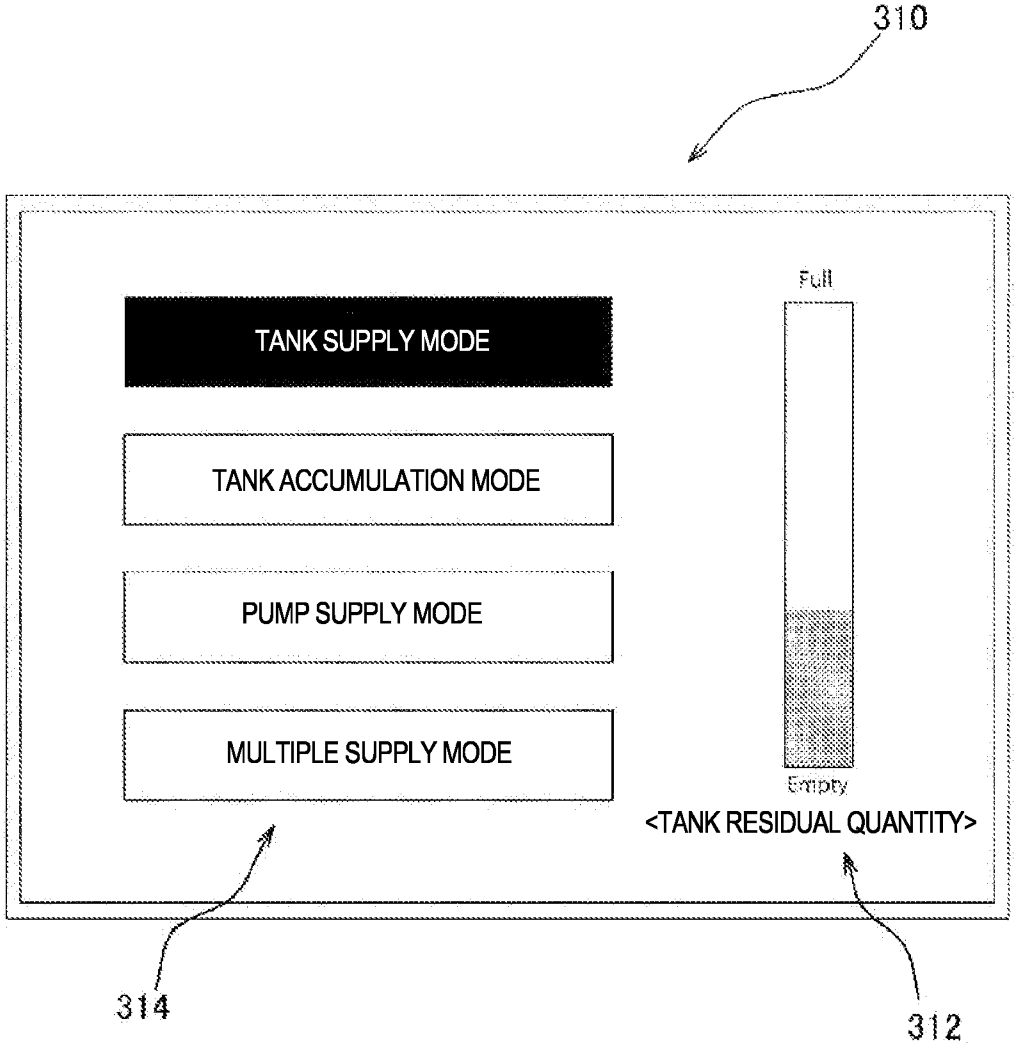
FIG. 25 is a view of an image according to one example of a user interface which illustrates the storing amount of the fluid in the buffer tank, and the operating mode of the fluid discharging system.

In detail, as illustrated in FIG. 25, a residual quantity indicating part 312 which indicates the residual quantity of the fluid in the buffer tank 50 may be provided, and the residual quantity may be displayed by an indicator or a numerical value (in the illustrated example, the indicator). Thus, by visualizing the residual quantity of the fluid in the buffer tank 50, a timing at which the fluid is to be refilled in the reservoir 22 where the pump 20 is disposed, and a timing at which the reservoir 22 is to be replaced, become clear. For example, if the reservoir 22 is a pail can, a timing at which an empty pail can (the reservoir 22) is to be replaced by a new pail can (the reservoir 22) becomes clear.

If providing the user interface 310 as illustrated in FIG. 25, a mode indicating part 314 may be provided which discriminably displays the operating mode in which the fluid discharging system 10 operates, in addition to or instead of the residual quantity of the fluid buffer tank 50. In the mode indicating part 314 illustrated in FIG. 25, the current operating mode can be discriminated by inverting the color of the indication of the current operating mode from the color of the indication of other operating modes. Therefore, according to the fluid discharging system 10, it becomes possible to intuitively grasp the current operating mode, or to clearly grasp the timings of the replacement of the reservoir 22, and the refill of the fluid to the reservoir 22.

Although the timing at which the replacement of the reservoir 22 and the refill of the fluid to the reservoir 22 may be specified suitably, it may be during operation in the tank supply mode in the fluid discharging system 10 according to the above embodiment. Therefore, as illustrated in FIG. 25, if it is clearly distinguishable in the mode indicating part 314 that the operating state of the fluid discharging system 10 becomes in the tank supply mode, the timings of the replacement of the reservoir 22 and the refill of the fluid to the reservoir 22 can be grasped clearly.

Further, if providing the user interface 310 as illustrated in FIG. 25, for example, operation may be receivable in the indicating part, such as an indicator (in the illustrated example, the residual quantity indicating part 312), displayed on the user interface 310, and an operating command may be outputted to each part or operation may be set according to the operation. For example, in the example of FIG. 25, operation may be receivable in the indicating part of the indicator in the residual quantity indicating part 312, and the length of the indicator may be adjustable. Therefore, an operator can intuitively setup one or both of the upper limit and the lower limit of the residual quantity of the fluid in the buffer tank 50, for example, which are used as indexes of an output of a warning or an operating condition.

The present disclosure is not limited to what is illustrated in this embodiment and modifications which are described above, and other modified embodiments and other modifications may be possible from the teachings and spirit of the present disclosure, without departing from the appended claims. Below, further modifications of the fluid discharging system 10 are described.

The fluid discharging system 10 described above can realize operation for continuing the supply of the fluid to the discharging device 30 (discharge continuous operation) by discharging the fluid from the buffer tank 50 to the supply line 40, when limiting the supply of the fluid from the pump 20 to the discharging device 30. Therefore, according to the fluid discharging system 10, while supplying the fluid discharged from the buffer tank 50 to the discharging device 30 in the discharge continuous operation, it is possible to perform works for refilling the reservoir 22 with the fluid, and replacing the reservoir 22 where the residual quantity of the fluid is decreased to the reservoir 22 where the residual quantity of the fluid is fully secured, for example.

Here, in the fluid discharging system 10 described above, unless optimizing a storage volume V of the fluid in the buffer tank 50, it may become impossible to continuously supply the fluid to the discharging device 30, or the fluid may be excessively accumulated in the buffer tank 50. In detail, in the fluid discharging system 10, if the storage volume V of the fluid in the buffer tank 50 is small, the residual quantity of the fluid in the buffer tank 50 may become empty, while refilling the reservoir 22 with the fluid or replacing the reservoir 22, thereby stopping the supply of the fluid to the discharging device 30. Further, in the fluid discharging system 10, if the storage volume V of the fluid in the buffer tank 50 is more than necessary, the fluid which has accumulated in the buffer tank 50 may stay in the buffer tank 50 for a long period of time. Further, the storage volume V of the buffer tank 50 may be set considering variable elements, such as a variation in time required for refilling the reservoir 22 with the fluid or replacing the reservoir 22, and the length of the supply line 40. Therefore, in the fluid discharging system 10, when performing the discharge continuous operation, the storage volume V of the fluid in the buffer tank 50 may be optimized in consideration of the discharge amount of the fluid discharged from the discharging device 30 while limiting the supply of the fluid from the pump 20 to the discharging device 30, and various kinds of variable elements.

As a modification for solving such a problem, by discharging the fluid from the buffer tank 50 to the supply line 40, while limiting the supply of the fluid from the pump 20 to the discharging device 30, the fluid discharging system 10 can perform the discharge continuous operation in which the supply of the fluid to the discharging device 30 continues, and the storage volume V of the fluid in the buffer tank 50 can be set based on the following (Formula 1).

$$V=a\cdot(t+x) \quad \text{(Formula 1)}$$

Here, among the parameters which constitute (Formula 1) described above, the parameter "a" is an average discharge flow rate of the fluid discharged from the discharging device 30, while limiting the supply of the fluid from the pump 20 to the discharging device 30 in the discharge continuous operation.

Moreover, the parameter "t" which constitutes (Formula 1) described above is a time limit during which the supply of the fluid from the pump 20 to the discharging device 30 is limited in the discharge continuous operation.

Here, the fluid discharging system 10 limits the supply of the fluid from the pump 20 to the discharging device 30 in the discharge continuous operation under a condition that the residual quantity of the fluid in the reservoir 22 becomes below the lower limit. Further, the fluid discharging system 10 recovers the reservoir 22 so that a limitation canceling condition is satisfied by replacing the reservoir 22 where the residual quantity of the fluid became below the lower limit with another reservoir 22 where the fluid is filled up, or by refilling with the fluid the reservoir 22 where the residual quantity of the fluid became below the lower limit to recover the residual quantity of the fluid. Therefore, the fluid discharging system 10 becomes in the state where the fluid necessary for being supplied to the discharging device 30 is secured in the reservoir 22, and the limitation of the supply of the fluid from the pump 20 to the discharging device 30 is canceled. Therefore, the time limit "t" which constitutes (Formula 1) described above is defined based on a work time (recovery period R) assumed to be necessary for performing a work (recovery work) for recovering the state where the residual quantity of the fluid in the reservoir 22 satisfies the given limitation canceling condition after the residual quantity of the fluid in the reservoir 22 becomes below the lower limit. The time limit "t" may be set to the same value as the recovery period R, for example. Further, the recovery period R may be defined based on the work time which is required for the recovery work of an average operator.

The parameter "x" which constitutes (Formula 1) described above is a variable parameter which can be set arbitrarily in consideration of the variable elements, such as the variation in the time required for the work for refilling the reservoir 22 with the fluid or replacing the reservoir 22, and the length of the supply line 40. For example, the variable parameter "x" may vary according to an operator who performs the recovery work for recovering the residual quantity of the fluid, or may vary according to an arriving period S required for the fluid to reach the buffer tank 50 from the pump 20.

In this modification, the buffer tank 50 may be changeable of the volume of the fluid which can be accumulated in the communicating space 58. In detail, in the buffer tank 50, the tank part 52 may be replaceable according to the storage volume V of the fluid which is derived from (Formula 1) described above, or the setting of the maximum volume of the fluid which can be accumulated in the communicating space 58 may be changeable to the storage volume V so that the storage volume may vary.

By having the configuration like this modification, the fluid discharging system 10 can optimize the storage volume V of the fluid in the buffer tank 50, for example, as follows.

<<Optimizing Method of Storage Volume V in Consideration of Skill Level of Replacing Work of Reservoir 22>>

The fluid discharging system 10 of this modification can optimize the storage volume V of the fluid in the buffer tank 50 by changing the variable parameter "x" described above according to the skill level of the replacing work of the reservoir 22.

Describing in more detail, the average discharge flow rate "a" of the fluid discharged from the discharging device 30, while limiting the supply of the fluid from the pump 20 to the discharging device 30 in the discharge continuous operation, is constant regardless of the skill level of the replacing work of the reservoir 22. Further, the time limit "t" to which the supply of the fluid from the pump 20 to the discharging device 30 is limited in the discharge continuous operation is a work time required for the work (recovery work) for the average operator to perform the replacing work of the reservoir 22 and recover the storing amount of the fluid, and is set as a fixed value regardless of the operator. Therefore, the storage volume V is set as the value in consideration of the skill level by differentiating the variable parameter "x" according to the skill level.

Here, illustrating and describing a concrete example, when the average discharge flow rate "a" is 100 [ml/min] and the time limit "t" is 10 [min], and if the variable parameter "x" in a case of an expert who can perform the replacing work of the reservoir 22 in 10 minutes is set as 1, the storage volume V becomes $V=a\times(t+x)=100\times(10+1)=1100$ [ml]. A time "tempty" required for the buffer tank 50 to become empty after the residual quantity of the fluid in the reservoir 22 becoming the amount set as the lower limit is detected, the replacement of the reservoir 22 becomes necessary, and the supply of the fluid to the discharging device 30 is changed to "only from the buffer tank 50," is tempty=1100 [ml]/100 [ml/min]=11 [min]. Thus, when the expert finished the replacing work of the reservoir 22 in 10 minutes as expected, the residual quantity of the fluid which remains inside the buffer tank 50 at this moment is an amount corresponding to 1 [min] (100 ml). Therefore, by setting the storage volume V as described above, the residual quantity of the fluid which remains in the buffer tank 50 after the replacement of the reservoir 22 can be minimized, while avoiding that the supply of the fluid to the discharging device 30 breaks off or is stopped.

Further, when the variable parameter "x" in the case where a non-skilled operator who takes time for replacing the reservoir 22 is set as 5, the storage volume V becomes V=a×(t+x)=100×(10+5)=1500 [ml]. In this case, the time "tempty" required for the buffer tank 50 to become empty after the residual quantity of the fluid in the reservoir 22 becoming the amount set as the lower limit is detected, the replacement of the reservoir 22 becomes necessary, and the supply of the fluid to the discharging device 30 is changed to "only from the buffer tank 50," is tempty=1500 [ml]/100 [ml/min]=15 [min]. Thus, even if the non-skilled operator for the replacing work of the reservoir 22 performed the replacing work of the reservoir 22 for 13 minutes which is longer than normal or the reference time (the time limit t), the amount of the fluid remaining inside the buffer tank corresponds to 2 [min] (200 ml) when the replacing work is finished. Therefore, even if the non-skilled operator performs the replacing work of the reservoir 22 by setting the storage volume V as described above, the residual quantity of the fluid which remains in the buffer tank 50 after the replacement of the reservoir 22 can be minimized, while avoiding that the supply of the fluid to the discharging device 30 breaks off or is stopped.

<<Optimizing Method of Storage Volume V in Consideration of Arriving Period 5>>

Next, the method of optimizing the storage volume V in consideration of the arriving period S required for the fluid to reach the buffer tank 50 from the pump 20 is described. The fluid discharging system 10 of this modification can optimize the storage volume V of the fluid in the buffer tank 50 by changing the variable parameter "x" described above according to the arriving period S and according to the skill level.

Describing in more detail, the average discharge flow rate "a" of the fluid discharged from the discharging device 30, while limiting the supply of the fluid from the pump 20 to the discharging device 30 in the discharge continuous operation is constant, regardless of the skill level of the replacing work of the reservoir 22. Further, the time limit "t" to which the supply of the fluid from the pump 20 to the discharging device 30 is limited in the discharge continuous operation is a work time required for the work (recovery work) for the average operator to perform the replacing work of the reservoir 22, and recover the storing amount of the fluid, and is a fixed value, regardless of the operator. Therefore, the storage volume V is set as the value in consideration of the arriving period S by changing the variable parameter "x" according to the skill level.

Here, illustrating and describing a concrete example, when the average discharge flow rate "a" is 100 [ml/min], the time limit "t" is 10 [min], and the variable parameter "x"=20, the volume of the buffer tank becomes V=a×(t+x) =100×(10+20)=3000 [ml]. In this case, the time tempty required for the buffer tank 50 to become empty after the residual quantity of the fluid in the reservoir 22 becoming the amount set as the lower limit is detected, the replacement of the reservoir 22 becomes necessary, and the supply of the fluid to the discharging device 30 is changed to "only from the buffer tank 50," is set to tempty=3000 [ml]/100 [ml/min]=30 [min]. Thus, when it took 10 [min] for the replacement of the reservoir 22 after the residual quantity of the fluid in the reservoir 22 reached the lower limit, the residual quantity of the fluid which remains inside the buffer tank 50 at the completion of the replacement of the reservoir 22 is an amount corresponding to 20 [min] (2000 [ml]).

However, for example, when the arriving period S until the fluid reaches the buffer tank 50 from the replaced reservoir 22 is 10 [min], the fluid must be continuously supplied to the discharging device 30 from the buffer tank 50 for another 10 [min] (1000 [ml]) from the completion of the replacement of the reservoir 22. Also in such a case, the residual quantity of the fluid which remains in the buffer tank 50 is an amount corresponding to 20 [min] (2000 [ml]), as described above. Thus, at the timing when the supply of the fluid to the discharging device 30 from the pump 20, instead of the buffer tank 50, becomes possible, the residual quantity of the fluid which remains in the buffer tank 50 is an amount corresponding to 20 [min]−10 [min]=10 [min] (1000 [ml]). Therefore, by setting the variable parameter "x" as the optimal value according to the arriving period S, the residual quantity of the fluid which remains in the buffer tank 50 after the replacement of the reservoir 22 can be minimized, while avoiding that the supply of the fluid to the discharging device 30 breaks off or is stopped.

As described above, the fluid discharging system 10 of this modification can perform the discharge continuous operation in which the supply of the fluid to the discharging device 30 is continued, by discharging the fluid from the buffer tank 50 to the supply line 40, while limiting the supply of the fluid from the pump 20 to the discharging device 30. Therefore, in the fluid discharging system 10 of this modification, for example, the reservoir 22 can be refilled with the fluid, and the reservoir 22 where the residual quantity of the fluid decreased can be replaced with the reservoir 22 where the residual quantity of the fluid is secured enough, during the discharge continuous operation. Therefore, according to the fluid discharging system 10 of this modification, the fluid can be supplied continuously to the discharging device 30, while suppressing the increase in the installation space and the cost.

Further, in the fluid discharging system 10 of this modification, the storage volume V of the fluid in the buffer tank 50 is defined by the relationship described above (Formula 1), and the fluid discharging system 10 has at least the volume obtained by multiplying the average discharge flow rate "a" by the time limit "t." Therefore, the fluid discharging system 10 of this embodiment can store in the buffer tank 50 the amount of fluid required for being discharged from the discharging device 30, while limiting the supply of the fluid from the pump 20 to the discharging device 30 in the discharge continuous operation. Further, (Formula 1) which defines the storage volume V takes the variable parameter "x" in consideration. Therefore, the fluid discharging system 10 of this modification can optimize the storage volume V while taking the variable elements into consideration as well, for example, by setting the variable parameter "x" according to the variable elements, such as the skill level for the replacing work of the reservoir 22 described above, and the arriving period S. Therefore, the fluid discharging system 10 of this modification can optimize the storage volume V of the fluid in the buffer tank 50, in consideration of the discharge amount of the fluid discharged from the discharging device 30, while limiting the supply of the fluid from the pump 20 to the discharging device 30 in the discharge continuous operation, and various kinds of variable elements.

As described above, according to the fluid discharging system 10 of this modification, the time limit "t" is defined based on the standard recovery period R required for recovering the residual quantity of the fluid in the reservoir 22, which reached the lower limit, until it becomes in the state where the given limitation canceling condition is satisfied (in this embodiment, the state where the residual quantity of the fluid becomes more than the given amount due to the replacement of the reservoir 22). In this way, since in the fluid discharging system 10 of this modification the time limit "t" is defined as the value reflecting the recovery period R, the storage volume V of the fluid can be set as the optimal value by using the recovery period R as an index.

Note that, although in this modification the recovery period R is defined as the standard period until the residual quantity of the fluid recovers to be more than the given amount due to the replacement of the reservoir 22, the present disclosure is not limited to this configuration. For example, when recovering the residual quantity of the fluid by making the fluid flow into the reservoir 22, without replacing the reservoir 22 where the residual quantity of the fluid became below the lower limit as described above with another reservoir 22 where the fluid is fully filled, the recovery period R may be set as the optimal value according to the measure for recovering the residual quantity of the fluid in the reservoir 22, such as by setting the period required for making the fluid flow into the reservoir 22 to recover the residual quantity to a given amount as the recovery period R.

As described above, the fluid discharging system 10 of this modification changes the variable parameter "x" according to the operator who performs the recovery work for recovering the residual quantity of the fluid in the reservoir 22 (in this modification, the replacing work of the reservoir 22). Therefore, the fluid discharging system 10 can optimize the storage volume V of the fluid in the buffer tank 50 in consideration of the variable elements, such as the skill level of the operator who performs the recovery work.

The fluid discharging system 10 of this modification described above changes the parameter "x" according to the arriving period S required for the fluid to reach the buffer tank 50 from the pump 20. Therefore, the fluid discharging system 10 of this modification can optimize the storage volume V of the fluid in the buffer tank 50 in consideration of the arriving period S required for the fluid to reach the buffer tank 50 from the pump 20.

Note that, although in the fluid discharging system 10 of this modification the storage volume V of the fluid in the buffer tank 50 is optimized by the variable parameter "x" which is set in consideration of the single variable element, such as the skill level of the operator who performs the recovery work for recovering the residual quantity of the fluid in the reservoir 22, and the arriving period S, the present disclosure is not limited to this configuration. In detail, the fluid discharging system 10 may set the variable parameter "x" in consideration of a plurality of variable elements to optimize the storage volume V of the fluid in the buffer tank 50. For example, the skill level of the operator who performs the recovery work for recovering the residual quantity of the fluid in the reservoir 22 may be supposed to be a first variable element and the arriving period S may be supposed to be a second variable element, and the storage volume V of the fluid in the buffer tank 50 may be set in consideration of a variable parameter "x" 1 according to the first variable element and a variable parameter "x" 2 according to the second variable element. In detail, when assuming n variable elements, the variable parameter "x" may be derived by the following (Formula 2), and by substituting the variable parameter "x" in (Formula 1) described above to set the storage volume V of the fluid in the buffer tank 50.

$$x = x1 + x2 + \ldots + xn \qquad \text{(Formula 2)}$$

As described above, by setting the storage volume V of the fluid assuming the plurality of variable elements, the storage volume V of the fluid in the buffer tank 50 can be further optimized.

Note that the fluid discharging system 10 may be variously modified without departing from the scope of the present disclosure, as a method and a configuration of changing the storage volume V of the fluid in the buffer tank 50. For example, in the fluid discharging systems 10, a plurality of tank parts 52 with different storage volumes may be replaceably prepared, and the tank part 52 may be replaced by the tank part 52 with the optimal volume according to the storage volume V of the fluid and the variable parameter "x" which are derived as described above, or the volume of the tank part 52 may be adjustable according to the storage volume V and the variable parameter "x" by combining a plurality of containers with the same volume or different volumes. Further, in the fluid discharging system 10 of this modification, the upper limit position of the piston part 62 of the buffer tank 50 may be set according to the variable parameter "x" or the storage volume V.

The present disclosure is not limited to what is illustrated as the embodiment and the modifications which are described above, and may have other embodiments based on the teachings and spirit of the present disclosure, without departing from the appended claims. The component of the embodiment described above may be arbitrarily combined selectively. Further, the arbitrary components of the embodiment, and the arbitrary components described in the section "Summary of the Disclosure" or the components which embodied the arbitrary components described in the section "Summary of the Disclosure" may be arbitrarily combined. The present applicant has an intention to acquire the rights also for these embodiments, modifications, and combinations through amendments or divisional applications of the present application.

INDUSTRIAL APPLICABILITY

The present disclosure is suitably available in general for fluid discharging systems for pumping and discharging fluid.

DESCRIPTION OF REFERENCE CHARACTERS

10: Fluid Discharging System
20: Pump
22: Reservoir
30: Discharging Device
40: Supply Line
50: Buffer Tank
52: Tank Part
54: Variable Volume Mechanism
58: Communicating Space
60: Non-communicating Space
62: Piston Part (Partition Part)
64: Actuator

The invention claimed is:

1. A fluid discharging system, comprising:

a discharging device configured to discharge fluid;

a pump, having a reservoir configured to store the fluid, and configured to supply the fluid stored in the reservoir to the discharging device;

a supply line connecting the discharging device with the pump to allow the fluid to pass therethrough; and a buffer tank, disposed at an intermediate location of the supply line, and configured to suck and discharge the fluid, wherein a discharge continuous operation in which supply of the fluid to the discharging device continues is possible by discharging the fluid from the buffer tank to the supply line, while limiting the supply of the fluid from the pump to the discharging device, and wherein, based on an average discharge flow rate "a" of the fluid discharged from the discharging device while limiting the supply of the fluid from the pump to the discharging device in the discharge continuous operation, and a time limit "t" during which the supply of the fluid from the pump to the discharging device is limited in the discharge continuous operation, and a variable parameter "x," a storage volume V of the fluid in the buffer tank is set using a relationship of $V=a\cdot(t+x)$.

2. The fluid discharging system of claim 1, wherein, in the discharge continuous operation, the supply of the fluid from the pump to the discharging device is limited under a condition that a residual quantity of the fluid in the reservoir becomes below a given lower limit, and the limitation of the supply of the fluid from the pump to the discharging device is canceled under a condition that the residual quantity of the fluid in the reservoir is recovered to satisfy a given limitation canceling condition, and wherein the time limit "t" is defined based on a recovery period R required for the residual quantity of the fluid in the reservoir to recover the state satisfying the given limitation canceling condition after the residual quantity of the fluid in the reservoir becomes below the lower limit.

3. The fluid discharging system of claim 1, wherein, in the discharge continuous operation, the supply of the fluid from the pump to the discharging device is limited under a condition that a residual quantity of the fluid in the reservoir becomes below a given lower limit, and the limitation of the supply of the fluid from the pump to the discharging device is canceled under a condition that the residual quantity of the fluid in the reservoir is recovered to satisfy a given limitation canceling condition, and wherein the variable parameter "x" is changed according to an operator who performs a recovery work for recovering the residual quantity of the fluid.

4. The fluid discharging system of claim 1, wherein the parameter "x" is changed according to an arriving period S required for the fluid to reach the buffer tank from the pump.

5. The fluid discharging system of claim 1, wherein the buffer tank realizes a pressure acting state where pressure acts on the fluid, and a holding state where no pressure acts on the fluid.

6. The fluid discharging system of claim 5, wherein, as the pressure acting state where pressure acts on the fluid, the buffer tank realizes a pressurized state where a pressurizing force acts on the fluid, and a depressurized state where a decompression force acts on the fluid.

7. The fluid discharging system of claim 6, wherein the buffer tank includes:

a tank part connected to the supply line, and configured to allow the fluid to flow out of and into the tank part; and a variable volume mechanism configured to change a volume of a communicating space communicating with the supply line in the tank part, wherein the variable volume mechanism achieves the pressurized state by reducing the volume of the communicating space, achieves the depressurized state by increasing the volume of the communicating space, and achieves the holding state by stopping the change in the volume of the communicating space.

8. The fluid discharging system of claim 7, wherein the variable volume mechanism includes:

a partition part dividing the inside of the tank part into the communicating space and a non-communicating space not communicating with the supply line; and an actuator configured to move the partition part, and wherein the pressurized state, the depressurized state, and the holding state are achieved by controlling movement of the partition part by the actuator.

9. The fluid discharging system of claim 8, wherein the actuator changes pressure acting on the partition part via the fluid in the non-communicating space to move the partition part, and wherein the pressurized state is achieved by increasing the pressure acting on the partition part on the non-communicating space side, the depressurized state is achieved by reducing the pressure acting on the partition part on the non-communicating space side, and the holding state is achieved by stopping the change in the pressure acting on the partition part on the non-communicating space side.

10. The fluid discharging system of claim 8, comprising a cylinder device configured to exert a driving force by outflow and inflow of the fluid therethrough, wherein the drive of the cylinder device is controlled to adjust an acting state of the fluid.

11. The fluid discharging system of any one of claims 1 to 10, wherein the buffer tank includes:

a position changing member configured to change in the position within a given varying range according to a residual quantity of the fluid; and a detecting device configured to detect the position of the position changing member, and wherein the residual quantity of the fluid in the buffer tank is grasped based on a relationship between a volume of the buffer tank and the position of the position changing member.

* * * * *